US005699285A

United States Patent [19]

Miyanishi et al.

[11] Patent Number: 5,699,285

[45] Date of Patent: Dec. 16, 1997

[54] NORMALIZATION CIRCUIT DEVICE OF FLOATING POINT COMPUTATION DEVICE

[75] Inventors: Atsushi Miyanishi; Kazuyuki Iwaguro, both of Tokyo, Japan

[73] Assignee: Mitsubishi Denki Kabushiki Kaisha, Tokyo, Japan

[21] Appl. No.: 651,545

[22] Filed: May 22, 1996

[30] Foreign Application Priority Data

| | | | |
|---|---|---|---|
| Oct. 16, 1995 | [JP] | Japan | 7-267228(P) |
| Dec. 11, 1995 | [JP] | Japan | 7-322101(P) |

[51] Int. Cl.[6] .......... G06F 7/00; G06F 7/38

[52] U.S. Cl. .......... 364/715.04; 364/748

[58] Field of Search .......... 364/715.04, 748

[56] References Cited

U.S. PATENT DOCUMENTS

| | | | |
|---|---|---|---|
| 4,841,467 | 6/1989 | Ho et al. | 364/748 |
| 4,994,996 | 2/1991 | Fossum et al. | 364/748 |
| 5,103,418 | 4/1992 | Birger . | |
| 5,187,678 | 2/1993 | Hori . | |
| 5,424,968 | 6/1995 | Okamoto | 364/748 |

FOREIGN PATENT DOCUMENTS

| | | |
|---|---|---|
| 6-12224 | 1/1994 | Japan . |

*Primary Examiner*—Tan V. Mai
*Attorney, Agent, or Firm*—Oblon, Spivak, McClelland, Maier & Neustadt, P.C.

[57] ABSTRACT

It is an object to realize in a floating point computation device a normalization circuit device which carries out normalization, unnormalization and 0 function operation at high speed. A circuit (3) outputs 1 from the most significant bit for the number obtained by adding 1 to a decimal number value of the exponent part input signal (A). AND operation of the signal (A") and the mantissa part input signal (B) and OR operation of all bits of the value ((3) provide a control signal (G'). A circuit (2) represents in a binary value (B') a number obtained by subtracting 1 from a number value of the bit position of the leading 1 from the most significant bit of the signal (B). A circuit (6) subtracts the valve (B') from the signal (A) and a circuit (7*b*) selects the signal (H) and a 0 value according to the signal (G') to obtain an exponent part output signal (C) after normalization. A circuit (5) retrieves the respective bit states of the signal B from the most significant bit to render "1" only the bit state of the position of the leading 1. A circuit (7*a*) selects the signal (B") and a decoded signal (A') according to the signal (G') to obtain a moved amount (D). A shifter (8) shifts the signal (B) according to the signal (D) to obtain a mantissa part output signal (E) after normalization.

17 Claims, 69 Drawing Sheets

FIG. 3 (WHEN INPUT IS 8 BITS LONG)

| OUTPUT SIGNAL (A') | | | | | | | | | | | | | | | | | | |
|---|---|---|---|---|---|---|---|---|---|---|---|---|---|---|---|---|---|---|
| A'23 | A'22 | A'21 | A'20 | A'19 | A'18 | A'17 | A'16 | A'15 | A'14 | A'13 | A'12 | A'11 | A'10 | A'9 | A'8 | A'7 | A'6 | A'5 |
| 1 | 0 | 0 | 0 | 0 | 0 | 0 | 0 | 0 | 0 | 0 | 0 | 0 | 0 | 0 | 0 | 0 | 0 | 0 |
| 0 | 1 | 0 | 0 | 0 | 0 | 0 | 0 | 0 | 0 | 0 | 0 | 0 | 0 | 0 | 0 | 0 | 0 | 0 |
| 0 | 0 | 1 | 0 | 0 | 0 | 0 | 0 | 0 | 0 | 0 | 0 | 0 | 0 | 0 | 0 | 0 | 0 | 0 |
| 0 | 0 | 0 | 1 | 0 | 0 | 0 | 0 | 0 | 0 | 0 | 0 | 0 | 0 | 0 | 0 | 0 | 0 | 0 |
| 0 | 0 | 0 | 0 | 1 | 0 | 0 | 0 | 0 | 0 | 0 | 0 | 0 | 0 | 0 | 0 | 0 | 0 | 0 |
| 0 | 0 | 0 | 0 | 0 | 1 | 0 | 0 | 0 | 0 | 0 | 0 | 0 | 0 | 0 | 0 | 0 | 0 | 0 |
| 0 | 0 | 0 | 0 | 0 | 0 | 1 | 0 | 0 | 0 | 0 | 0 | 0 | 0 | 0 | 0 | 0 | 0 | 0 |
| 0 | 0 | 0 | 0 | 0 | 0 | 0 | 1 | 0 | 0 | 0 | 0 | 0 | 0 | 0 | 0 | 0 | 0 | 0 |
| 0 | 0 | 0 | 0 | 0 | 0 | 0 | 0 | 1 | 0 | 0 | 0 | 0 | 0 | 0 | 0 | 0 | 0 | 0 |
| 0 | 0 | 0 | 0 | 0 | 0 | 0 | 0 | 0 | 1 | 0 | 0 | 0 | 0 | 0 | 0 | 0 | 0 | 0 |
| 0 | 0 | 0 | 0 | 0 | 0 | 0 | 0 | 0 | 0 | 1 | 0 | 0 | 0 | 0 | 0 | 0 | 0 | 0 |
| 0 | 0 | 0 | 0 | 0 | 0 | 0 | 0 | 0 | 0 | 0 | 1 | 0 | 0 | 0 | 0 | 0 | 0 | 0 |
| 0 | 0 | 0 | 0 | 0 | 0 | 0 | 0 | 0 | 0 | 0 | 0 | 1 | 0 | 0 | 0 | 0 | 0 | 0 |
| 0 | 0 | 0 | 0 | 0 | 0 | 0 | 0 | 0 | 0 | 0 | 0 | 0 | 1 | 0 | 0 | 0 | 0 | 0 |
| 0 | 0 | 0 | 0 | 0 | 0 | 0 | 0 | 0 | 0 | 0 | 0 | 0 | 0 | 1 | 0 | 0 | 0 | 0 |
| 0 | 0 | 0 | 0 | 0 | 0 | 0 | 0 | 0 | 0 | 0 | 0 | 0 | 0 | 0 | 1 | 0 | 0 | 0 |
| 0 | 0 | 0 | 0 | 0 | 0 | 0 | 0 | 0 | 0 | 0 | 0 | 0 | 0 | 0 | 0 | 1 | 0 | 0 |
| 0 | 0 | 0 | 0 | 0 | 0 | 0 | 0 | 0 | 0 | 0 | 0 | 0 | 0 | 0 | 0 | 0 | 1 | 0 |
| 0 | 0 | 0 | 0 | 0 | 0 | 0 | 0 | 0 | 0 | 0 | 0 | 0 | 0 | 0 | 0 | 0 | 0 | 1 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |

| A'4 | A'3 | A'2 | A'1 | A'0 | INPUT VALUE(A) BINARY VALUE IN() |
|---|---|---|---|---|---|
| 0 | 0 | 0 | 0 | 0 | 0(00000000) |
| 0 | 0 | 0 | 0 | 0 | 1(00000001) |
| 0 | 0 | 0 | 0 | 0 | 2(00000010) |
| 0 | 0 | 0 | 0 | 0 | 3(00000011) |
| 0 | 0 | 0 | 0 | 0 | 4(00000100) |
| 0 | 0 | 0 | 0 | 0 | 5(00000101) |
| 0 | 0 | 0 | 0 | 0 | 6(00000110) |
| 0 | 0 | 0 | 0 | 0 | 7(00000111) |
| 0 | 0 | 0 | 0 | 0 | 8(00001000) |
| 0 | 0 | 0 | 0 | 0 | 9(00001001) |
| 0 | 0 | 0 | 0 | 0 | 10(00001010) |
| 0 | 0 | 0 | 0 | 0 | 11(00001011) |
| 0 | 0 | 0 | 0 | 0 | 12(00001100) |
| 0 | 0 | 0 | 0 | 0 | 13(00001101) |
| 0 | 0 | 0 | 0 | 0 | 14(00001110) |
| 0 | 0 | 0 | 0 | 0 | 15(00001111) |
| 0 | 0 | 0 | 0 | 0 | 16(00010000) |
| 0 | 0 | 0 | 0 | 0 | 17(00010001) |
| 0 | 0 | 0 | 0 | 0 | 18(00010010) |
| 1 | 0 | 0 | 0 | 0 | 19(00010011) |
| 0 | 1 | 0 | 0 | 0 | 20(00010100) |
| 0 | 0 | 1 | 0 | 0 | 21(00010101) |
| 0 | 0 | 0 | 1 | 0 | 22(00010110) |
| 0 | 0 | 0 | 0 | 1 | 23(00010111) |
| 0 | 0 | 0 | 0 | 0 | OTHER THAN THE ABOVE |

L1

F I G. 6

| OUTPUT SIGNAL (B") | | | | | | | | | | | | | | | | | | |
|---|---|---|---|---|---|---|---|---|---|---|---|---|---|---|---|---|---|---|
| B"24 | B"23 | B"22 | B"21 | B"20 | B"19 | B"18 | B"17 | B"16 | B"15 | B"14 | B"13 | B"12 | B"11 | B"10 | B"9 | B"8 | B"7 | B"6 |
| 0 | 1 | 0 | 0 | 0 | 0 | 0 | 0 | 0 | 0 | 0 | 0 | 0 | 0 | 0 | 0 | 0 | 0 | 0 |
| 0 | 0 | 1 | 0 | 0 | 0 | 0 | 0 | 0 | 0 | 0 | 0 | 0 | 0 | 0 | 0 | 0 | 0 | 0 |
| 0 | 0 | 0 | 1 | 0 | 0 | 0 | 0 | 0 | 0 | 0 | 0 | 0 | 0 | 0 | 0 | 0 | 0 | 0 |
| 0 | 0 | 0 | 0 | 1 | 0 | 0 | 0 | 0 | 0 | 0 | 0 | 0 | 0 | 0 | 0 | 0 | 0 | 0 |
| 0 | 0 | 0 | 0 | 0 | 1 | 0 | 0 | 0 | 0 | 0 | 0 | 0 | 0 | 0 | 0 | 0 | 0 | 0 |
| 0 | 0 | 0 | 0 | 0 | 0 | 1 | 0 | 0 | 0 | 0 | 0 | 0 | 0 | 0 | 0 | 0 | 0 | 0 |
| 0 | 0 | 0 | 0 | 0 | 0 | 0 | 1 | 0 | 0 | 0 | 0 | 0 | 0 | 0 | 0 | 0 | 0 | 0 |
| 0 | 0 | 0 | 0 | 0 | 0 | 0 | 0 | 1 | 0 | 0 | 0 | 0 | 0 | 0 | 0 | 0 | 0 | 0 |
| 0 | 0 | 0 | 0 | 0 | 0 | 0 | 0 | 0 | 1 | 0 | 0 | 0 | 0 | 0 | 0 | 0 | 0 | 0 |
| 0 | 0 | 0 | 0 | 0 | 0 | 0 | 0 | 0 | 0 | 1 | 0 | 0 | 0 | 0 | 0 | 0 | 0 | 0 |
| 0 | 0 | 0 | 0 | 0 | 0 | 0 | 0 | 0 | 0 | 0 | 1 | 0 | 0 | 0 | 0 | 0 | 0 | 0 |
| 0 | 0 | 0 | 0 | 0 | 0 | 0 | 0 | 0 | 0 | 0 | 0 | 1 | 0 | 0 | 0 | 0 | 0 | 0 |
| 0 | 0 | 0 | 0 | 0 | 0 | 0 | 0 | 0 | 0 | 0 | 0 | 0 | 1 | 0 | 0 | 0 | 0 | 0 |
| 0 | 0 | 0 | 0 | 0 | 0 | 0 | 0 | 0 | 0 | 0 | 0 | 0 | 0 | 1 | 0 | 0 | 0 | 0 |
| 0 | 0 | 0 | 0 | 0 | 0 | 0 | 0 | 0 | 0 | 0 | 0 | 0 | 0 | 0 | 1 | 0 | 0 | 0 |
| 0 | 0 | 0 | 0 | 0 | 0 | 0 | 0 | 0 | 0 | 0 | 0 | 0 | 0 | 0 | 0 | 1 | 0 | 0 |
| 0 | 0 | 0 | 0 | 0 | 0 | 0 | 0 | 0 | 0 | 0 | 0 | 0 | 0 | 0 | 0 | 0 | 1 | 0 |
| 0 | 0 | 0 | 0 | 0 | 0 | 0 | 0 | 0 | 0 | 0 | 0 | 0 | 0 | 0 | 0 | 0 | 0 | 1 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 | 0 | 0 | 0 |

L2

F I G. 7

| | | | | | | INPUT SIGNAL ( B ) | | | | | | | | |
|---|---|---|---|---|---|---|---|---|---|---|---|---|---|---|
| B"5 | B"4 | B"3 | B"2 | B"1 | B"0 | B23 | B22 | B21 | B20 | B19 | B18 | B17 | B16 | B15 |
| 0 | 0 | 0 | 0 | 0 | 0 | 1 | × | × | × | × | × | × | × | × |
| 0 | 0 | 0 | 0 | 0 | 0 | 0 | 1 | × | × | × | × | × | × | × |
| 0 | 0 | 0 | 0 | 0 | 0 | 0 | 0 | 1 | × | × | × | × | × | × |
| 0 | 0 | 0 | 0 | 0 | 0 | 0 | 0 | 0 | 1 | × | × | × | × | × |
| 0 | 0 | 0 | 0 | 0 | 0 | 0 | 0 | 0 | 0 | 1 | × | × | × | × |
| 0 | 0 | 0 | 0 | 0 | 0 | 0 | 0 | 0 | 0 | 0 | 1 | × | × | × |
| 0 | 0 | 0 | 0 | 0 | 0 | 0 | 0 | 0 | 0 | 0 | 0 | 1 | × | × |
| 0 | 0 | 0 | 0 | 0 | 0 | 0 | 0 | 0 | 0 | 0 | 0 | 0 | 1 | × |
| 0 | 0 | 0 | 0 | 0 | 0 | 0 | 0 | 0 | 0 | 0 | 0 | 0 | 0 | 1 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 |
| 0 | 1 | 0 | 0 | 0 | 0 | 0 | 0 | 0 | 0 | 0 | 0 | 0 | 0 | 0 |
| 0 | 0 | 1 | 0 | 0 | 0 | 0 | 0 | 0 | 0 | 0 | 0 | 0 | 0 | 0 |
| 0 | 0 | 0 | 1 | 0 | 0 | 0 | 0 | 0 | 0 | 0 | 0 | 0 | 0 | 0 |
| 0 | 0 | 0 | 0 | 1 | 0 | 0 | 0 | 0 | 0 | 0 | 0 | 0 | 0 | 0 |
| 0 | 0 | 0 | 0 | 0 | 1 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |

L2

( × INDICATES '0' OR '1' )

L3

| B14 | B13 | B12 | B11 | B10 | B9 | B8 | B7 | B6 | B5 | B4 | B3 | B2 | B1 | B0 |
|---|---|---|---|---|---|---|---|---|---|---|---|---|---|---|
| × | × | × | × | × | × | × | × | × | × | × | × | × | × | × |
| × | × | × | × | × | × | × | × | × | × | × | × | × | × | × |
| × | × | × | × | × | × | × | × | × | × | × | × | × | × | × |
| × | × | × | × | × | × | × | × | × | × | × | × | × | × | × |
| × | × | × | × | × | × | × | × | × | × | × | × | × | × | × |
| × | × | × | × | × | × | × | × | × | × | × | × | × | × | × |
| × | × | × | × | × | × | × | × | × | × | × | × | × | × | × |
| × | × | × | × | × | × | × | × | × | × | × | × | × | × | × |
| × | × | × | × | × | × | × | × | × | × | × | × | × | × | × |
| 1 | × | × | × | × | × | × | × | × | × | × | × | × | × | × |
| 0 | 1 | × | × | × | × | × | × | × | × | × | × | × | × | × |
| 0 | 0 | 1 | × | × | × | × | × | × | × | × | × | × | × | × |
| 0 | 0 | 0 | 1 | × | × | × | × | × | × | × | × | × | × | × |
| 0 | 0 | 0 | 0 | 1 | × | × | × | × | × | × | × | × | × | × |
| 0 | 0 | 0 | 0 | 0 | 1 | × | × | × | × | × | × | × | × | × |
| 0 | 0 | 0 | 0 | 0 | 0 | 1 | × | × | × | × | × | × | × | × |
| 0 | 0 | 0 | 0 | 0 | 0 | 0 | 1 | × | × | × | × | × | × | × |
| 0 | 0 | 0 | 0 | 0 | 0 | 0 | 0 | 1 | × | × | × | × | × | × |
| 0 | 0 | 0 | 0 | 0 | 0 | 0 | 0 | 0 | 1 | × | × | × | × | × |
| 0 | 0 | 0 | 0 | 0 | 0 | 0 | 0 | 0 | 0 | 1 | × | × | × | × |
| 0 | 0 | 0 | 0 | 0 | 0 | 0 | 0 | 0 | 0 | 0 | 1 | × | × | × |
| 0 | 0 | 0 | 0 | 0 | 0 | 0 | 0 | 0 | 0 | 0 | 0 | 1 | × | × |
| 0 | 0 | 0 | 0 | 0 | 0 | 0 | 0 | 0 | 0 | 0 | 0 | 0 | 1 | × |
| 0 | 0 | 0 | 0 | 0 | 0 | 0 | 0 | 0 | 0 | 0 | 0 | 0 | 0 | 1 |
| 0 | 0 | 0 | 0 | 0 | 0 | 0 | 0 | 0 | 0 | 0 | 0 | 0 | 0 | 0 |

F I G. 9
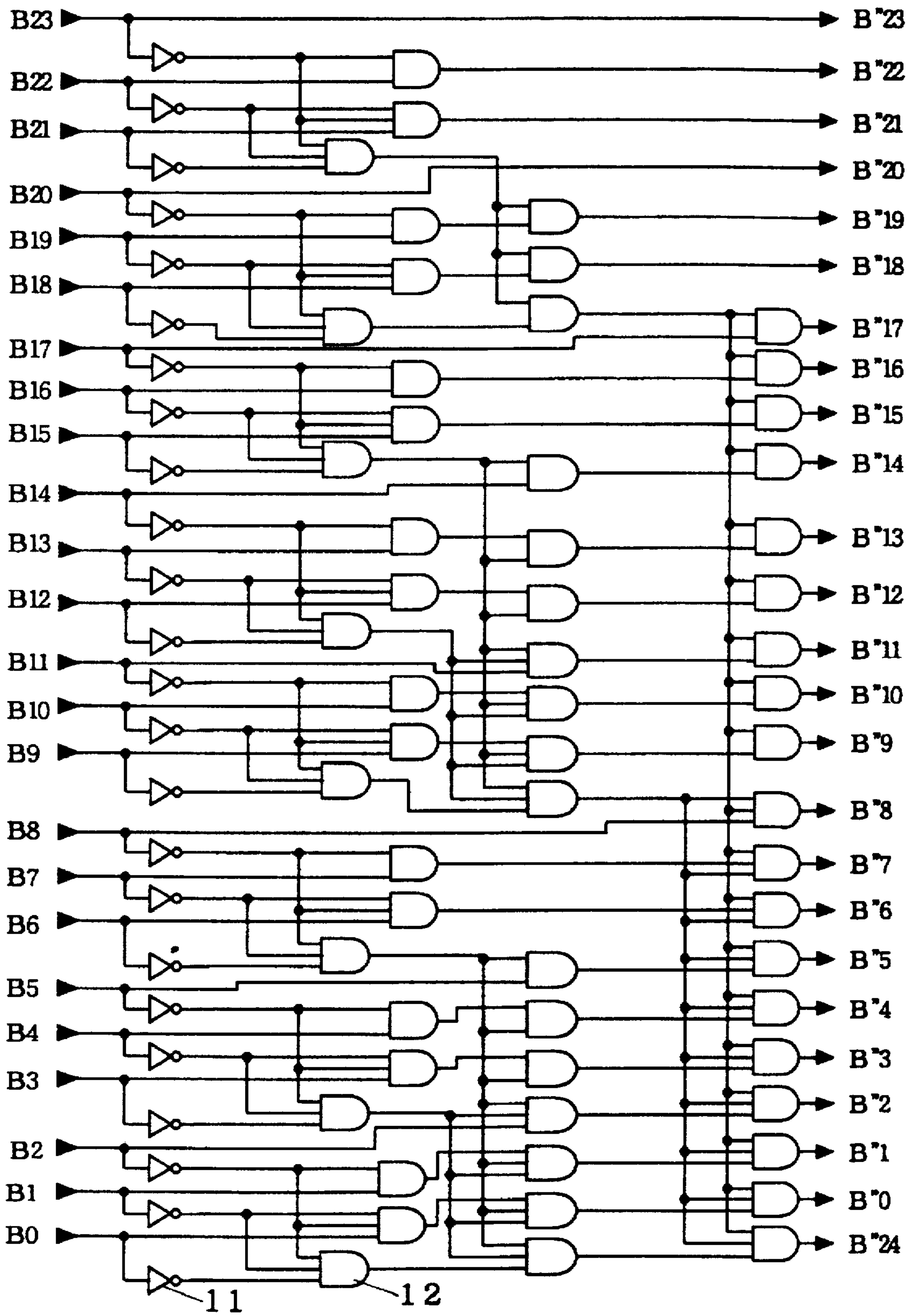

FIG. 10

(WHEN INPUT IS 24 BITS LONG)

| OUTPUT VALUE(B') BINARY VALUE IN ( ) | INPUT SIGNAL ( B ) | | | | | | | | | | | | | | | |
|---|---|---|---|---|---|---|---|---|---|---|---|---|---|---|---|---|
| | B23 | B22 | B21 | B20 | B19 | B18 | B17 | B16 | B15 | B14 | B13 | B12 | B11 | B10 | B9 | B8 |
| 0(00000) | 1 | × | × | × | × | × | × | × | × | × | × | × | × | × | × | × |
| 1(00001) | 0 | 1 | × | × | × | × | × | × | × | × | × | × | × | × | × | × |
| 2(00010) | 0 | 0 | 1 | × | × | × | × | × | × | × | × | × | × | × | × | × |
| 3(00011) | 0 | 0 | 0 | 1 | × | × | × | × | × | × | × | × | × | × | × | × |
| 4(00100) | 0 | 0 | 0 | 0 | 1 | × | × | × | × | × | × | × | × | × | × | × |
| 5(00101) | 0 | 0 | 0 | 0 | 0 | 1 | × | × | × | × | × | × | × | × | × | × |
| 6(00110) | 0 | 0 | 0 | 0 | 0 | 0 | 1 | × | × | × | × | × | × | × | × | × |
| 7(00111) | 0 | 0 | 0 | 0 | 0 | 0 | 0 | 1 | × | × | × | × | × | × | × | × |
| 8(01000) | 0 | 0 | 0 | 0 | 0 | 0 | 0 | 0 | 1 | × | × | × | × | × | × | × |
| 9(01001) | 0 | 0 | 0 | 0 | 0 | 0 | 0 | 0 | 0 | 1 | × | × | × | × | × | × |
| 10(01010) | 0 | 0 | 0 | 0 | 0 | 0 | 0 | 0 | 0 | 0 | 1 | × | × | × | × | × |
| 11(01011) | 0 | 0 | 0 | 0 | 0 | 0 | 0 | 0 | 0 | 0 | 0 | 1 | × | × | × | × |
| 12(01100) | 0 | 0 | 0 | 0 | 0 | 0 | 0 | 0 | 0 | 0 | 0 | 0 | 1 | × | × | × |
| 13(01101) | 0 | 0 | 0 | 0 | 0 | 0 | 0 | 0 | 0 | 0 | 0 | 0 | 0 | 1 | × | × |
| 14(01110) | 0 | 0 | 0 | 0 | 0 | 0 | 0 | 0 | 0 | 0 | 0 | 0 | 0 | 0 | 1 | × |
| 15(01111) | 0 | 0 | 0 | 0 | 0 | 0 | 0 | 0 | 0 | 0 | 0 | 0 | 0 | 0 | 0 | 1 |
| 16(10000) | 0 | 0 | 0 | 0 | 0 | 0 | 0 | 0 | 0 | 0 | 0 | 0 | 0 | 0 | 0 | 0 |
| 17(10001) | 0 | 0 | 0 | 0 | 0 | 0 | 0 | 0 | 0 | 0 | 0 | 0 | 0 | 0 | 0 | 0 |
| 18(10010) | 0 | 0 | 0 | 0 | 0 | 0 | 0 | 0 | 0 | 0 | 0 | 0 | 0 | 0 | 0 | 0 |
| 19(10011) | 0 | 0 | 0 | 0 | 0 | 0 | 0 | 0 | 0 | 0 | 0 | 0 | 0 | 0 | 0 | 0 |
| 20(10100) | 0 | 0 | 0 | 0 | 0 | 0 | 0 | 0 | 0 | 0 | 0 | 0 | 0 | 0 | 0 | 0 |
| 21(10101) | 0 | 0 | 0 | 0 | 0 | 0 | 0 | 0 | 0 | 0 | 0 | 0 | 0 | 0 | 0 | 0 |
| 22(10110) | 0 | 0 | 0 | 0 | 0 | 0 | 0 | 0 | 0 | 0 | 0 | 0 | 0 | 0 | 0 | 0 |
| 23(10111) | 0 | 0 | 0 | 0 | 0 | 0 | 0 | 0 | 0 | 0 | 0 | 0 | 0 | 0 | 0 | 0 |
| 0(00000) | 0 | 0 | 0 | 0 | 0 | 0 | 0 | 0 | 0 | 0 | 0 | 0 | 0 | 0 | 0 | 0 |

L4

| B7 | B6 | B5 | B4 | B3 | B2 | B1 | B0 |
|---|---|---|---|---|---|---|---|
| × | × | × | × | × | × | × | × |
| × | × | × | × | × | × | × | × |
| × | × | × | × | × | × | × | × |
| × | × | × | × | × | × | × | × |
| × | × | × | × | × | × | × | × |
| × | × | × | × | × | × | × | × |
| × | × | × | × | × | × | × | × |
| × | × | × | × | × | × | × | × |
| × | × | × | × | × | × | × | × |
| × | × | × | × | × | × | × | × |
| × | × | × | × | × | × | × | × |
| × | × | × | × | × | × | × | × |
| × | × | × | × | × | × | × | × |
| × | × | × | × | × | × | × | × |
| × | × | × | × | × | × | × | × |
| × | × | × | × | × | × | × | × |
| 1 | × | × | × | × | × | × | × |
| 0 | 1 | × | × | × | × | × | × |
| 0 | 0 | 1 | × | × | × | × | × |
| 0 | 0 | 0 | 1 | × | × | × | × |
| 0 | 0 | 0 | 0 | 1 | × | × | × |
| 0 | 0 | 0 | 0 | 0 | 1 | × | × |
| 0 | 0 | 0 | 0 | 0 | 0 | 1 | × |
| 0 | 0 | 0 | 0 | 0 | 0 | 0 | 1 |
| 0 | 0 | 0 | 0 | 0 | 0 | 0 | 0 |

L4 (× INDICATES '0' OR '1')

OUTPUT SIGNAL A"

| | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|
| | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 |
| | 1 | 1 | 1 | 1 | 0 | 0 | 0 | 0 | 0 | 0 | 0 | 0 | 0 | 0 | 1 | 0 | 0 | 0 | 0 | 0 | 0 | 0 | 0 | 0 |
| | 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 |
| | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 |
| | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 |
| | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 |
| | 1 | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 |
| | 1 | 1 | 1 | 1 | 1 | 1 | 1 | 1 | 1 | 1 | 0 | 0 | 0 | 0 | 0 | 0 | 0 | 0 | 0 | 0 | 0 | 0 | 0 | 0 |
| | 1 | 1 | 1 | 1 | 1 | 1 | 1 | 1 | 1 | 1 | 1 | 0 | 0 | 0 | 0 | 0 | 0 | 0 | 0 | 0 | 0 | 0 | 0 | 0 |
| | 1 | 1 | 1 | 1 | 1 | 1 | 1 | 1 | 1 | 1 | 1 | 1 | 0 | 0 | 0 | 0 | 0 | 0 | 0 | 0 | 0 | 0 | 0 | 0 |
| | 1 | 1 | 1 | 1 | 1 | 1 | 1 | 1 | 1 | 1 | 1 | 1 | 1 | 0 | 0 | 0 | 0 | 0 | 0 | 0 | 0 | 0 | 0 | 0 |
| | 1 | 1 | 1 | 1 | 1 | 1 | 1 | 1 | 1 | 1 | 1 | 1 | 1 | 1 | 0 | 0 | 0 | 0 | 0 | 0 | 0 | 0 | 0 | 0 |
| | 1 | 1 | 1 | 1 | 1 | 1 | 1 | 1 | 1 | 1 | 1 | 1 | 1 | 1 | 1 | 0 | 0 | 0 | 0 | 0 | 0 | 0 | 0 | 0 |
| | 1 | 1 | 1 | 1 | 1 | 1 | 1 | 1 | 1 | 1 | 1 | 1 | 1 | 1 | 1 | 1 | 0 | 0 | 0 | 0 | 0 | 0 | 0 | 0 |
| | 1 | 1 | 1 | 1 | 1 | 1 | 1 | 1 | 1 | 1 | 1 | 1 | 1 | 1 | 1 | 1 | 1 | 0 | 0 | 0 | 0 | 0 | 0 | 0 |
| | 1 | 1 | 1 | 1 | 1 | 1 | 1 | 1 | 1 | 1 | 1 | 1 | 1 | 1 | 1 | 1 | 1 | 1 | 0 | 0 | 0 | 0 | 0 | 0 |
| | 1 | 1 | 1 | 1 | 1 | 1 | 1 | 1 | 1 | 1 | 1 | 1 | 1 | 1 | 1 | 1 | 1 | 1 | 1 | 0 | 0 | 0 | 0 | 0 |
| | 1 | 1 | 1 | 1 | 1 | 1 | 1 | 1 | 1 | 1 | 1 | 1 | 1 | 1 | 1 | 1 | 1 | 1 | 1 | 1 | 0 | 0 | 0 | 0 |
| | 1 | 1 | 1 | 1 | 1 | 1 | 1 | 1 | 1 | 1 | 1 | 1 | 1 | 1 | 1 | 1 | 1 | 1 | 1 | 1 | 1 | 0 | 0 | 0 |
| | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 0 | 0 |
| | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 0 |
| L5 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |

FIG. 13

| | INPUT SIGNAL A | | | | | | | | |
|---|---|---|---|---|---|---|---|---|---|
| | 7 | 6 | 5 | 4 | 3 | 2 | 1 | 0 | |
| 0 | 0 | 0 | 0 | 0 | 0 | 0 | 0 | 0 | |
| 1 | 0 | 0 | 0 | 0 | 0 | 0 | 0 | 1 | |
| 2 | 0 | 0 | 0 | 0 | 0 | 0 | 1 | 0 | |
| 3 | 0 | 0 | 0 | 0 | 0 | 0 | 1 | 1 | |
| 4 | 0 | 0 | 0 | 0 | 0 | 1 | 0 | 0 | |
| 5 | 0 | 0 | 0 | 0 | 0 | 1 | 0 | 1 | |
| 6 | 0 | 0 | 0 | 0 | 0 | 1 | 1 | 0 | |
| 7 | 0 | 0 | 0 | 0 | 0 | 1 | 1 | 1 | |
| 8 | 0 | 0 | 0 | 0 | 1 | 0 | 0 | 0 | |
| 9 | 0 | 0 | 0 | 0 | 1 | 0 | 0 | 1 | |
| 10 | 0 | 0 | 0 | 0 | 1 | 0 | 1 | 0 | |
| 11 | 0 | 0 | 0 | 0 | 1 | 0 | 1 | 1 | |
| 12 | 0 | 0 | 0 | 0 | 1 | 1 | 0 | 0 | |
| 13 | 0 | 0 | 0 | 0 | 1 | 1 | 0 | 1 | |
| 14 | 0 | 0 | 0 | 0 | 1 | 1 | 1 | 0 | |
| 15 | 0 | 0 | 0 | 0 | 1 | 1 | 1 | 1 | |
| 16 | 0 | 0 | 0 | 1 | 0 | 0 | 0 | 0 | |
| 17 | 0 | 0 | 0 | 1 | 0 | 0 | 0 | 1 | |
| 18 | 0 | 0 | 0 | 1 | 0 | 0 | 1 | 0 | |
| 19 | 0 | 0 | 0 | 1 | 0 | 0 | 1 | 1 | |
| 20 | 0 | 0 | 0 | 1 | 0 | 1 | 0 | 0 | |
| 21 | 0 | 0 | 0 | 1 | 0 | 1 | 0 | 1 | |
| 22 | 0 | 0 | 0 | 1 | 0 | 1 | 1 | 0 | |
| 23 | 0 | 0 | 0 | 1 | 0 | 1 | 1 | 1 | |
| OTHER THAN THE ABOVE | | | | | | | | | |

| OUTPUT SIGNAL ( E ) | | | | | | | | | | | | | | | | | | |
|---|---|---|---|---|---|---|---|---|---|---|---|---|---|---|---|---|---|---|
| E23 | E22 | E21 | E20 | E19 | E18 | E17 | E16 | E15 | E14 | E13 | E12 | E11 | E10 | E9 | E8 | E7 | E6 | E5 |
| B23 | B22 | B21 | B20 | B19 | B18 | B17 | B16 | B15 | B14 | B13 | B12 | B11 | B10 | B9 | B8 | B7 | B6 | B5 |
| B22 | B21 | B20 | B19 | B18 | B17 | B16 | B15 | B14 | B13 | B12 | B11 | B10 | B9 | B8 | B7 | B6 | B5 | B4 |
| B21 | B20 | B19 | B18 | B17 | B16 | B15 | B14 | B13 | B12 | B11 | B10 | B9 | B8 | B7 | B6 | B5 | B4 | B3 |
| B20 | B19 | B18 | B17 | B16 | B15 | B14 | B13 | B12 | B11 | B10 | B9 | B8 | B7 | B6 | B5 | B4 | B3 | B2 |
| B19 | B18 | B17 | B16 | B15 | B14 | B13 | B12 | B11 | B10 | B9 | B8 | B7 | B6 | B5 | B4 | B3 | B2 | B1 |
| B18 | B17 | B16 | B15 | B14 | B13 | B12 | B11 | B10 | B9 | B8 | B7 | B6 | B5 | B4 | B3 | B2 | B1 | B0 |
| B17 | B16 | B15 | B14 | B13 | B12 | B11 | B10 | B9 | B8 | B7 | B6 | B5 | B4 | B3 | B2 | B1 | B0 | 0 |
| B16 | B15 | B14 | B13 | B12 | B11 | B10 | B9 | B8 | B7 | B6 | B5 | B4 | B3 | B2 | B1 | B0 | 0 | 0 |
| B15 | B14 | B13 | B12 | B11 | B10 | B9 | B8 | B7 | B6 | B5 | B4 | B3 | B2 | B1 | B0 | 0 | 0 | 0 |
| B14 | B13 | B12 | B11 | B10 | B9 | B8 | B7 | B6 | B5 | B4 | B3 | B2 | B1 | B0 | 0 | 0 | 0 | 0 |
| B13 | B12 | B11 | B10 | B9 | B8 | B7 | B6 | B5 | B4 | B3 | B2 | B2 | B0 | 0 | 0 | 0 | 0 | 0 |
| B12 | B11 | B10 | B9 | B8 | B7 | B6 | B5 | B4 | B3 | B2 | B1 | B0 | 0 | 0 | 0 | 0 | 0 | 0 |
| B11 | B10 | B9 | B8 | B7 | B6 | B5 | B4 | B3 | B2 | B1 | B0 | 0 | 0 | 0 | 0 | 0 | 0 | 0 |
| B10 | B9 | B8 | B7 | B6 | B5 | B4 | B3 | B2 | B1 | B0 | 0 | 0 | 0 | 0 | 0 | 0 | 0 | 0 |
| B9 | B8 | B7 | B6 | B5 | B4 | B3 | B2 | B1 | B0 | 0 | 0 | 0 | 0 | 0 | 0 | 0 | 0 | 0 |
| B8 | B7 | B6 | B5 | B4 | B3 | B2 | B1 | B0 | 0 | 0 | 0 | 0 | 0 | 0 | 0 | 0 | 0 | 0 |
| B7 | B6 | B5 | B4 | B3 | B2 | B1 | B0 | 0 | 0 | 0 | 0 | 0 | 0 | 0 | 0 | 0 | 0 | 0 |
| B6 | B5 | B4 | B3 | B2 | B1 | B0 | 0 | 0 | 0 | 0 | 0 | 0 | 0 | 0 | 0 | 0 | 0 | 0 |
| B5 | B4 | B3 | B2 | B1 | B0 | 0 | 0 | 0 | 0 | 0 | 0 | 0 | 0 | 0 | 0 | 0 | 0 | 0 |
| B4 | B3 | B2 | B1 | B0 | 0 | 0 | 0 | 0 | 0 | 0 | 0 | 0 | 0 | 0 | 0 | 0 | 0 | 0 |
| B3 | B2 | B1 | B0 | 0 | 0 | 0 | 0 | 0 | 0 | 0 | 0 | 0 | 0 | 0 | 0 | 0 | 0 | 0 |
| B2 | B1 | B0 | 0 | 0 | 0 | 0 | 0 | 0 | 0 | 0 | 0 | 0 | 0 | 0 | 0 | 0 | 0 | 0 |
| B1 | B0 | 0 | 0 | 0 | 0 | 0 | 0 | 0 | 0 | 0 | 0 | 0 | 0 | 0 | 0 | 0 | 0 | 0 |
| B0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |

| | | | | | CONTROL SIGNAL (D) | | | | | | | | | | | | | |
|---|---|---|---|---|---|---|---|---|---|---|---|---|---|---|---|---|---|---|
| | | | | | T0 | T1 | T2 | T3 | T4 | T5 | T6 | T7 | T8 | T9 | T10 | T11 | T12 | T13 |
| E4 | E3 | E2 | E1 | E0 | D24 | D23 | D22 | D21 | D20 | D19 | D18 | D17 | D16 | D15 | D14 | D13 | D12 | D11 |
| B4 | B3 | B2 | B1 | B0 | 0 | 1 | 0 | 0 | 0 | 0 | 0 | 0 | 0 | 0 | 0 | 0 | 0 | 0 |
| B3 | B2 | B1 | B0 | 0 | 0 | 0 | 1 | 0 | 0 | 0 | 0 | 0 | 0 | 0 | 0 | 0 | 0 | 0 |
| B2 | B1 | B0 | 0 | 0 | 0 | 0 | 0 | 1 | 0 | 0 | 0 | 0 | 0 | 0 | 0 | 0 | 0 | 0 |
| B1 | B0 | 0 | 0 | 0 | 0 | 0 | 0 | 0 | 1 | 0 | 0 | 0 | 0 | 0 | 0 | 0 | 0 | 0 |
| B0 | 0 | 0 | 0 | 0 | 0 | 0 | 0 | 0 | 0 | 1 | 0 | 0 | 0 | 0 | 0 | 0 | 0 | 0 |
| 0 | 0 | 0 | 0 | 0 | 0 | 0 | 0 | 0 | 0 | 0 | 1 | 0 | 0 | 0 | 0 | 0 | 0 | 0 |
| 0 | 0 | 0 | 0 | 0 | 0 | 0 | 0 | 0 | 0 | 0 | 0 | 1 | 0 | 0 | 0 | 0 | 0 | 0 |
| 0 | 0 | 0 | 0 | 0 | 0 | 0 | 0 | 0 | 0 | 0 | 0 | 0 | 1 | 0 | 0 | 0 | 0 | 0 |
| 0 | 0 | 0 | 0 | 0 | 0 | 0 | 0 | 0 | 0 | 0 | 0 | 0 | 0 | 1 | 0 | 0 | 0 | 0 |
| 0 | 0 | 0 | 0 | 0 | 0 | 0 | 0 | 0 | 0 | 0 | 0 | 0 | 0 | 0 | 1 | 0 | 0 | 0 |
| 0 | 0 | 0 | 0 | 0 | 0 | 0 | 0 | 0 | 0 | 0 | 0 | 0 | 0 | 0 | 0 | 1 | 0 | 0 |
| 0 | 0 | 0 | 0 | 0 | 0 | 0 | 0 | 0 | 0 | 0 | 0 | 0 | 0 | 0 | 0 | 0 | 1 | 0 |
| 0 | 0 | 0 | 0 | 0 | 0 | 0 | 0 | 0 | 0 | 0 | 0 | 0 | 0 | 0 | 0 | 0 | 0 | 1 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 1 | 0 | 0 | 0 | 0 | 0 | 0 | 0 | 0 | 0 | 0 | 0 | 0 | 0 |

| (D) | | | | | | | | | | |
|---|---|---|---|---|---|---|---|---|---|---|
| T14 | T15 | T16 | T17 | T18 | T19 | T20 | T21 | T22 | T23 | T24 |
| D10 | D9 | D8 | D7 | D6 | D5 | D4 | D3 | D2 | D1 | D0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 1 | 0 | 0 | 0 | 0 | 0 | 0 | 0 | 0 | 0 | 0 |
| 0 | 1 | 0 | 0 | 0 | 0 | 0 | 0 | 0 | 0 | 0 |
| 0 | 0 | 1 | 0 | 0 | 0 | 0 | 0 | 0 | 0 | 0 |
| 0 | 0 | 0 | 1 | 0 | 0 | 0 | 0 | 0 | 0 | 0 |
| 0 | 0 | 0 | 0 | 1 | 0 | 0 | 0 | 0 | 0 | 0 |
| 0 | 0 | 0 | 0 | 0 | 1 | 0 | 0 | 0 | 0 | 0 |
| 0 | 0 | 0 | 0 | 0 | 0 | 1 | 0 | 0 | 0 | 0 |
| 0 | 0 | 0 | 0 | 0 | 0 | 0 | 1 | 0 | 0 | 0 |
| 0 | 0 | 0 | 0 | 0 | 0 | 0 | 0 | 1 | 0 | 0 |
| 0 | 0 | 0 | 0 | 0 | 0 | 0 | 0 | 0 | 1 | 0 |
| 0 | 0 | 0 | 0 | 0 | 0 | 0 | 0 | 0 | 0 | 1 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |

| OUTPUT SIGNAL A'' | | | | | | | | | | | | | | | | | | | | | | | |
|---|---|---|---|---|---|---|---|---|---|---|---|---|---|---|---|---|---|---|---|---|---|---|---|
| 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 1 | 1 | 0 | 0 | 0 | 0 | 0 | 0 | 0 | 0 | 0 | 0 | 0 | 1 | 0 | 0 | 0 | 0 | 0 | 0 | 0 | 0 | 0 |
| 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 |
| 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 |
| 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 |
| 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 |
| 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 |
| 1 | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 |
| 1 | 1 | 1 | 1 | 1 | 1 | 1 | 1 | 1 | 1 | 0 | 0 | 0 | 0 | 0 | 0 | 0 | 0 | 0 | 0 | 0 | 0 | 0 | 0 |
| 1 | 1 | 1 | 1 | 1 | 1 | 1 | 1 | 1 | 1 | 1 | 0 | 0 | 0 | 0 | 0 | 0 | 0 | 0 | 0 | 0 | 0 | 0 | 0 |
| 1 | 1 | 1 | 1 | 1 | 1 | 1 | 1 | 1 | 1 | 1 | 1 | 0 | 0 | 0 | 0 | 0 | 0 | 0 | 0 | 0 | 0 | 0 | 0 |
| 1 | 1 | 1 | 1 | 1 | 1 | 1 | 1 | 1 | 1 | 1 | 1 | 1 | 0 | 0 | 0 | 0 | 0 | 0 | 0 | 0 | 0 | 0 | 0 |
| 1 | 1 | 1 | 1 | 1 | 1 | 1 | 1 | 1 | 1 | 1 | 1 | 1 | 1 | 0 | 0 | 0 | 0 | 0 | 0 | 0 | 0 | 0 | 0 |
| 1 | 1 | 1 | 1 | 1 | 1 | 1 | 1 | 1 | 1 | 1 | 1 | 1 | 1 | 1 | 0 | 0 | 0 | 0 | 0 | 0 | 0 | 0 | 0 |
| 1 | 1 | 1 | 1 | 1 | 1 | 1 | 1 | 1 | 1 | 1 | 1 | 1 | 1 | 1 | 1 | 0 | 0 | 0 | 0 | 0 | 0 | 0 | 0 |
| 1 | 1 | 1 | 1 | 1 | 1 | 1 | 1 | 1 | 1 | 1 | 1 | 1 | 1 | 1 | 1 | 1 | 0 | 0 | 0 | 0 | 0 | 0 | 0 |
| 1 | 1 | 1 | 1 | 1 | 1 | 1 | 1 | 1 | 1 | 1 | 1 | 1 | 1 | 1 | 1 | 1 | 1 | 0 | 0 | 0 | 0 | 0 | 0 |
| 1 | 1 | 1 | 1 | 1 | 1 | 1 | 1 | 1 | 1 | 1 | 1 | 1 | 1 | 1 | 1 | 1 | 1 | 1 | 0 | 0 | 0 | 0 | 0 |
| 1 | 1 | 1 | 1 | 1 | 1 | 1 | 1 | 1 | 1 | 1 | 1 | 1 | 1 | 1 | 1 | 1 | 1 | 1 | 1 | 0 | 0 | 0 | 0 |
| 1 | 1 | 1 | 1 | 1 | 1 | 1 | 1 | 1 | 1 | 1 | 1 | 1 | 1 | 1 | 1 | 1 | 1 | 1 | 1 | 1 | 0 | 0 | 0 |
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 0 | 0 |
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 0 |
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |

FIG. 21

| | INPUT SIGNAL A | | | | | | | |
|---|---|---|---|---|---|---|---|---|
| | 7 | 6 | 5 | 4 | 3 | 2 | 1 | 0 |
| 0 | 0 | 0 | 0 | 0 | 0 | 0 | 0 | 0 |
| 1 | 0 | 0 | 0 | 0 | 0 | 0 | 0 | 1 |
| 2 | 0 | 0 | 0 | 0 | 0 | 0 | 1 | 0 |
| 3 | 0 | 0 | 0 | 0 | 0 | 0 | 1 | 1 |
| 4 | 0 | 0 | 0 | 0 | 0 | 1 | 0 | 0 |
| 5 | 0 | 0 | 0 | 0 | 0 | 1 | 0 | 1 |
| 6 | 0 | 0 | 0 | 0 | 0 | 1 | 1 | 0 |
| 7 | 0 | 0 | 0 | 0 | 0 | 1 | 1 | 1 |
| 8 | 0 | 0 | 0 | 0 | 1 | 0 | 0 | 0 |
| 9 | 0 | 0 | 0 | 0 | 1 | 0 | 0 | 1 |
| 10 | 0 | 0 | 0 | 0 | 1 | 0 | 1 | 0 |
| 11 | 0 | 0 | 0 | 0 | 1 | 0 | 1 | 1 |
| 12 | 0 | 0 | 0 | 0 | 1 | 1 | 0 | 0 |
| 13 | 0 | 0 | 0 | 0 | 1 | 1 | 0 | 1 |
| 14 | 0 | 0 | 0 | 0 | 1 | 1 | 1 | 0 |
| 15 | 0 | 0 | 0 | 0 | 1 | 1 | 1 | 1 |
| 16 | 0 | 0 | 0 | 1 | 0 | 0 | 0 | 0 |
| 17 | 0 | 0 | 0 | 1 | 0 | 0 | 0 | 1 |
| 18 | 0 | 0 | 0 | 1 | 0 | 0 | 1 | 0 |
| 19 | 0 | 0 | 0 | 1 | 0 | 0 | 1 | 1 |
| 20 | 0 | 0 | 0 | 1 | 0 | 1 | 0 | 0 |
| 21 | 0 | 0 | 0 | 1 | 0 | 1 | 0 | 1 |
| 22 | 0 | 0 | 0 | 1 | 0 | 1 | 1 | 0 |
| 23 | 0 | 0 | 0 | 1 | 0 | 1 | 1 | 1 |
| | OTHER THAN THE ABOVE | | | | | | | |

L9

F I G. 2 3
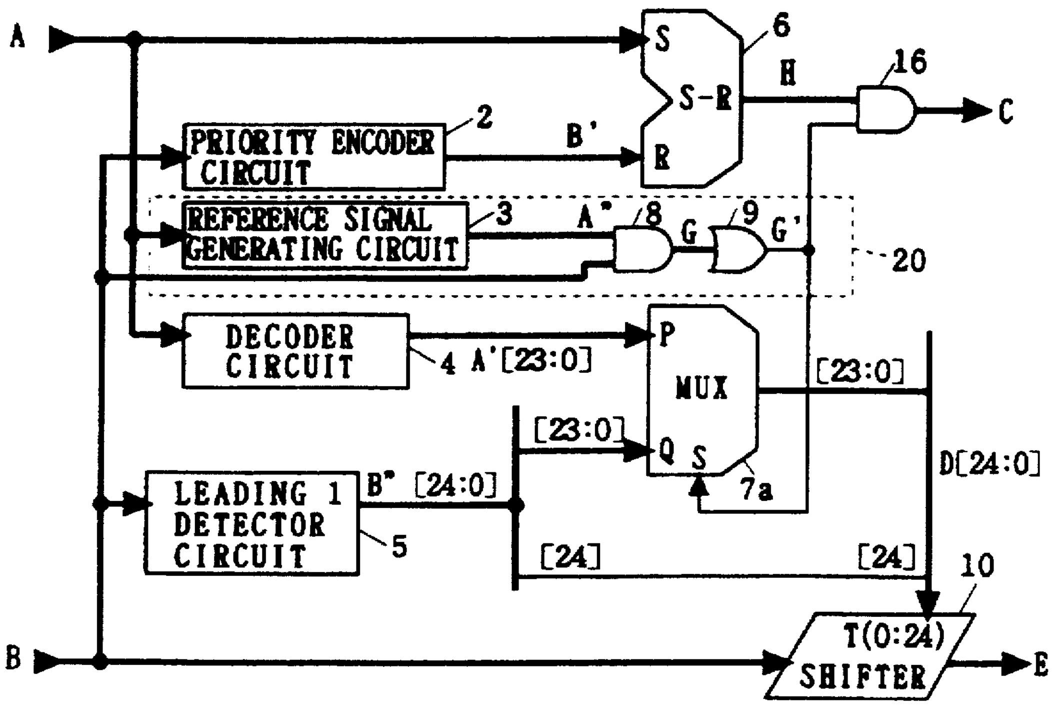
F I G. 2 4
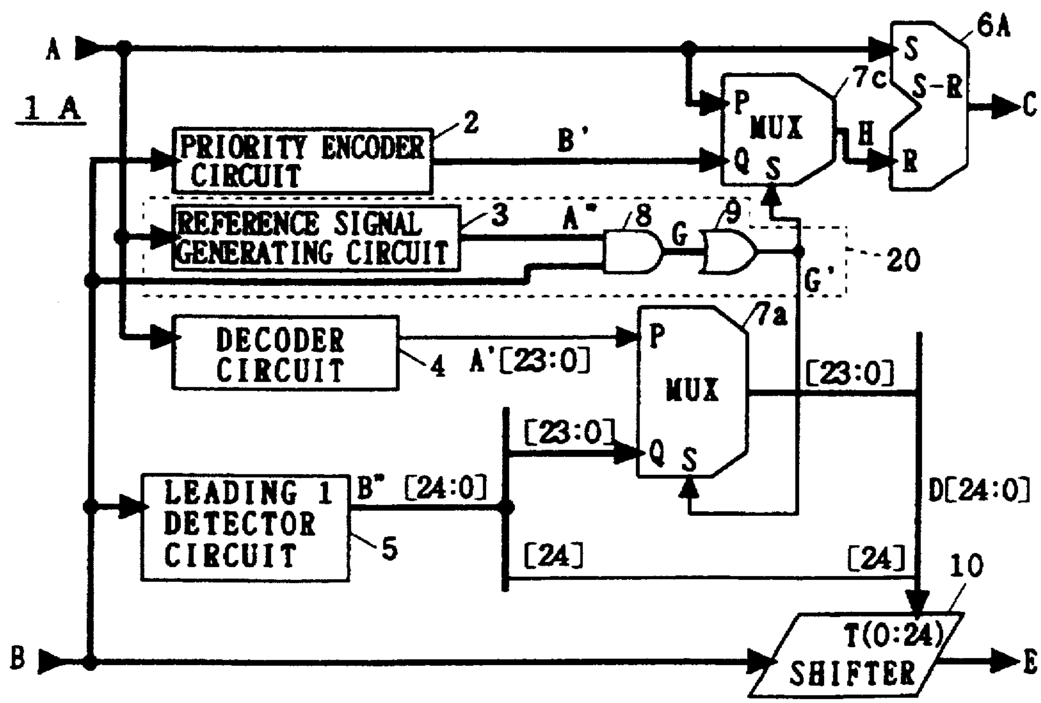

F I G. 2 5
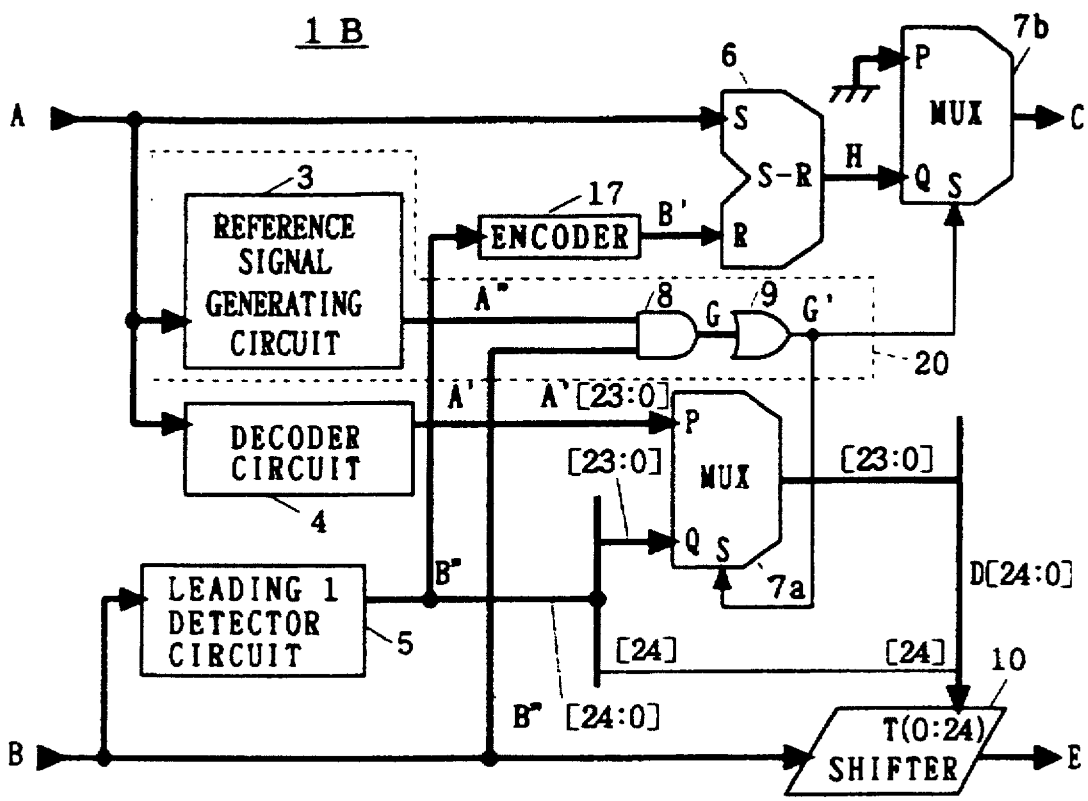

F I G. 2 6

WHEN INPUT IS 25 BITS LONG

| OUTPUT VALUE(B') | INPUT SIGNAL ( B" ) | | | | | | | | | | | | | | | |
|---|---|---|---|---|---|---|---|---|---|---|---|---|---|---|---|---|
| BINARY VALUE IN() | B"24 | B"23 | B"22 | B"21 | B"20 | B"19 | B"18 | B"17 | B"16 | B"15 | B"14 | B"13 | B"12 | B"11 | B"10 | B"9 |
| 0(00000000) | 1 | 0 | 0 | 0 | 0 | 0 | 0 | 0 | 0 | 0 | 0 | 0 | 0 | 0 | 0 | 0 |
| 0(00000000) | 0 | 1 | 0 | 0 | 0 | 0 | 0 | 0 | 0 | 0 | 0 | 0 | 0 | 0 | 0 | 0 |
| 1(00000001) | 0 | 0 | 1 | 0 | 0 | 0 | 0 | 0 | 0 | 0 | 0 | 0 | 0 | 0 | 0 | 0 |
| 2(00000010) | 0 | 0 | 0 | 1 | 0 | 0 | 0 | 0 | 0 | 0 | 0 | 0 | 0 | 0 | 0 | 0 |
| 3(00000011) | 0 | 0 | 0 | 0 | 1 | 0 | 0 | 0 | 0 | 0 | 0 | 0 | 0 | 0 | 0 | 0 |
| 4(00000100) | 0 | 0 | 0 | 0 | 0 | 1 | 0 | 0 | 0 | 0 | 0 | 0 | 0 | 0 | 0 | 0 |
| 5(00000101) | 0 | 0 | 0 | 0 | 0 | 0 | 1 | 0 | 0 | 0 | 0 | 0 | 0 | 0 | 0 | 0 |
| 6(00000110) | 0 | 0 | 0 | 0 | 0 | 0 | 0 | 1 | 0 | 0 | 0 | 0 | 0 | 0 | 0 | 0 |
| 7(00000111) | 0 | 0 | 0 | 0 | 0 | 0 | 0 | 0 | 1 | 0 | 0 | 0 | 0 | 0 | 0 | 0 |
| 8(00001000) | 0 | 0 | 0 | 0 | 0 | 0 | 0 | 0 | 0 | 1 | 0 | 0 | 0 | 0 | 0 | 0 |
| 9(00001001) | 0 | 0 | 0 | 0 | 0 | 0 | 0 | 0 | 0 | 0 | 1 | 0 | 0 | 0 | 0 | 0 |
| 10(00001010) | 0 | 0 | 0 | 0 | 0 | 0 | 0 | 0 | 0 | 0 | 0 | 1 | 0 | 0 | 0 | 0 |
| 11(00001011) | 0 | 0 | 0 | 0 | 0 | 0 | 0 | 0 | 0 | 0 | 0 | 0 | 1 | 0 | 0 | 0 |
| 12(00001100) | 0 | 0 | 0 | 0 | 0 | 0 | 0 | 0 | 0 | 0 | 0 | 0 | 0 | 1 | 0 | 0 |
| 13(00001101) | 0 | 0 | 0 | 0 | 0 | 0 | 0 | 0 | 0 | 0 | 0 | 0 | 0 | 0 | 1 | 0 |
| 14(00001110) | 0 | 0 | 0 | 0 | 0 | 0 | 0 | 0 | 0 | 0 | 0 | 0 | 0 | 0 | 0 | 1 |
| 15(00001111) | 0 | 0 | 0 | 0 | 0 | 0 | 0 | 0 | 0 | 0 | 0 | 0 | 0 | 0 | 0 | 0 |
| 16(00010000) | 0 | 0 | 0 | 0 | 0 | 0 | 0 | 0 | 0 | 0 | 0 | 0 | 0 | 0 | 0 | 0 |
| 17(00010001) | 0 | 0 | 0 | 0 | 0 | 0 | 0 | 0 | 0 | 0 | 0 | 0 | 0 | 0 | 0 | 0 |
| 18(00010010) | 0 | 0 | 0 | 0 | 0 | 0 | 0 | 0 | 0 | 0 | 0 | 0 | 0 | 0 | 0 | 0 |
| 19(00010011) | 0 | 0 | 0 | 0 | 0 | 0 | 0 | 0 | 0 | 0 | 0 | 0 | 0 | 0 | 0 | 0 |
| 20(00010100) | 0 | 0 | 0 | 0 | 0 | 0 | 0 | 0 | 0 | 0 | 0 | 0 | 0 | 0 | 0 | 0 |
| 21(00010101) | 0 | 0 | 0 | 0 | 0 | 0 | 0 | 0 | 0 | 0 | 0 | 0 | 0 | 0 | 0 | 0 |
| 22(00010110) | 0 | 0 | 0 | 0 | 0 | 0 | 0 | 0 | 0 | 0 | 0 | 0 | 0 | 0 | 0 | 0 |
| 23(00010111) | 0 | 0 | 0 | 0 | 0 | 0 | 0 | 0 | 0 | 0 | 0 | 0 | 0 | 0 | 0 | 0 |

L10

| ( B" ) | | | | | | | | |
|---|---|---|---|---|---|---|---|---|
| B"8 | B"7 | B"6 | B"5 | B"4 | B"3 | B"2 | B"1 | B"0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 1 | 0 | 0 | 0 | 0 | 0 | 0 | 0 | 0 |
| 0 | 1 | 0 | 0 | 0 | 0 | 0 | 0 | 0 |
| 0 | 0 | 1 | 0 | 0 | 0 | 0 | 0 | 0 |
| 0 | 0 | 0 | 1 | 0 | 0 | 0 | 0 | 0 |
| 0 | 0 | 0 | 0 | 1 | 0 | 0 | 0 | 0 |
| 0 | 0 | 0 | 0 | 0 | 1 | 0 | 0 | 0 |
| 0 | 0 | 0 | 0 | 0 | 0 | 1 | 0 | 0 |
| 0 | 0 | 0 | 0 | 0 | 0 | 0 | 1 | 0 |
| 0 | 0 | 0 | 0 | 0 | 0 | 0 | 0 | 1 |

L10

F I G. 27

F I G. 29
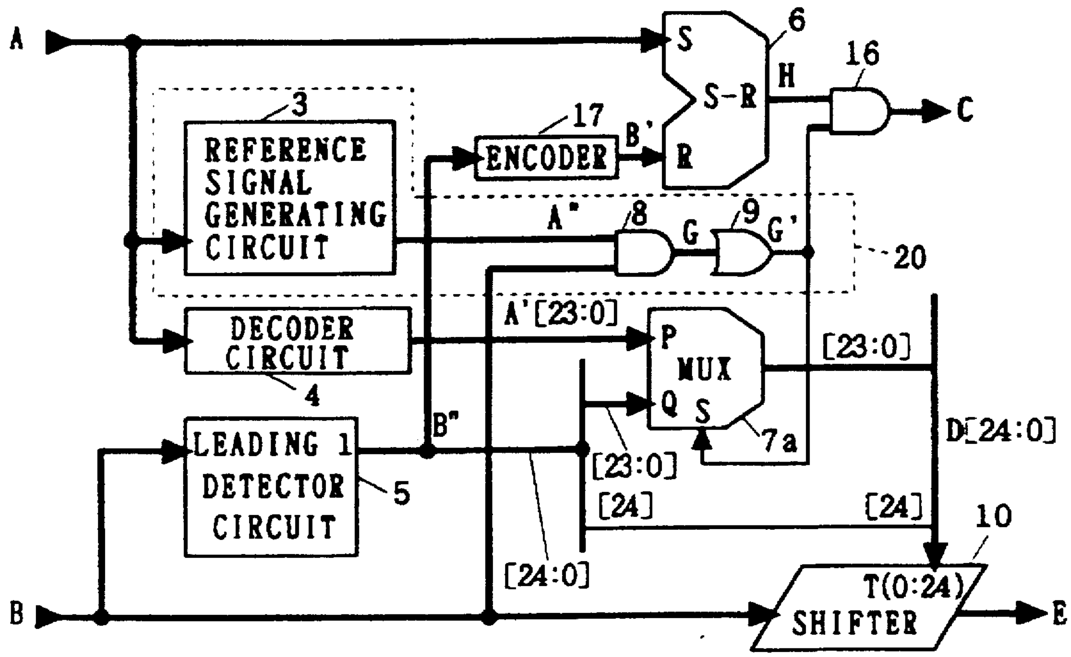
F I G. 30
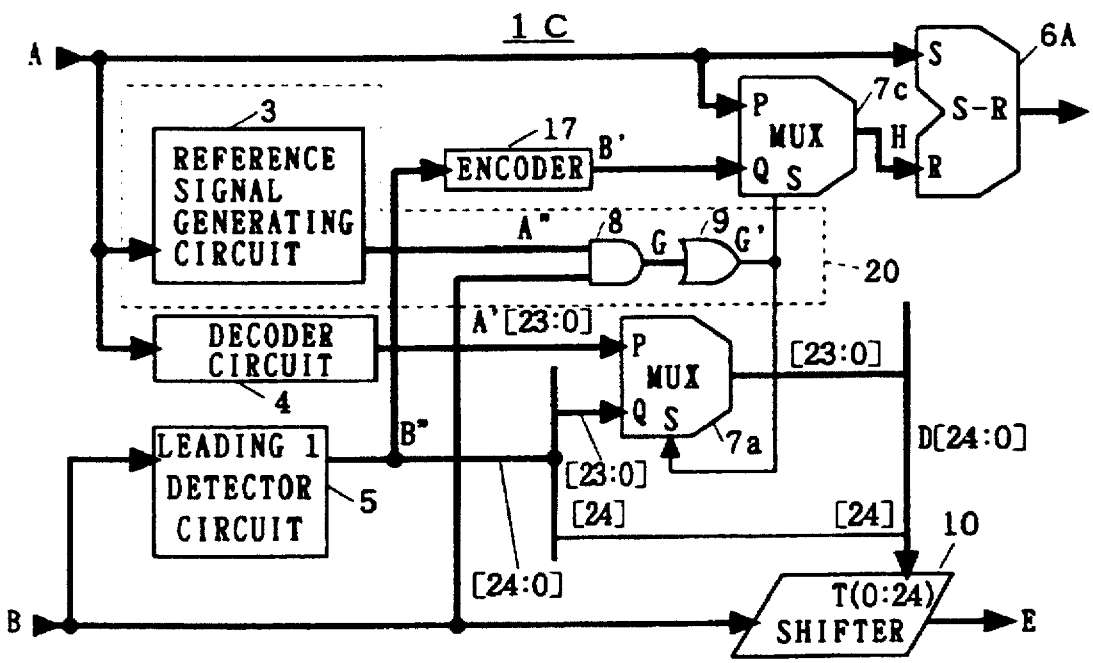

FIG. 32

| OUTPUT SIGNAL A" | | | | | | | | | | | | | | | | | | | | | | | |
|---|---|---|---|---|---|---|---|---|---|---|---|---|---|---|---|---|---|---|---|---|---|---|---|
| 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 1 | 1 | 1 | 0 | 0 | 0 | 0 | 0 | 0 | 0 | 0 | 0 | 0 | 1 | 0 | 0 | 0 | 0 | 0 | 0 | 0 | 0 | 0 |
| 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 |
| 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 |
| 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 |
| 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 |
| 1 | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 |
| 1 | 1 | 1 | 1 | 1 | 1 | 1 | 1 | 1 | 1 | 0 | 0 | 0 | 0 | 0 | 0 | 0 | 0 | 0 | 0 | 0 | 0 | 0 | 0 |
| 1 | 1 | 1 | 1 | 1 | 1 | 1 | 1 | 1 | 1 | 1 | 0 | 0 | 0 | 0 | 0 | 0 | 0 | 0 | 0 | 0 | 0 | 0 | 0 |
| 1 | 1 | 1 | 1 | 1 | 1 | 1 | 1 | 1 | 1 | 1 | 1 | 0 | 0 | 0 | 0 | 0 | 0 | 0 | 0 | 0 | 0 | 0 | 0 |
| 1 | 1 | 1 | 1 | 1 | 1 | 1 | 1 | 1 | 1 | 1 | 1 | 1 | 0 | 0 | 0 | 0 | 0 | 0 | 0 | 0 | 0 | 0 | 0 |
| 1 | 1 | 1 | 1 | 1 | 1 | 1 | 1 | 1 | 1 | 1 | 1 | 1 | 1 | 0 | 0 | 0 | 0 | 0 | 0 | 0 | 0 | 0 | 0 |
| 1 | 1 | 1 | 1 | 1 | 1 | 1 | 1 | 1 | 1 | 1 | 1 | 1 | 1 | 1 | 0 | 0 | 0 | 0 | 0 | 0 | 0 | 0 | 0 |
| 1 | 1 | 1 | 1 | 1 | 1 | 1 | 1 | 1 | 1 | 1 | 1 | 1 | 1 | 1 | 1 | 0 | 0 | 0 | 0 | 0 | 0 | 0 | 0 |
| 1 | 1 | 1 | 1 | 1 | 1 | 1 | 1 | 1 | 1 | 1 | 1 | 1 | 1 | 1 | 1 | 1 | 0 | 0 | 0 | 0 | 0 | 0 | 0 |
| 1 | 1 | 1 | 1 | 1 | 1 | 1 | 1 | 1 | 1 | 1 | 1 | 1 | 1 | 1 | 1 | 1 | 1 | 0 | 0 | 0 | 0 | 0 | 0 |
| 1 | 1 | 1 | 1 | 1 | 1 | 1 | 1 | 1 | 1 | 1 | 1 | 1 | 1 | 1 | 1 | 1 | 1 | 1 | 0 | 0 | 0 | 0 | 0 |
| 1 | 1 | 1 | 1 | 1 | 1 | 1 | 1 | 1 | 1 | 1 | 1 | 1 | 1 | 1 | 1 | 1 | 1 | 1 | 1 | 0 | 0 | 0 | 0 |
| 1 | 1 | 1 | 1 | 1 | 1 | 1 | 1 | 1 | 1 | 1 | 1 | 1 | 1 | 1 | 1 | 1 | 1 | 1 | 1 | 1 | 0 | 0 | 0 |
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 0 | 0 |
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 0 |
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |

INPUT SIGNAL A'

| 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|
| 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 1 | 0 | 0 | 0 | 0 | 0 | 0 | 0 | 0 | 0 | 0 | 1 | 0 | 0 | 0 | 0 | 0 | 0 | 0 | 0 | 0 |
| 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 1 | 0 | 1 | 0 | 0 | 0 | 0 | 0 | 0 | 0 | 0 | 0 | 0 | 0 | 0 | 0 | 0 | 0 | 0 |
| 0 | 0 | 0 | 0 | 0 | 1 | 0 | 0 | 1 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

OUTPUT SIGNAL A"

| 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 1 | 1 | 0 | 0 | 0 | 0 | 0 | 0 | 0 | 0 | 0 | 0 | 0 | 1 | 0 | 0 | 0 | 0 | 0 | 0 | 0 | 0 | 0 |
| 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 |
| 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 |
| 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 |
| 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 |
| 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 |
| 1 | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 |
| 1 | 1 | 1 | 1 | 1 | 1 | 1 | 1 | 1 | 1 | 0 | 0 | 0 | 0 | 0 | 0 | 0 | 0 | 0 | 0 | 0 | 0 | 0 | 0 |
| 1 | 1 | 1 | 1 | 1 | 1 | 1 | 1 | 1 | 1 | 1 | 0 | 0 | 0 | 0 | 0 | 0 | 0 | 0 | 0 | 0 | 0 | 0 | 0 |
| 1 | 1 | 1 | 1 | 1 | 1 | 1 | 1 | 1 | 1 | 1 | 1 | 0 | 0 | 0 | 0 | 0 | 0 | 0 | 0 | 0 | 0 | 0 | 0 |
| 1 | 1 | 1 | 1 | 1 | 1 | 1 | 1 | 1 | 1 | 1 | 1 | 1 | 0 | 0 | 0 | 0 | 0 | 0 | 0 | 0 | 0 | 0 | 0 |
| 1 | 1 | 1 | 1 | 1 | 1 | 1 | 1 | 1 | 1 | 1 | 1 | 1 | 1 | 0 | 0 | 0 | 0 | 0 | 0 | 0 | 0 | 0 | 0 |
| 1 | 1 | 1 | 1 | 1 | 1 | 1 | 1 | 1 | 1 | 1 | 1 | 1 | 1 | 1 | 0 | 0 | 0 | 0 | 0 | 0 | 0 | 0 | 0 |
| 1 | 1 | 1 | 1 | 1 | 1 | 1 | 1 | 1 | 1 | 1 | 1 | 1 | 1 | 1 | 1 | 0 | 0 | 0 | 0 | 0 | 0 | 0 | 0 |
| 1 | 1 | 1 | 1 | 1 | 1 | 1 | 1 | 1 | 1 | 1 | 1 | 1 | 1 | 1 | 1 | 1 | 0 | 0 | 0 | 0 | 0 | 0 | 0 |
| 1 | 1 | 1 | 1 | 1 | 1 | 1 | 1 | 1 | 1 | 1 | 1 | 1 | 1 | 1 | 1 | 1 | 1 | 0 | 0 | 0 | 0 | 0 | 0 |
| 1 | 1 | 1 | 1 | 1 | 1 | 1 | 1 | 1 | 1 | 1 | 1 | 1 | 1 | 1 | 1 | 1 | 1 | 1 | 0 | 0 | 0 | 0 | 0 |
| 1 | 1 | 1 | 1 | 1 | 1 | 1 | 1 | 1 | 1 | 1 | 1 | 1 | 1 | 1 | 1 | 1 | 1 | 1 | 1 | 0 | 0 | 0 | 0 |
| 1 | 1 | 1 | 1 | 1 | 1 | 1 | 1 | 1 | 1 | 1 | 1 | 1 | 1 | 1 | 1 | 1 | 1 | 1 | 1 | 1 | 0 | 0 | 0 |
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 0 | 0 |
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 0 |
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |

FIG. 36

INTPUT SIGNAL A'

| 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|
| 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 1 | 0 | 0 | 0 | 0 | 0 | 0 | 0 | 0 | 0 | 0 | 1 | 0 | 0 | 0 | 0 | 0 | 0 | 0 | 0 | 0 |
| 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 1 | 0 | 1 | 0 | 0 | 0 | 0 | 0 | 0 | 0 | 0 | 0 | 0 | 0 | 0 | 0 | 0 | 0 | 0 |
| 0 | 0 | 0 | 0 | 0 | 1 | 0 | 0 | 1 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

L12

F I G. 38
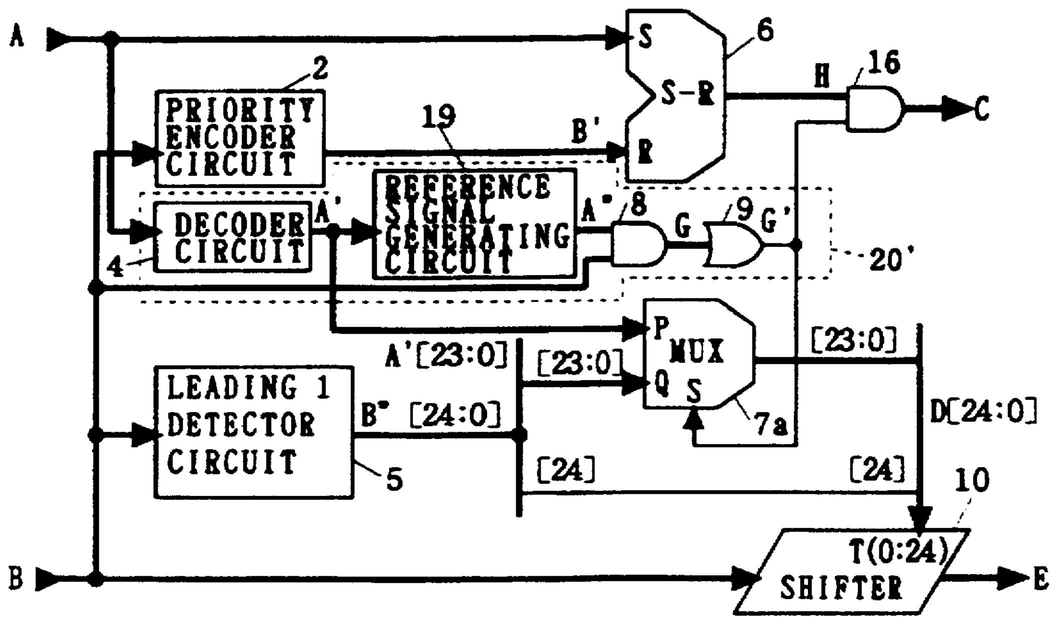
F I G. 39
1 E
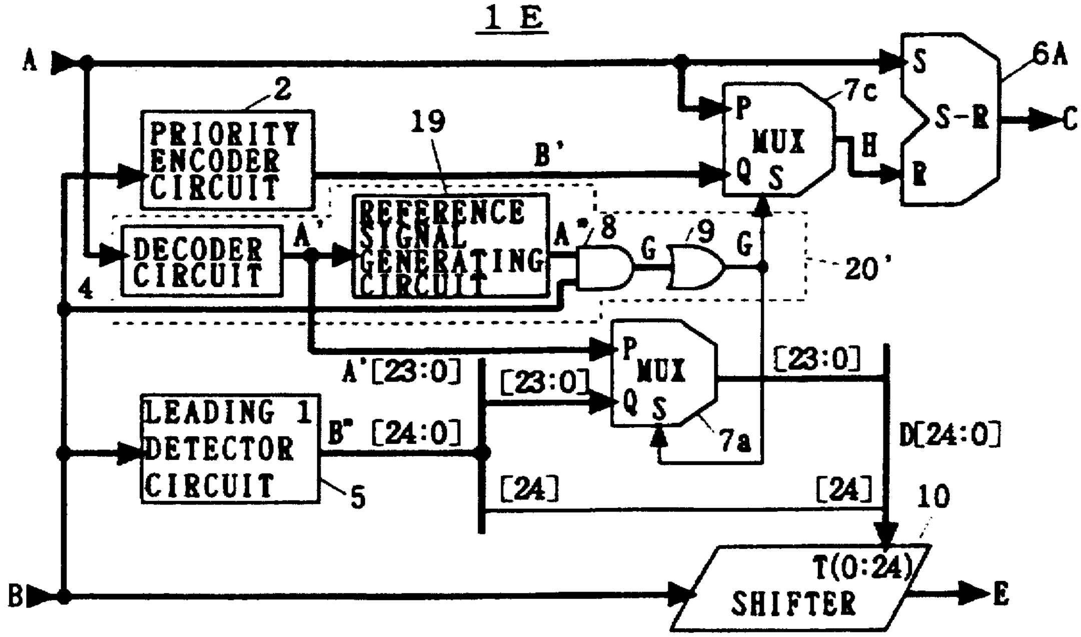

F I G. 4 2
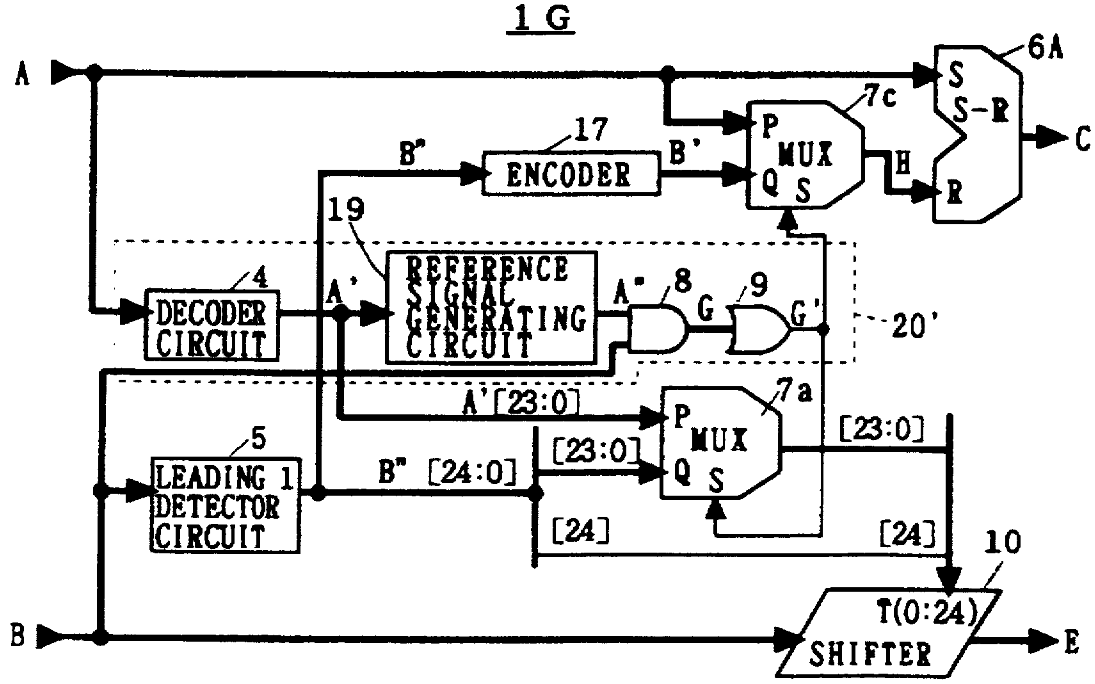

FIG. 44 THE CASE OF 24 BIT INPUT L13

| OUTPUT VALUE(B') BINARY VALUE IN() | INPUT SIGNAL (B) | | | | | | | | | | | | | | | |
|---|---|---|---|---|---|---|---|---|---|---|---|---|---|---|---|---|
| | B23 | B22 | B21 | B20 | B19 | B18 | B17 | B16 | B15 | B14 | B13 | B12 | B11 | B10 | B9 | B8 |
| 0(00000) | 1 | × | × | × | × | × | × | × | × | × | × | × | × | × | × | × |
| 1(00001) | 0 | 1 | × | × | × | × | × | × | × | × | × | × | × | × | × | × |
| 2(00010) | 0 | 0 | 1 | × | × | × | × | × | × | × | × | × | × | × | × | × |
| 3(00011) | 0 | 0 | 0 | 1 | × | × | × | × | × | × | × | × | × | × | × | × |
| 4(00100) | 0 | 0 | 0 | 0 | 1 | × | × | × | × | × | × | × | × | × | × | × |
| 5(00101) | 0 | 0 | 0 | 0 | 0 | 1 | × | × | × | × | × | × | × | × | × | × |
| 6(00110) | 0 | 0 | 0 | 0 | 0 | 0 | 1 | × | × | × | × | × | × | × | × | × |
| 7(00111) | 0 | 0 | 0 | 0 | 0 | 0 | 0 | 1 | × | × | × | × | × | × | × | × |
| 8(01000) | 0 | 0 | 0 | 0 | 0 | 0 | 0 | 0 | 1 | × | × | × | × | × | × | × |
| 9(01001) | 0 | 0 | 0 | 0 | 0 | 0 | 0 | 0 | 0 | 1 | × | × | × | × | × | × |
| 10(01010) | 0 | 0 | 0 | 0 | 0 | 0 | 0 | 0 | 0 | 0 | 1 | × | × | × | × | × |
| 11(01011) | 0 | 0 | 0 | 0 | 0 | 0 | 0 | 0 | 0 | 0 | 0 | 1 | × | × | × | × |
| 12(01100) | 0 | 0 | 0 | 0 | 0 | 0 | 0 | 0 | 0 | 0 | 0 | 0 | 1 | × | × | × |
| 13(01101) | 0 | 0 | 0 | 0 | 0 | 0 | 0 | 0 | 0 | 0 | 0 | 0 | 0 | 1 | × | × |
| 14(01110) | 0 | 0 | 0 | 0 | 0 | 0 | 0 | 0 | 0 | 0 | 0 | 0 | 0 | 0 | 1 | × |
| 15(01111) | 0 | 0 | 0 | 0 | 0 | 0 | 0 | 0 | 0 | 0 | 0 | 0 | 0 | 0 | 0 | 1 |
| 16(10000) | 0 | 0 | 0 | 0 | 0 | 0 | 0 | 0 | 0 | 0 | 0 | 0 | 0 | 0 | 0 | 0 |
| 17(10001) | 0 | 0 | 0 | 0 | 0 | 0 | 0 | 0 | 0 | 0 | 0 | 0 | 0 | 0 | 0 | 0 |
| 18(10010) | 0 | 0 | 0 | 0 | 0 | 0 | 0 | 0 | 0 | 0 | 0 | 0 | 0 | 0 | 0 | 0 |
| 19(10011) | 0 | 0 | 0 | 0 | 0 | 0 | 0 | 0 | 0 | 0 | 0 | 0 | 0 | 0 | 0 | 0 |
| 20(10100) | 0 | 0 | 0 | 0 | 0 | 0 | 0 | 0 | 0 | 0 | 0 | 0 | 0 | 0 | 0 | 0 |
| 21(10101) | 0 | 0 | 0 | 0 | 0 | 0 | 0 | 0 | 0 | 0 | 0 | 0 | 0 | 0 | 0 | 0 |
| 22(10110) | 0 | 0 | 0 | 0 | 0 | 0 | 0 | 0 | 0 | 0 | 0 | 0 | 0 | 0 | 0 | 0 |
| 23(10111) | 0 | 0 | 0 | 0 | 0 | 0 | 0 | 0 | 0 | 0 | 0 | 0 | 0 | 0 | 0 | 0 |
| 0(00000) | 0 | 0 | 0 | 0 | 0 | 0 | 0 | 0 | 0 | 0 | 0 | 0 | 0 | 0 | 0 | 0 |

| B7 | B6 | B5 | B4 | B3 | B2 | B1 | B0 |
|---|---|---|---|---|---|---|---|
| × | × | × | × | × | × | × | × |
| × | × | × | × | × | × | × | × |
| × | × | × | × | × | × | × | × |
| × | × | × | × | × | × | × | × |
| × | × | × | × | × | × | × | × |
| × | × | × | × | × | × | × | × |
| × | × | × | × | × | × | × | × |
| × | × | × | × | × | × | × | × |
| × | × | × | × | × | × | × | × |
| × | × | × | × | × | × | × | × |
| × | × | × | × | × | × | × | × |
| × | × | × | × | × | × | × | × |
| × | × | × | × | × | × | × | × |
| × | × | × | × | × | × | × | × |
| × | × | × | × | × | × | × | × |
| × | × | × | × | × | × | × | × |
| 1 | × | × | × | × | × | × | × |
| 0 | 1 | × | × | × | × | × | × |
| 0 | 0 | 1 | × | × | × | × | × |
| 0 | 0 | 0 | 1 | × | × | × | × |
| 0 | 0 | 0 | 0 | 1 | × | × | × |
| 0 | 0 | 0 | 0 | 0 | 1 | × | × |
| 0 | 0 | 0 | 0 | 0 | 0 | 1 | × |
| 0 | 0 | 0 | 0 | 0 | 0 | 0 | 1 |
| 0 | 0 | 0 | 0 | 0 | 0 | 0 | 0 |

× INDICATES '0' OR '1'

CASE OF 5-BIT INPUT

| OUTPUT SIGNAL(D) | | | | | | | | | | | | | | | | | | | | |
|---|---|---|---|---|---|---|---|---|---|---|---|---|---|---|---|---|---|---|---|---|
| D31 | D30 | D29 | D28 | D27 | D26 | D25 | D24 | D23 | D22 | D21 | D20 | D19 | D18 | D17 | D16 | D15 | D14 | D13 | D12 | D11 |
| 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 1 |
| 0 | 0 | 0 | 0 | 0 | 0 | 0 | 0 | 0 | 0 | 0 | 0 | 0 | 0 | 0 | 0 | 0 | 0 | 0 | 1 | 0 |
| 0 | 0 | 0 | 0 | 0 | 0 | 0 | 0 | 0 | 0 | 0 | 0 | 0 | 0 | 0 | 0 | 0 | 0 | 1 | 0 | 0 |
| 0 | 0 | 0 | 0 | 0 | 0 | 0 | 0 | 0 | 0 | 0 | 0 | 0 | 0 | 0 | 0 | 0 | 1 | 0 | 0 | 0 |
| 0 | 0 | 0 | 0 | 0 | 0 | 0 | 0 | 0 | 0 | 0 | 0 | 0 | 0 | 0 | 0 | 1 | 0 | 0 | 0 | 0 |
| 0 | 0 | 0 | 0 | 0 | 0 | 0 | 0 | 0 | 0 | 0 | 0 | 0 | 0 | 0 | 1 | 0 | 0 | 0 | 0 | 0 |
| 0 | 0 | 0 | 0 | 0 | 0 | 0 | 0 | 0 | 0 | 0 | 0 | 0 | 0 | 1 | 0 | 0 | 0 | 0 | 0 | 0 |
| 0 | 0 | 0 | 0 | 0 | 0 | 0 | 0 | 0 | 0 | 0 | 0 | 0 | 1 | 0 | 0 | 0 | 0 | 0 | 0 | 0 |
| 0 | 0 | 0 | 0 | 0 | 0 | 0 | 0 | 0 | 0 | 0 | 0 | 1 | 0 | 0 | 0 | 0 | 0 | 0 | 0 | 0 |
| 0 | 0 | 0 | 0 | 0 | 0 | 0 | 0 | 0 | 0 | 0 | 1 | 0 | 0 | 0 | 0 | 0 | 0 | 0 | 0 | 0 |
| 0 | 0 | 0 | 0 | 0 | 0 | 0 | 0 | 0 | 0 | 1 | 0 | 0 | 0 | 0 | 0 | 0 | 0 | 0 | 0 | 0 |
| 0 | 0 | 0 | 0 | 0 | 0 | 0 | 0 | 0 | 1 | 0 | 0 | 0 | 0 | 0 | 0 | 0 | 0 | 0 | 0 | 0 |
| 0 | 0 | 0 | 0 | 0 | 0 | 0 | 0 | 1 | 0 | 0 | 0 | 0 | 0 | 0 | 0 | 0 | 0 | 0 | 0 | 0 |
| 0 | 0 | 0 | 0 | 0 | 0 | 0 | 1 | 0 | 0 | 0 | 0 | 0 | 0 | 0 | 0 | 0 | 0 | 0 | 0 | 0 |

| | | | | | | | | | | | | | | | | | | | | |
|---|---|---|---|---|---|---|---|---|---|---|---|---|---|---|---|---|---|---|---|---|
| 0 | 0 | 0 | 0 | 0 | 0 | 1 | 0 | 0 | 0 | 0 | 0 | 0 | 0 | 0 | 0 | 0 | 0 | 0 | 0 | 0 |
| 0 | 0 | 0 | 0 | 0 | 1 | 0 | 0 | 0 | 0 | 0 | 0 | 0 | 0 | 0 | 0 | 0 | 0 | 0 | 0 | 0 |
| 0 | 0 | 0 | 0 | 1 | 0 | 0 | 0 | 0 | 0 | 0 | 0 | 0 | 0 | 0 | 0 | 0 | 0 | 0 | 0 | 0 |
| 0 | 0 | 0 | 1 | 0 | 0 | 0 | 0 | 0 | 0 | 0 | 0 | 0 | 0 | 0 | 0 | 0 | 0 | 0 | 0 | 0 |
| 0 | 0 | 1 | 0 | 0 | 0 | 0 | 0 | 0 | 0 | 0 | 0 | 0 | 0 | 0 | 0 | 0 | 0 | 0 | 0 | 0 |
| 0 | 1 | 0 | 0 | 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 | 0 | 0 | 0 | 0 | 0 |

FIG. 49

| OUTPUT SIGNAL(D) | | | | | | | | | | | INPUT VALUE(D') |
|---|---|---|---|---|---|---|---|---|---|---|---|
| D10 | D9 | D8 | D7 | D6 | D5 | D4 | D3 | D2 | D1 | D0 | BINARY VALUE IN( ) |
| 0 | 0 | 0 | 0 | 0 | 0 | 0 | 0 | 0 | 0 | 1 | 0(00000) |
| 0 | 0 | 0 | 0 | 0 | 0 | 0 | 0 | 0 | 1 | 0 | 1(00001) |
| 0 | 0 | 0 | 0 | 0 | 0 | 0 | 0 | 1 | 0 | 0 | 2(00010) |
| 0 | 0 | 0 | 0 | 0 | 0 | 0 | 1 | 0 | 0 | 0 | 3(00011) |
| 0 | 0 | 0 | 0 | 0 | 0 | 1 | 0 | 0 | 0 | 0 | 4(00100) |
| 0 | 0 | 0 | 0 | 0 | 1 | 0 | 0 | 0 | 0 | 0 | 5(00101) |
| 0 | 0 | 0 | 0 | 1 | 0 | 0 | 0 | 0 | 0 | 0 | 6(00110) |
| 0 | 0 | 0 | 1 | 0 | 0 | 0 | 0 | 0 | 0 | 0 | 7(00111) |
| 0 | 0 | 1 | 0 | 0 | 0 | 0 | 0 | 0 | 0 | 0 | 8(01000) |
| 0 | 1 | 0 | 0 | 0 | 0 | 0 | 0 | 0 | 0 | 0 | 9(01001) |
| 1 | 0 | 0 | 0 | 0 | 0 | 0 | 0 | 0 | 0 | 0 | 10(01010) |
| 0 | 0 | 0 | 0 | 0 | 0 | 0 | 0 | 0 | 0 | 0 | 11(01011) |
| 0 | 0 | 0 | 0 | 0 | 0 | 0 | 0 | 0 | 0 | 0 | 12(01100) |
| 0 | 0 | 0 | 0 | 0 | 0 | 0 | 0 | 0 | 0 | 0 | 13(01101) |
| 0 | 0 | 0 | 0 | 0 | 0 | 0 | 0 | 0 | 0 | 0 | 14(01110) |
| 0 | 0 | 0 | 0 | 0 | 0 | 0 | 0 | 0 | 0 | 0 | 15(01111) |
| 0 | 0 | 0 | 0 | 0 | 0 | 0 | 0 | 0 | 0 | 0 | 16(10000) |
| 0 | 0 | 0 | 0 | 0 | 0 | 0 | 0 | 0 | 0 | 0 | 17(10001) |
| 0 | 0 | 0 | 0 | 0 | 0 | 0 | 0 | 0 | 0 | 0 | 18(10010) |
| 0 | 0 | 0 | 0 | 0 | 0 | 0 | 0 | 0 | 0 | 0 | 19(10011) |
| 0 | 0 | 0 | 0 | 0 | 0 | 0 | 0 | 0 | 0 | 0 | 20(10100) |
| 0 | 0 | 0 | 0 | 0 | 0 | 0 | 0 | 0 | 0 | 0 | 21(10101) |
| 0 | 0 | 0 | 0 | 0 | 0 | 0 | 0 | 0 | 0 | 0 | 22(10110) |
| 0 | 0 | 0 | 0 | 0 | 0 | 0 | 0 | 0 | 0 | 0 | 23(10111) |
| 0 | 0 | 0 | 0 | 0 | 0 | 0 | 0 | 0 | 0 | 0 | 24(11000) |

| | | | | | | | | | | | |
|---|---|---|---|---|---|---|---|---|---|---|---|
| 25(11001) | 0 | 0 | 0 | 0 | 0 | 0 | 0 | 0 | 0 | 0 | 0 |
| 26(11010) | 0 | 0 | 0 | 0 | 0 | 0 | 0 | 0 | 0 | 0 | 0 |
| 27(11011) | 0 | 0 | 0 | 0 | 0 | 0 | 0 | 0 | 0 | 0 | 0 |
| 28(11100) | 0 | 0 | 0 | 0 | 0 | 0 | 0 | 0 | 0 | 0 | 0 |
| 29(11101) | 0 | 0 | 0 | 0 | 0 | 0 | 0 | 0 | 0 | 0 | 0 |
| 30(11110) | 0 | 0 | 0 | 0 | 0 | 0 | 0 | 0 | 0 | 0 | 0 |
| 31(11111) | 0 | 0 | 0 | 0 | 0 | 0 | 0 | 0 | 0 | 0 | 0 |

OUTPUT SIGNAL(E)

| E23 | E22 | E21 | E20 | E19 | E18 | E17 | E16 | E15 | E14 | E13 | E12 | E11 | E10 | E9 | E8 | E7 | E6 | E5 |
|---|---|---|---|---|---|---|---|---|---|---|---|---|---|---|---|---|---|---|
| B23 | B22 | B21 | B20 | B19 | B18 | B17 | B16 | B15 | B14 | B13 | B12 | B11 | B10 | B9 | B8 | B7 | B6 | B5 |
| B22 | B21 | B20 | B19 | B18 | B17 | B16 | B15 | B14 | B13 | B12 | B11 | B10 | B9 | B8 | B7 | B6 | B5 | B4 |
| B21 | B20 | B19 | B18 | B17 | B16 | B15 | B14 | B13 | B12 | B11 | B10 | B9 | B8 | B7 | B6 | B5 | B4 | B3 |
| B20 | B19 | B18 | B17 | B16 | B15 | B14 | B13 | B12 | B11 | B10 | B9 | B8 | B7 | B6 | B5 | B4 | B3 | B2 |
| B19 | B18 | B17 | B16 | B15 | B14 | B13 | B12 | B11 | B10 | B9 | B8 | B7 | B6 | B5 | B4 | B3 | B2 | B1 |
| B18 | B17 | B16 | B15 | B14 | B13 | B12 | B11 | B10 | B9 | B8 | B7 | B6 | B5 | B4 | B3 | B2 | B1 | B0 |
| B17 | B16 | B15 | B14 | B13 | B12 | B11 | B10 | B9 | B8 | B7 | B6 | B5 | B4 | B3 | B2 | B1 | B0 | 0 |
| B16 | B15 | B14 | B13 | B12 | B11 | B10 | B9 | B8 | B7 | B6 | B5 | B4 | B3 | B2 | B1 | B0 | 0 | 0 |
| B15 | B14 | B13 | B12 | B11 | B10 | B9 | B8 | B7 | B6 | B5 | B4 | B3 | B2 | B1 | B0 | 0 | 0 | 0 |
| B14 | B13 | B12 | B11 | B10 | B9 | B8 | B7 | B6 | B5 | B4 | B3 | B2 | B1 | B0 | 0 | 0 | 0 | 0 |
| B13 | B12 | B11 | B10 | B9 | B8 | B7 | B6 | B5 | B4 | B3 | B2 | B2 | B0 | 0 | 0 | 0 | 0 | 0 |
| B12 | B11 | B10 | B9 | B8 | B7 | B6 | B5 | B4 | B3 | B2 | B1 | B0 | 0 | 0 | 0 | 0 | 0 | 0 |
| B11 | B10 | B9 | B8 | B7 | B6 | B5 | B4 | B3 | B2 | B1 | B0 | 0 | 0 | 0 | 0 | 0 | 0 | 0 |
| B10 | B9 | B8 | B7 | B6 | B5 | B4 | B3 | B2 | B1 | B0 | 0 | 0 | 0 | 0 | 0 | 0 | 0 | 0 |
| B9 | B8 | B7 | B6 | B5 | B4 | B3 | B2 | B1 | B0 | 0 | 0 | 0 | 0 | 0 | 0 | 0 | 0 | 0 |
| B8 | B7 | B6 | B5 | B4 | B3 | B2 | B1 | B0 | 0 | 0 | 0 | 0 | 0 | 0 | 0 | 0 | 0 | 0 |
| B7 | B6 | B5 | B4 | B3 | B2 | B1 | B0 | 0 | 0 | 0 | 0 | 0 | 0 | 0 | 0 | 0 | 0 | 0 |
| B6 | B5 | B4 | B3 | B2 | B1 | B0 | 0 | 0 | 0 | 0 | 0 | 0 | 0 | 0 | 0 | 0 | 0 | 0 |
| B5 | B4 | B3 | B2 | B1 | B0 | 0 | 0 | 0 | 0 | 0 | 0 | 0 | 0 | 0 | 0 | 0 | 0 | 0 |
| B4 | B3 | B2 | B1 | B0 | 0 | 0 | 0 | 0 | 0 | 0 | 0 | 0 | 0 | 0 | 0 | 0 | 0 | 0 |
| B3 | B2 | B1 | B0 | 0 | 0 | 0 | 0 | 0 | 0 | 0 | 0 | 0 | 0 | 0 | 0 | 0 | 0 | 0 |
| B2 | B1 | B0 | 0 | 0 | 0 | 0 | 0 | 0 | 0 | 0 | 0 | 0 | 0 | 0 | 0 | 0 | 0 | 0 |
| B1 | B0 | 0 | 0 | 0 | 0 | 0 | 0 | 0 | 0 | 0 | 0 | 0 | 0 | 0 | 0 | 0 | 0 | 0 |
| B0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |

L16

L17

F I G. 5 4

| E4 | E3 | E2 | E1 | E0 | CONTROL SIGNAL(D) |
|---|---|---|---|---|---|
| B4 | B3 | B2 | B1 | B0 | 0000:0000:0000:0000:0000:0000:0000:0001 |
| B3 | B2 | B1 | B0 | 0 | 0000:0000:0000:0000:0000:0000:0000:0010 |
| B2 | B1 | B0 | 0 | 0 | 0000:0000:0000:0000:0000:0000:0000:0100 |
| B1 | B0 | 0 | 0 | 0 | 0000:0000:0000:0000:0000:0000:0000:1000 |
| B0 | 0 | 0 | 0 | 0 | 0000:0000:0000:0000:0000:0000:0001:0000 |
| 0 | 0 | 0 | 0 | 0 | 0000:0000:0000:0000:0000:0000:0010:0000 |
| 0 | 0 | 0 | 0 | 0 | 0000:0000:0000:0000:0000:0000:0100:0000 |
| 0 | 0 | 0 | 0 | 0 | 0000:0000:0000:0000:0000:0000:1000:0000 |
| 0 | 0 | 0 | 0 | 0 | 0000:0000:0000:0000:0000:0001:0000:0000 |
| 0 | 0 | 0 | 0 | 0 | 0000:0000:0000:0000:0000:0010:0000:0000 |
| 0 | 0 | 0 | 0 | 0 | 0000:0000:0000:0000:0000:0100:0000:0000 |
| 0 | 0 | 0 | 0 | 0 | 0000:0000:0000:0000:0000:1000:0000:0000 |
| 0 | 0 | 0 | 0 | 0 | 0000:0000:0000:0000:0001:0000:0000:0000 |
| 0 | 0 | 0 | 0 | 0 | 0000:0000:0000:0000:0010:0000:0000:0000 |
| 0 | 0 | 0 | 0 | 0 | 0000:0000:0000:0000:0100:0000:0000:0000 |
| 0 | 0 | 0 | 0 | 0 | 0000:0000:0000:0000:1000:0000:0000:0000 |
| 0 | 0 | 0 | 0 | 0 | 0000:0000:0000:0001:0000:0000:0000:0000 |
| 0 | 0 | 0 | 0 | 0 | 0000:0000:0000:0010:0000:0000:0000:0000 |
| 0 | 0 | 0 | 0 | 0 | 0000:0000:0000:0100:0000:0000:0000:0000 |
| 0 | 0 | 0 | 0 | 0 | 0000:0000:0000:1000:0000:0000:0000:0000 |
| 0 | 0 | 0 | 0 | 0 | 0000:0000:0001:0000:0000:0000:0000:0000 |
| 0 | 0 | 0 | 0 | 0 | 0000:0000:0010:0000:0000:0000:0000:0000 |
| 0 | 0 | 0 | 0 | 0 | 0000:0000:0100:0000:0000:0000:0000:0000 |
| 0 | 0 | 0 | 0 | 0 | 0000:0000:1000:0000:0000:0000:0000:0000 |
| 0 | 0 | 0 | 0 | 0 | 0000:0001:0000:0000:0000:0000:0000:0000 |
| 0 | 0 | 0 | 0 | 0 | 0000:0010:0000:0000:0000:0000:0000:0000 |

| | | | | | |
|---|---|---|---|---|---|
| 0 | 0 | 0 | 0 | 0 | 0000:0100:0000:0000:0000:0000:0000:0000 |
| 0 | 0 | 0 | 0 | 0 | 0000:1000:0000:0000:0000:0000:0000:0000 |
| 0 | 0 | 0 | 0 | 0 | 0001:0000:0000:0000:0000:0000:0000:0000 |
| 0 | 0 | 0 | 0 | 0 | 0010:0000:0000:0000:0000:0000:0000:0000 |
| 0 | 0 | 0 | 0 | 0 | 0100:0000:0000:0000:0000:0000:0000:0000 |
| 0 | 0 | 0 | 0 | 0 | 1000:0000:0000:0000:0000:0000:0000:0000 |

F I G. 5 6
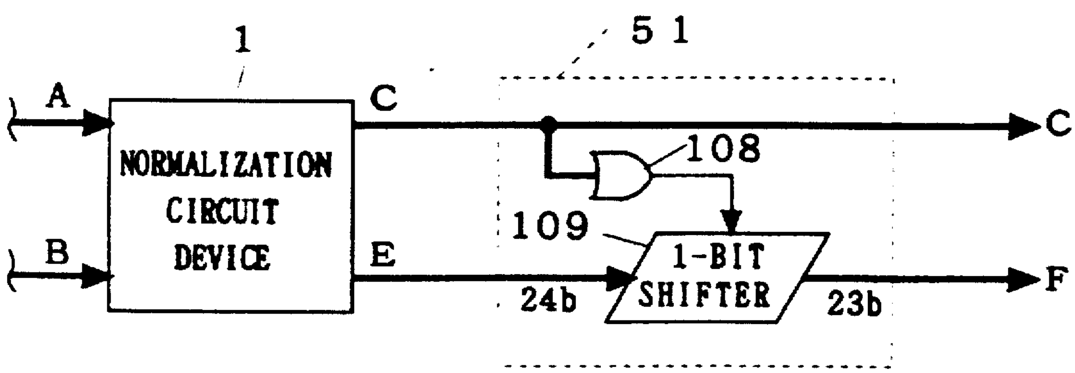

F I G. 5 8
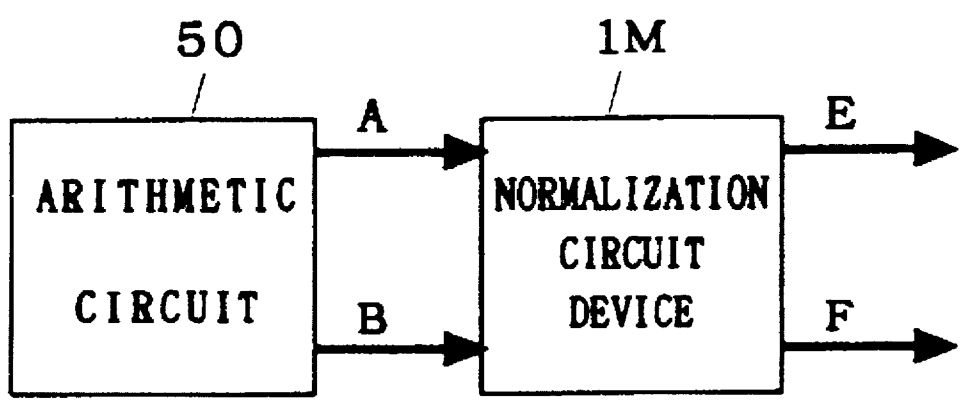

FIG. 60

| OUTPUT SIGNAL(F) | | | | | | | | | | | | | | | | | | |
|---|---|---|---|---|---|---|---|---|---|---|---|---|---|---|---|---|---|---|
| F22 | F21 | F20 | F19 | F18 | F17 | F16 | F15 | F14 | F13 | F12 | F11 | F10 | F9 | F8 | F7 | F6 | F5 | F4 |
| B23 | B22 | B21 | B20 | B19 | B18 | B17 | B16 | B15 | B14 | B13 | B12 | B11 | B10 | B9 | B8 | B7 | B6 | B5 |
| B22 | B21 | B20 | B19 | B18 | B17 | B16 | B15 | B14 | B13 | B12 | B11 | B10 | B9 | B8 | B7 | B6 | B5 | B4 |
| B21 | B20 | B19 | B18 | B17 | B16 | B15 | B14 | B13 | B12 | B11 | B10 | B9 | B8 | B7 | B6 | B5 | B4 | B3 |
| B20 | B19 | B18 | B17 | B16 | B15 | B14 | B13 | B12 | B11 | B10 | B9 | B8 | B7 | B6 | B5 | B4 | B3 | B2 |
| B19 | B18 | B17 | B16 | B15 | B14 | B13 | B12 | B11 | B10 | B9 | B8 | B7 | B6 | B5 | B4 | B3 | B2 | B1 |
| B18 | B17 | B16 | B15 | B14 | B13 | B12 | B11 | B10 | B9 | B8 | B7 | B6 | B5 | B4 | B3 | B2 | B1 | B0 |
| B17 | B16 | B15 | B14 | B13 | B12 | B11 | B10 | B9 | B8 | B7 | B6 | B5 | B4 | B3 | B2 | B1 | B0 | 0 |
| B16 | B15 | B14 | B13 | B12 | B11 | B10 | B9 | B8 | B7 | B6 | B5 | B4 | B3 | B2 | B1 | B0 | 0 | 0 |
| B15 | B14 | B13 | B12 | B11 | B10 | B9 | B8 | B7 | B6 | B5 | B4 | B3 | B2 | B1 | B0 | 0 | 0 | 0 |
| B14 | B13 | B12 | B11 | B10 | B9 | B8 | B7 | B6 | B5 | B4 | B3 | B2 | B1 | B0 | 0 | 0 | 0 | 0 |
| B13 | B12 | B11 | B10 | B9 | B8 | B7 | B6 | B5 | B4 | B3 | B2 | B2 | B0 | 0 | 0 | 0 | 0 | 0 |
| B12 | B11 | B10 | B9 | B8 | B7 | B6 | B5 | B4 | B3 | B2 | B1 | B0 | 0 | 0 | 0 | 0 | 0 | 0 |
| B11 | B10 | B9 | B8 | B7 | B6 | B5 | B4 | B3 | B2 | B1 | B0 | 0 | 0 | 0 | 0 | 0 | 0 | 0 |
| B10 | B9 | B8 | B7 | B6 | B5 | B4 | B3 | B2 | B1 | B0 | 0 | 0 | 0 | 0 | 0 | 0 | 0 | 0 |
| B9 | B8 | B7 | B6 | B5 | B4 | B3 | B2 | B1 | B0 | 0 | 0 | 0 | 0 | 0 | 0 | 0 | 0 | 0 |
| B8 | B7 | B6 | B5 | B4 | B3 | B2 | B1 | B0 | 0 | 0 | 0 | 0 | 0 | 0 | 0 | 0 | 0 | 0 |
| B7 | B6 | B5 | B4 | B3 | B2 | B1 | B0 | 0 | 0 | 0 | 0 | 0 | 0 | 0 | 0 | 0 | 0 | 0 |
| B6 | B5 | B4 | B3 | B2 | B1 | B0 | 0 | 0 | 0 | 0 | 0 | 0 | 0 | 0 | 0 | 0 | 0 | 0 |
| B5 | B4 | B3 | B2 | B1 | B0 | 0 | 0 | 0 | 0 | 0 | 0 | 0 | 0 | 0 | 0 | 0 | 0 | 0 |
| B4 | B3 | B2 | B1 | B0 | 0 | 0 | 0 | 0 | 0 | 0 | 0 | 0 | 0 | 0 | 0 | 0 | 0 | 0 |
| B3 | B2 | B1 | B0 | 0 | 0 | 0 | 0 | 0 | 0 | 0 | 0 | 0 | 0 | 0 | 0 | 0 | 0 | 0 |
| B2 | B1 | B0 | 0 | 0 | 0 | 0 | 0 | 0 | 0 | 0 | 0 | 0 | 0 | 0 | 0 | 0 | 0 | 0 |
| B1 | B0 | 0 | 0 | 0 | 0 | 0 | 0 | 0 | 0 | 0 | 0 | 0 | 0 | 0 | 0 | 0 | 0 | 0 |
| B0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |

| F3 | F2 | F1 | F0 | T0 D24 | T1 D23 | T2 D22 | T3 D21 | T4 D20 | T5 D19 | T6 D18 | T7 D17 | T8 D16 | T9 D15 | T10 D14 | T11 D13 | T12 D12 | T13 D11 |
|---|---|---|---|---|---|---|---|---|---|---|---|---|---|---|---|---|---|
| | | | | CONTROL SIGNAL (D) | | | | | | | | | | | | | |
| B4 | B3 | B2 | B1 | 0 | 1 | 0 | 0 | 0 | 0 | 0 | 0 | 0 | 0 | 0 | 0 | 0 | 0 |
| B3 | B2 | B1 | B0 | 0 | 0 | 1 | 0 | 0 | 0 | 0 | 0 | 0 | 0 | 0 | 0 | 0 | 0 |
| B2 | B1 | B0 | 0 | 0 | 0 | 0 | 1 | 0 | 0 | 0 | 0 | 0 | 0 | 0 | 0 | 0 | 0 |
| B1 | B0 | 0 | 0 | 0 | 0 | 0 | 0 | 1 | 0 | 0 | 0 | 0 | 0 | 0 | 0 | 0 | 0 |
| B0 | 0 | 0 | 0 | 0 | 0 | 0 | 0 | 0 | 1 | 0 | 0 | 0 | 0 | 0 | 0 | 0 | 0 |
| 0 | 0 | 0 | 0 | 0 | 0 | 0 | 0 | 0 | 0 | 1 | 0 | 0 | 0 | 0 | 0 | 0 | 0 |
| 0 | 0 | 0 | 0 | 0 | 0 | 0 | 0 | 0 | 0 | 0 | 1 | 0 | 0 | 0 | 0 | 0 | 0 |
| 0 | 0 | 0 | 0 | 0 | 0 | 0 | 0 | 0 | 0 | 0 | 0 | 1 | 0 | 0 | 0 | 0 | 0 |
| 0 | 0 | 0 | 0 | 0 | 0 | 0 | 0 | 0 | 0 | 0 | 0 | 0 | 1 | 0 | 0 | 0 | 0 |
| 0 | 0 | 0 | 0 | 0 | 0 | 0 | 0 | 0 | 0 | 0 | 0 | 0 | 0 | 1 | 0 | 0 | 0 |
| 0 | 0 | 0 | 0 | 0 | 0 | 0 | 0 | 0 | 0 | 0 | 0 | 0 | 0 | 0 | 1 | 0 | 0 |
| 0 | 0 | 0 | 0 | 0 | 0 | 0 | 0 | 0 | 0 | 0 | 0 | 0 | 0 | 0 | 0 | 1 | 0 |
| 0 | 0 | 0 | 0 | 0 | 0 | 0 | 0 | 0 | 0 | 0 | 0 | 0 | 0 | 0 | 0 | 0 | 1 |
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 1 | 0 | 0 | 0 | 0 | 0 | 0 | 0 | 0 | 0 | 0 | 0 | 0 | 0 |

| (D) | | | | | | | | | | |
|---|---|---|---|---|---|---|---|---|---|---|
| T14 | T15 | T16 | T17 | T18 | T19 | T20 | T21 | T22 | T23 | T24 |
| D10 | D9 | D8 | D7 | D6 | D5 | D4 | D3 | D2 | D1 | D0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 1 | 0 | 0 | 0 | 0 | 0 | 0 | 0 | 0 | 0 | 0 |
| 0 | 1 | 0 | 0 | 0 | 0 | 0 | 0 | 0 | 0 | 0 |
| 0 | 0 | 1 | 0 | 0 | 0 | 0 | 0 | 0 | 0 | 0 |
| 0 | 0 | 0 | 1 | 0 | 0 | 0 | 0 | 0 | 0 | 0 |
| 0 | 0 | 0 | 0 | 1 | 0 | 0 | 0 | 0 | 0 | 0 |
| 0 | 0 | 0 | 0 | 0 | 1 | 0 | 0 | 0 | 0 | 0 |
| 0 | 0 | 0 | 0 | 0 | 0 | 1 | 0 | 0 | 0 | 0 |
| 0 | 0 | 0 | 0 | 0 | 0 | 0 | 1 | 0 | 0 | 0 |
| 0 | 0 | 0 | 0 | 0 | 0 | 0 | 0 | 1 | 0 | 0 |
| 0 | 0 | 0 | 0 | 0 | 0 | 0 | 0 | 0 | 1 | 0 |
| 0 | 0 | 0 | 0 | 0 | 0 | 0 | 0 | 0 | 0 | 1 |
| 0 | 0 | 0 | 0 | 0 | 0 | 0 | 0 | 0 | 0 | 0 |

F I G. 68
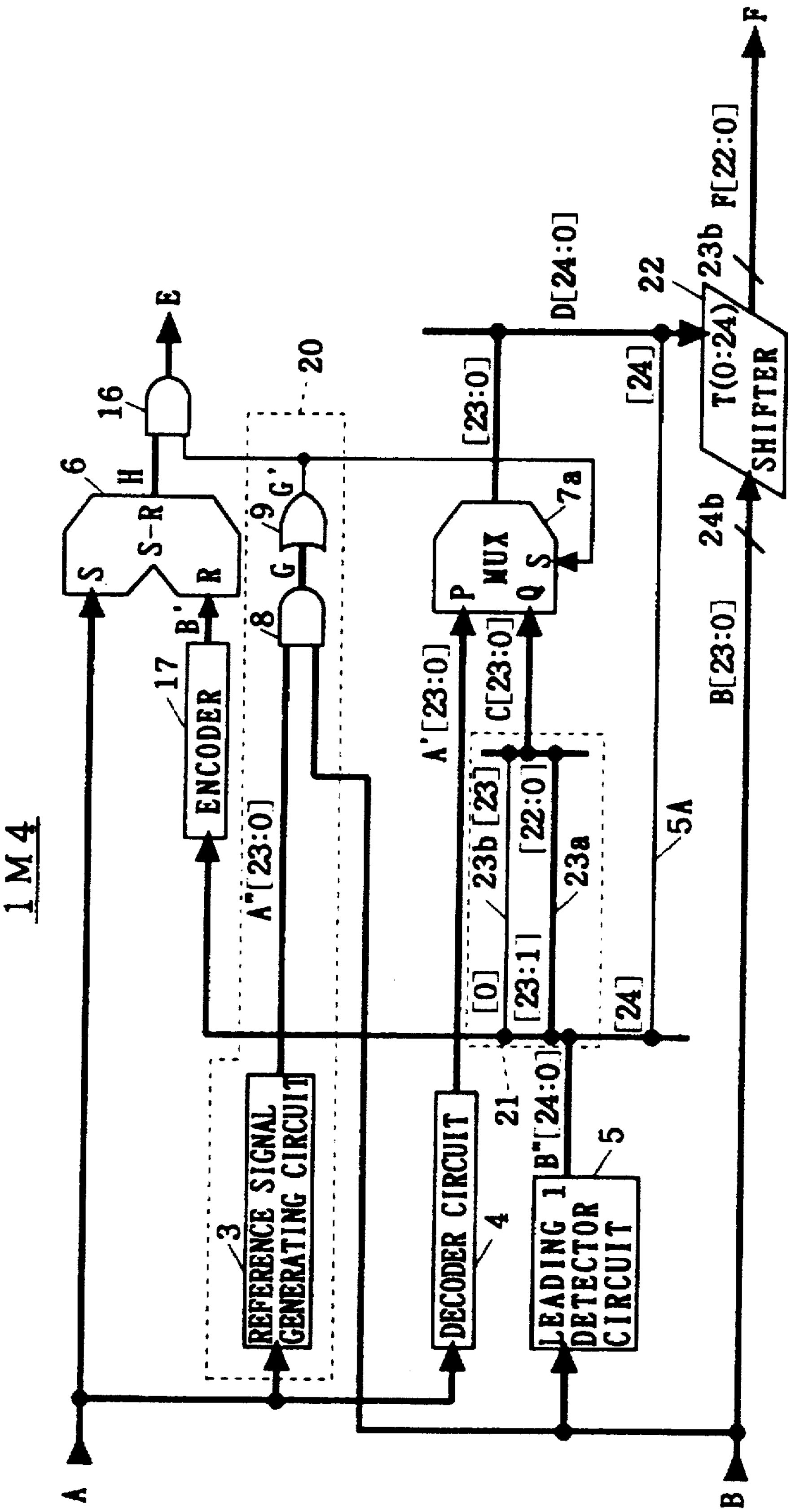

1M7

F I G. 7 3
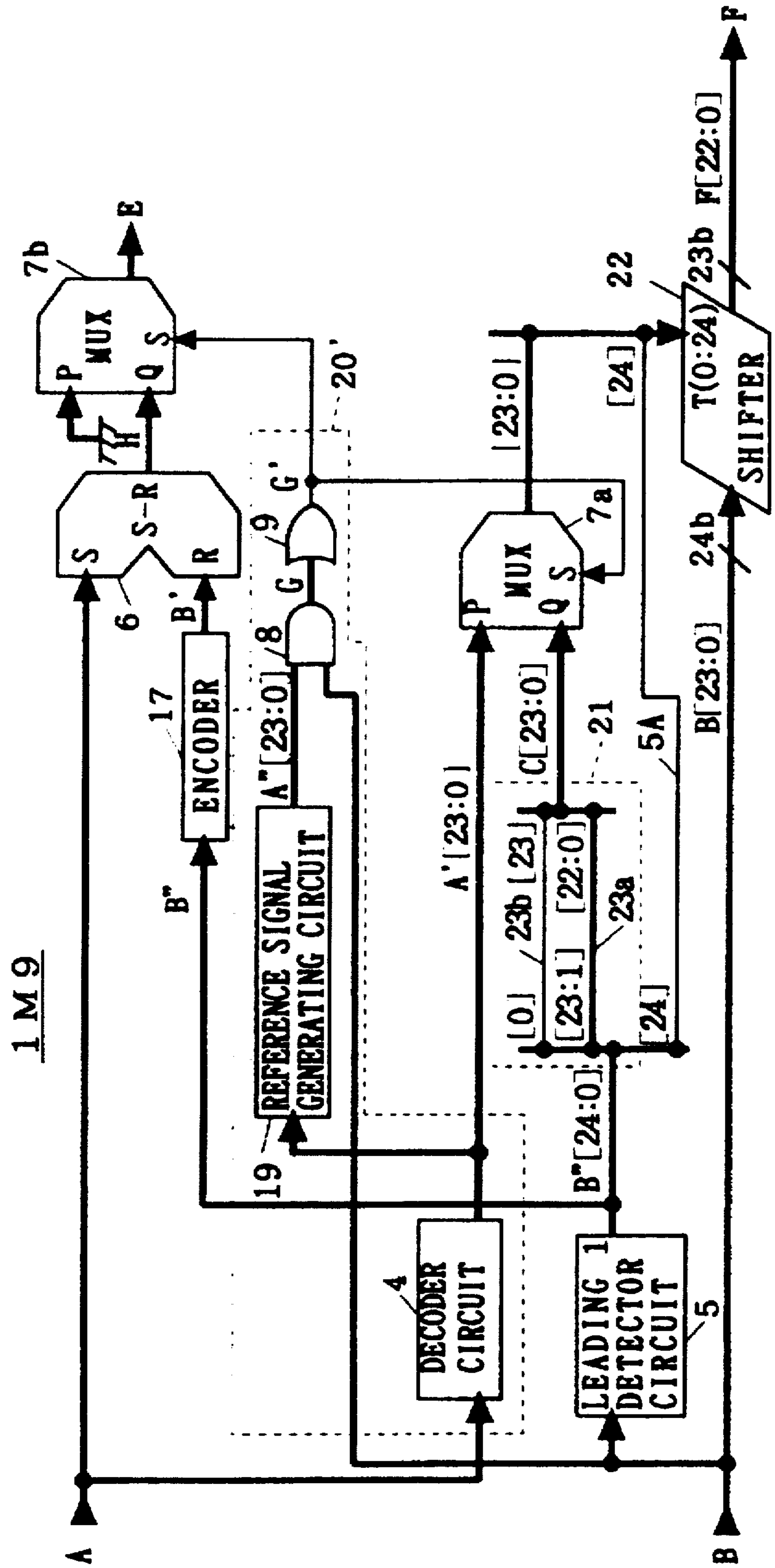

1M10

1M11

NORMALIZATION CIRCUIT DEVICE OF FLOATING POINT COMPUTATION DEVICE

BACKGROUND OF THE INVENTION

1. Field of the Invention

The present invention relates to a normalization circuit device of a floating point computation device.

2. Description of the Background Art

Conventional arts of the normalization circuits of floating point computation devices include that disclosed in U.S. Pat. No. 5,103,418. The normalization circuit described in the reference is made for the purpose of enabling both of the normalization computation and the unnormalization computation at a high speed in the same circuit, which adopts the structure shown below.

That is to say, the exponent part (binary value) in the computation result in an arithmetic circuit on the preceding stage is decoded in a decoder, OR operation is applied to all bit states of both the output of the decoder and the mantissa part in the computation result to obtain a combined value of the two, the bit position of a leading one of this combined value is detected by a leading one detector and the mantissa part in the computation result is shifted to the higher a value of the detected bit position.

As described above, the conventional art has the advantage that both normalization computation and unnormalization computation can be processed at high speed. In the floating point computation, especially when subtraction is included, however, the value of the mantissa part obtained as a computation result may naturally be all zeros. In such a case, the value of the exponent part must be 0, too. If it is referred to as a "0 function" herein, the conventional art has the problem of lacking the "0 function".

Such a circuit as shown in FIG. 43 is supposed as measures for solving the problem of the conventional normalization circuit devcie for a floating point computation devcie described above. The art of the circuit shown in FIG. 43 is not a prior art but an unknown art.

In FIG. 43, the reference characters denote elements as follows. That is, 101 denotes a priority encoder circuit, 102 denotes a subtracter circuit, 103*a*, 103*b* denote multiplexer circuits (MUX circuits), 104 denotes a decoder circuit, 105 denotes a shifter circuit, 106 denotes a 0 detecting circuit for detecting 0 in the mantissa part including OR gate circuits, and 107 denotes a forced zero circuit capable of forcing the exponent part to zero and including AND gate circuits.

In FIG. 43, the reference A denotes an input signal providing an input value of the exponent part, the reference B denotes an input signal providing an input value of the mantissa part and the reference C denotes a signal providing an output value of the exponent part. The reference D denotes a control signal providing a value representing the moved amount (shift amount) for normalizing the input signal B of the mantissa part. Furthermore, the reference E denotes a signal providing an output value of the mantissa part.

Next, a description will be made on functions of the respective circuit parts and operation of the entire circuit with the exponent part (A, C) of 8 bits, the mantissa part (B, E) of 24 bits and the moved amount (D) of 32 bits.

The priority encoder circuit 101 is a circuit which retrieves the bit states of the input signal B sequentially from the most significant bit and represents in a binary value B' a number obtained by subtracting 1 from the number value of the position of the leading "1" counted from the most significant bit position. That is to say, the bit width of the output signal B' is $\{int(\log_2(n-1))+1\}$ bits when the input signal B is n bits long. Accordingly, if the input signal B to the priority encoder circuit 101 is 24 bits long, the bit width of the output signal B' is 5 bits. FIG. 44 and FIG. 45 show a truth table of the priority encoder circuit 101 when the input is 24 bits long. Note that the value of the output signal B' is all 0 in the priority encoder circuit 101 when the value of the input signal B is all 0.

The subtracter circuit 102 receives the input signal A and the output signal B' respectively as the input signals S and R and applies subtraction to the input signals S and R. The subtraction result is outputted as an output signal (S−R) and a carry output signal Fco (Fco is 1 when S≧R).

The MUX circuits 103*a* and 103*b* are circuits for selecting their input signals P and Q according to the value of the control signal S which is the carry output signal Fco. That is to say, when the control signal S is "0", the input signal P is selected as the output signal G, D' and when the control signal S is "1", the input signal Q is selected as the output signal G, D'.

The decoder circuit 104 is a circuit for decoding the input signal D' represented in a binary value. FIG. 46 to FIG. 50 show its truth table when the input is 5 bits long.

The shifter circuit 105 is a circuit for shifting the input signal B according to the control signal D. Its truth table is shown in FIG. 51 to FIG. 55 about the case where the control signal is 32 bits long.

The mantissa part 0 detecting circuit 106 is a circuit for detecting that the mantissa part is "0". That is to say, its output signal H is "0" when the mantissa part is all 0 and the output signal H is "1" when the mantissa part is not 0.

The exponent part forced zero circuit 107 is a circuit which forces the output signal C of the exponent part to 0 when the output signal H is 0, i.e., when the mantissa part is all 0.

Next, the circuit operation will be described. Now, it is assumed that the exponent part input signal A and the mantissa part input signal B are given as A=127, B=0000 0001 0001 0001 0001 0001, respectively.

(1) The output signal B' of the priority encoder circuit 101 is given as B'=7.

(2) The output signal F and the carry output signal Fco of the subtracter circuit 102 are given as follows.

F=A−B'→127−7→120.

Fco=A≧B'→127≧7→1.

(3) The output signal G of the MUX circuit 103*a* is found as follows.

G=Fco?F:0→1?120: 0→120.

(4) The output signal H of the mantissa part 0 detecting circuit 106 is expressed as H=|B→1.

(5) The output signal C of the exponent part forced zero circuit 107 is given as follows.

C=G & H→120 & 1→120.

(6) The output signal D' of the MUX circuit 103*b* is given as follows.

D'=Fco?B': A→1?7: 127→7.

(7) The output signal D of the decoder circuit 104 is given as follows.

D=0000 0000 0000 0000 0000 0000 1000 0000.

(8) The output signal E of the shifter circuit 105 is given as follows.

E=1000 1000 1000 1000 1000 0000.

As stated above, the normalization computation is correctly performed.

Next, it is assumed that A=5 and B=0000 0001 0001 0001 0001 0001.

(1) The value of the output signal B' of the priority encoder circuit 101 is 7.

(2) The values of the output signal F and the carry output signal Fco of the subtracter circuit 102 are given as follows.

F=A−B'→5−7→−2.

Fco=A≧B'→5≧7→0.

(3) The value of the output signal G of the MUX circuit 103*a* is given as follows.

G=Fco?F:0→0?−2:0→0.

(4) The value of the output signal H of the mantissa part 0 detecting circuit 106 is found as H=|B→1.

(5) The output signal C of the exponent part forced zero circuit 107 is given as C=G & H→0 & 1→0.

(6) The value of the output signal D' of the MUX circuit 103*b* is given as follows.

D'=Fco?B':A→0?7:5→5.

(7) The value of the output signal D of the decoder circuit 104 is given as follows.

D=0000 0000 0000 0000 0000 0000 0010 0000.

(8) The value of the output signal E of the shifter circuit 105 is represented as follows.

E=0010 0010 0010 0010 0010 0000.

As described above, the unnormalization operation is correctly carried out.

Furthermore, it is assumed that A=7, B=0000 0001 0001 0001 0001 0001.

(1) The output signal B' of the priority encoder circuit 101 is given as B'=7.

(2) The output signal F, the carry output signal Fco of the subtracter circuit 102 are found as follows.

F=A−B'→−7−7→0.

Fco=A≧B'→7≧7→1.

(3) The output signal G of the MUX circuit 103*a* is given as follows.

G=Fco?F:0→1?0:0→0.

(4) The output signal H of the mantissa part 0 detecting circuit 106 is found as H=|B→1.

(5) The output signal C of the exponent part forced zero circuit 107 is given as follows.

C=G&H→0&1→0.

(6) The output signal D' of the MUX circuit 103*b* is given as follows.

D'=Fco?B':A→1?7:7→7.

(7) The output signal D of the decoder circuit 104 is given as follows.

D=0000 0000 0000 0000 0000 0000 0010 0000.

(8) The output signal E of the shifter circuit 105 is expressed as follows.

E=1000 1000 1000 1000 1000 0000.

As described above, the normalization computation processing is correctly performed.

Furthermore, it is assumed that A=127, B=0000 0000 0000 0000 0000 0000.

(1) The output signal B' of the priority encoder circuit 101 is given as B'=0.

(2) The output signal F, the carry output signal Fco of the subtracter circuit are given as follows.

F=A−B'→127−0→127.

Fco=A≧B'→127≧0→1.

(3) The output signal G of the MUX circuit 103*a* is given as follows.

G=Fco?F:0→1?127:0→127.

(4) The output signal H of the mantissa part 0 detecting circuit 106 is found as H=|B→0.

(5) The output signal C of the exponent part forced zero circuit 107 is given as follows.

C=G&H→127&0→0.

(6) The output signal D' of the MUX circuit 103*b* is expressed as follows.

D'=Fco?B':A→1?0:127→0.

(7) The output signal D of the decoder circuit 104 is given as follows.

D=0000 0000 0000 0000 0000 0000 0000 0001.

(8) The output signal E of the shifter circuit 105 is given as follows.

E=0000 0000 0000 0000 0000 0000.

This way, the "0 function" is certainly carried out.

As exemplified above, the normalization circuit proposed in FIG. 43 can realize the "0 function" in addition to the normalization computation and the unnormalization computation, which solves the problem of the conventional art. In order to render the exponent part 0 when the mantissa part is 0, however, the circuit shown in FIG. 43 specially requires the OR circuit 106 for detecting that the mantissa part is 0. As the bit width of the input signal B is large, such a scheme of applying OR operation processing to all the input signal lines of the mantissa part input signal B causes an increase in circuit scale, which is not preferred in view of circuit design.

Furthermore, as a result of implementing the OR circuit 106, the normalization circuit of FIG. 43 adopts the structure in which operations are performed mainly on the path of the input signal B which requires a longer time before transmission to the normalization circuit than the input signal A. Hence, the most delayed path, or a critical path takes the path from the input signal B of the mantissa part to the priority encoder circuit 101→the subtracter circuit 102 (Fco output)→the MUX circuit 103*b*→the decoder circuit 104→the control signal D→the shifter circuit 105→the mantissa part output signal E, which is longer than the critical path in the conventional art.

As described above, while enjoying the "0 function" which the conventional art lacks, the normalization circuit proposed in FIG. 43 has a problem that it can not provide the excellent characteristic of the high speed operation provided by the conventional art.

SUMMARY OF THE INVENTION

A first aspect of the present invention is directed to a normalization circuit device of a floating point computation device which applies normalization to a mantissa part input signal and an exponent part input signal represented as binary numbers subjected to certain floating point computation processing and transmitted. According to the present invention, the normalization circuit device of a floating point computation device comprises: control signal generating means receiving the mantissa part input signal and the exponent part input signal, for generating a control signal at a first level when a decimal number value provided by the exponent part input signal is equal to or above an address number value of a leading 1 bit position as a bit position where a bit state first attains 1 seen from a most significant bit of the mantissa part input signal and for generating the control signal at a second level when the decimal number value of the exponent part input signal is below the address number value of the leading 1 bit position or when the mantissa part input signal provides a 0 value; encode means for outputting a signal representing the address number value of the leading 1 bit position in a binary number on the basis of the mantissa part input signal; and exponent part output signal determining means receiving the exponent part input signal, the output signal of the encode means and the control signal, for outputting as an exponent part output signal a result of subtraction of the exponent part input signal and the output signal of the encode means when the control signal is at the first level, and for outputting a 0 value as the exponent part output signal when the control signal is at the second level; wherein the address number value of the leading 1 bit position corresponds to a value obtained by counting each bit position from the most significant bit position excluding the most significant bit itself.

Preferably, according to a second aspect of the present invention, in the normalization circuit device of the floating point computation device according to the first aspect, the control signal generating means comprises reference signal generating means receiving the exponent part input signal for outputting a reference signal, and logic operation means for performing AND processing of the reference signal and the mantissa part input signal, and for further carrying out OR processing of the result of the AND processing to output the result of the OR processing as the control signal, and in the reference signal, each bit state from its most significant bit position to a certain bit position determined on the basis of the exponent part input signal being all set to 1 and bit states of other bit positions being all set to 0.

Preferably, according to a third aspect of the present invention, in the normalization circuit device of the floating point computation device according to the second aspect, in the reference signal, bit states of respective bit positions from its most significant bit position are all set to 1 for the number of positions corresponding to a value obtained by adding 1 to the decimal number value of the exponent part input signal and bit states of other bit positions are all set to 0.

Preferably, according to a fourth aspect of the present invention, in the normalization circuit device of the floating point computation device according to the second aspect, in the reference signal, bit states of respective bit positions from its most significant bit position are all set to 1 for the number of positions corresponding to the decimal number value of the exponent part input signal and bit states of other bit positions are all set to 0.

Preferably, according to a fifth aspect of the present invention, in the normalization circuit device of the floating point computation device according to the second aspect, the reference signal generating means comprises decoder means for decoding the exponent part input signal and main reference signal generating means receiving an output signal of the decoder means for generating the reference signal.

Preferably, according to a sixth aspect of the present invention, the normalization circuit device of the floating point computation device according to the fifth aspect further comprises leading 1 detecting means receiving the mantissa part input signal for detecting the leading 1 bit position of the mantissa part input signal, selecting means receiving an output signal of the leading 1 detecting means except its most significant bit, the output signal of the decoder means and the control signal, for selecting the output signal of the leading 1 detecting means when the control signal is at the first level and for selecting the output signal of the decoder means when the control signal is at the second level, and shifter means for shifting the mantissa part input signal on the basis of an output signal of the selecting means and a part providing the most significant bit in the output signal of the leading 1 detecting means to generate a mantissa part output signal.

In this aspect, a circuit for detecting that the mantissa part input signal is "0" is not required.

Furthermore, usually, a time required for signal transmission to a normalization circuit in a floating point computation device such as a floating point adder and a floating point multiplier is longer with the mantissa part input signal than with the exponent part input signal. This is due to the fact that the mantissa part generally has a larger bit width than that of the exponent part input signal so that the calculation is more complicated. Accordingly, if a normalization circuit device is included in the most delayed path (i.e., a critical path) of the entirety of a general floating point computation device, the path from the mantissa part input signal to the mantissa pan output signal will form a critical path in most cases. In this aspect of the invention, the most delayed path (critical path) is the path from the mantissa part input signal to the leading 1 detecting means→the selecting means→the shifter means→the mantissa part output signal, which enables a high speed normalization circuit device.

Preferably, according to a seventh aspect of the present invention, in the normalization circuit device of the floating point computation device according to the second aspect, with a bit width of the actually inputted mantissa part input signal and a bit width of a mantissa part output signal predetermined by standard being x bits and y bits, respectively, the normalization circuit device further includes; decoder means for decoding the exponent part input signal; leading 1 detecting means receiving the mantissa part input signal for detecting the leading 1 bit position of the mantissa part input signal; first shift means receiving an output signal of the leading 1 detecting means except its most significant bit, for shifting each bit state of the output signal a bit toward its least significant bit and for setting a bit state of the least significant bit to a bit state of a most significant bit of the inputted output signal; selecting means receiving an output signal of the first shift means, the output signal of the decoder means and the control signal, for selecting the output signal of the shift means when the control signal is at the first level, and for selecting the output signal of the decoder means when the control signal is at the second level; and second shift means for shifting the mantissa part input signal of the x bits into a signal of the y bits according to the output signal of the selecting means and a part of the output signal of the leading 1 detecting means providing the most significant bit to output the y-bit signal after shifted as the mantissa part output signal; wherein the second shift means shifts the mantissa part input signal when the selecting means outputs the output signal of the first shift means so as to eliminate the most significant bit of the mantissa part input signal and eliminate each bit on its least significant bit side for a number given by (x−y−1) including the least significant bit, and when the selecting means outputs the output signal of the decoder means the second shift means shifts the mantissa part input signal so as to eliminate each bit on the least significant bit side for a number given by (x−y) including the least significant bit of the mantissa part input signal.

Preferably, according to a eighth aspect of the present invention, in the normalization circuit device of the floating point computation device according to the seventh aspect, wherein the first shift means is realized only with interconnection layers connecting an output port of the output signal of the leading 1 detecting means except the most significant bit and one input port of the selecting means, and the other input port of the selecting means is supplied with the output signal of the decoder means.

Preferably, according to a ninth aspect of the present invention, in the normalization circuit device of the floating point computation device according to the second aspect, with a bit width of the actually inputted mantissa part input signal and a bit width of a mantissa part output signal predetermined by standard being x bits and y bits, respectively, the encode means comprising; leading 1 detecting means receiving the mantissa part input signal for detecting the leading 1 bit position of the mantissa part input signal, and an encoder circuit for encoding a detection result of the leading 1 detecting means to output the signal representing the address number value of the leading 1 bit position in a binary number; the normalization circuit device further comprises; decoder means for decoding the exponent part input signal; first shift means receiving the output signal of the leading 1 detecting means except its most significant bit, for shifting each bit state of the output signal a bit toward its least significant bit and for setting a bit state of the least significant bit to a bit state of the most significant bit of the inputted output signal; selecting means receiving an output signal of the first shift means, the output signal of the decoder means and the control signal, for selecting the output signal of the shift means when the control signal is at the first level, and for selecting the output signal of the decoder means when the control signal is at the second level; and second shift means for shifting the mantissa part input signal of the x bits into a signal of the y bits according to the output signal of the selecting means and a part of the output signal of the leading 1 detecting means providing the most significant bit to output the y-bit signal after shifted as the mantissa part output signal; wherein the second shift means shifts the mantissa part the selecting when the selecting means outputs the output signal of the first shift means so as to eliminate the most significant bit of the mantissa part input signal and eliminate each bit on its least significant bit side for a number provided by (x−y−1) including the least significant bit, and when the selecting means outputs the output signal of the decoder means the second shift means shifts the mantissa part input signal so as to eliminate each bit on the least significant bit side for a number given by (x−y) including the least significant bit of the mantissa part input signal.

Preferably, according to a tenth aspect of the present invention, in the normalization circuit device of the floating point computation device according to the ninth aspect, wherein the first shift means is realized only with interconnection layers connecting an output port of the output signal of the leading 1 detecting means except the most significant bit and one input port of the selecting means, and the other input port of the selecting means is supplied with the output signal of the decoder means.

Preferably, according to a eleventh aspect of the present invention, in the normalization circuit device of the floating point computation device according to the fifth aspect, with a bit width of the actually inputted mantissa part input signal and a bit width of a mantissa part output signal predetermined by standard being x bits and y bits, respectively, the normalization circuit device further comprises; leading 1 detecting means receiving the mantissa part input signal for detecting the leading 1 bit position of the mantissa part input signal; first shift means receiving an output signal of the leading 1 detecting means except its most significant bit, for shifting each bit state of the output signal a bit toward its least significant bit and for setting a bit state of the least significant bit to a bit state of the most significant bit of the inputted output signal; selecting means receiving an output signal of the first shift means, the output signal of the decoder means and the control signal, for selecting the output signal of the shift means when the control signal is at the first level, and for selecting the output signal of the decoder means when the control signal is at the second level; and second shift means for shifting the mantissa pan input signal of the x bits into a signal of the y bits according to the output signal of the selecting means and a part of the output signal of the leading 1 detecting means providing the most significant bit to output the y-bit signal after shifted as the mantissa part output signal; wherein the second shift means shifts the mantissa part input signal when the selecting means outputs the output signal of the first shift means so as to eliminate the most significant bit of the mantissa part input signal and eliminate each bit on the least significant bit side for a number given by (x−y−1) including the least significant bit, and when the selecting means outputs the output signal of the decoder means the second shift means shifts the mantissa part input signal so as to eliminate each bit on the least significant bit side for a number given by (x−y) including the least significant bit of the mantissa part input signal.

Preferably, according to a twelfth aspect of the present invention, in the normalization circuit device of the floating point computation device according to the eleventh aspect, wherein the first shift means is realized only with interconnection layers connecting an output port of the output signal of the leading 1 detecting means except the most significant bit and one input port of the selecting means, and the other input port of the selecting means is supplied with the output signal of the decoder means.

Preferably, according to a thirteenth aspect of the present invention, in the normalization circuit device of the floating point computation device according to the fifth aspect, with a bit width of the actually inputted mantissa part input signal and a bit width of a mantissa part output signal predetermined by standard being x bits and y bits, respectively, the encode means comprising; leading 1 detecting means receiving the mantissa part input signal for detecting the leading 1 bit position of the mantissa part input signal, and an encoder circuit for encoding a detection result of the leading 1 detecting means to output the signal representing the address number value of the leading 1 bit position in a binary number; the normalization circuit further comprises; first shift means receiving the output signal of the leading 1 detecting means except its most significant bit, for shifting each bit state of the output signal one bit toward its least significant bit and for setting a bit state of the least significant bit to a bit state of the most significant bit of the inputted output signal; selecting means receiving an output signal of the first shift means, the output signal of the decoder means and the control signal, for selecting the output signal of the shift means when the control signal is at the first level, and for selecting the output signal of the decoder means when the control signal is at the second level; and second shift means for shifting the mantissa part input signal of the x bits into a signal of the y bits according to the output signal of the selecting means and a part of the output signal of the leading 1 detecting means providing the most significant bit to output the y-bit signal after shifted as the mantissa part output signal; wherein the second shift means shifts the mantissa part input signal when the selecting means outputs the output signal of the first shift means so as to eliminate the most significant bit of the mantissa part input signal and eliminate each bit on its least significant bit side for a number given by (x−y−1) including the least significant bit, and when the selecting means outputs the output signal of the decoder means the second shift means shifts the mantissa part input signal so as to eliminate each bit on the least significant bit side for a number given by (x−y) including the least significant bit of the mantissa part input signal.

Preferably, according to each of eighth, tenth, twelfth and fourteenth aspects of the present invention, in any of the normalization circuit devices of the floating point computation device according to the seventh, ninth, eleventh and thirteenth aspects, the first shift means is realized only with interconnection layers connecting an output port of the output signal of the leading 1 detecting means except the most significant bit and one input port of the selecting means, and the other input port of the selecting means is supplied with the output signal of the decoder means.

According to a fifteenth aspect of the present invention, a normalization circuit device of a floating point computation device which applies normalization to a mantissa part input signal and an exponent part input signal represented as binary numbers subjected to certain floating point computation processing and transmitted, comprises: control signal generating means receiving the mantissa part input signal and the exponent part input signal, for decoding the exponent part input signal, and determining on the basis of the mantissa part input signal and the exponent part input signal whether an output result of the normalization circuit device is a normalization number, or an unnormalization number, or it is a 0 function state where the mantissa part input signal provides a 0 value to generate a control signal at a first level when it is the normalization number and generate the control signal at a second level when it is the unnormalization number or when it is in the 0 function state; leading 1 detecting means receiving the mantissa part input signal for detecting a leading 1 bit position of the mantissa part input signal; first shift means receiving an output signal of the leading 1 detecting means except its most significant bit, for shifting each bit state of the output signal one bit toward its least significant bit and for setting a bit state of the least significant bit to a bit state of the most significant bit of the inputted output signal; selecting means receiving an output signal of the first shift means, the output signal of the decoder means and the control signal, for selecting the output signal of the first shift means when the control signal is at the first level, and for selecting the output signal of the decoder means when the control signal is at the second level; and second shift means for shifting the mantissa part input signal of x bits into a signal of y bits according to the output signal of the selecting means and a part of the output signal of the leading 1 detecting means providing the most significant bit to output the y-bit signal after shifted as the mantissa part output signal; the x bits and the y bits being a bit width of the actually inputted mantissa part input signal and a bit width of a mantissa part output signal predetermined by standard, respectively; wherein the second shift means shifts the mantissa part input signal when the selecting means outputs the output signal of the first shift means so as to eliminate the most significant bit of the mantissa part input signal and eliminate each bit on its least significant bit side for a number provided by (x−y−1) including the least significant bit, and when the selecting means outputs the output signal of the decoder means the second shift means shifts the mantissa part input signal so as to eliminate each bit on the least significant bit side for a number provided by (x−y) including the least significant bit of the mantissa part input signal.

Preferably, according to a sixteenth aspect of the present invention, in the normalization circuit device of the floating point computation device according to the fifteenth aspect, the first shift means is realized only with interconnection layers connecting an output port of the output signal of the leading 1 detecting means except the most significant bit and one input port of the selecting means, and the other input port of the selecting means is supplied with the output signal of the decoder means.

Preferably, according to a seventeenth aspect of the present invention, in the normalization circuit device of the floating point computation device according to the sixteenth aspect, the control signal generating means first decodes the inputted exponent part input signal and then makes the determination on the basis of the decoded exponent part input signal and the mantissa part input signal.

Accordingly, an object of the present invention is to realize in a floating point computation device a high speed normalization circuit device capable of all of normalization, unnormalization and 0 function without incurring increased circuit scale and with simple circuit configuration.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram showing a truth table of the decoder circuit.

FIG. 6 is a diagram showing a truth table of the leading 1 detector circuit.

FIG. 7 is a diagram showing the truth table of the leading 1 detector circuit.

FIG. 8 is a diagram showing the truth table of the leading 1 detector circuit.

FIG. 9 is a circuit diagram of an example of the leading 1 detector circuit.

FIG. 10 is a diagram showing a truth table of the priority encoder circuit.

FIG. 11 is a diagram showing the truth table of the priority encoder circuit.

FIG. 12 is a diagram showing a truth table of the reference signal generating circuit.

FIG. 13 is a diagram showing the truth table of the reference signal generating circuit.

FIG. 15 is a diagram showing a truth table of the shifter circuit.

FIG. 16 is a diagram showing the truth table of the shifter circuit.

FIG. 17 is a diagram showing the truth table of the shifter circuit.

FIG. 20 is a diagram showing a truth table of the reference signal generating circuit.

FIG. 21 is a diagram showing the truth table of the reference signal generating circuit.

FIG. 23 is a circuit diagram of another preferred embodiment of the present invention.

FIG. 24 is a circuit diagram of another preferred embodiment of the present invention.

FIG. 25 is a circuit diagram of another preferred embodiment of the present invention.

FIG. 26 is a diagram showing a truth table of the encoder circuit.

FIG. 27 is a diagram showing the truth table of the encoder circuit.

FIG. 29 is a circuit diagram of another preferred embodiment of the present invention.

FIG. 30 is a circuit diagram of another preferred embodiment of the present invention.

FIG. 32 is a diagram showing a truth table of the reference signal generating circuit.

FIG. 33 is a diagram showing the truth table of the reference signal generating circuit.

FIG. 35 is a diagram showing a truth table of the reference signal generating circuit.

FIG. 36 is a diagram showing the truth table of the reference signal generating circuit.

FIG. 38 is a circuit diagram of another preferred embodiment of the present invention.

FIG. 39 is a circuit diagram of another preferred embodiment of the present invention.

FIG. 42 is a circuit diagram of another preferred embodiment of the present invention.

FIG. 43 is a circuit diagram of one normalization circuit device proposed to solve the conventional problem.

FIG. 44 is a diagram showing a truth table of the priority encoder circuit of FIG. 43.

FIG. 45 is a diagram showing the truth table of the priority encoder circuit of FIG. 43.

FIG. 47 is a diagram showing the truth table of the decoder circuit of FIG. 43.

FIG. 48 is a diagram showing the truth table of the decoder circuit of FIG. 43.

FIG. 49 is a diagram showing the truth table of the decoder circuit of FIG. 43.

FIG. 50 is a diagram showing the truth table of the decoder circuit of FIG. 43.

FIG. 52 is a diagram showing the truth table of the shifter circuit of FIG. 43.

FIG. 54 is a diagram showing the truth table of the shifter circuit of FIG. 43.

FIG. 55 is a diagram showing the truth table of the shifter circuit of FIG. 43.

FIG. 56 is a block diagram showing a circuit configuration of the normalization circuit device of the first preferred embodiment and a conversion circuit incorporated therewith.

FIG. 58 is a block diagram of a floating point computation device of a ninth preferred embodiment of the present invention.

FIG. 60 is a diagram showing a truth table of the shifter circuit shown in FIG. 59.

FIG. 61 is a diagram showing the truth table of the shifter circuit shown in FIG. 59.

FIG. 62 is a diagram showing the truth table of the shifter circuit shown in FIG. 59.

FIG. 68 is a circuit diagram showing a modified example of the ninth preferred embodiment of the present invention.

FIG. 73 is a circuit diagram showing a modified example of the ninth preferred embodiment of the present invention.

DESCRIPTION OF THE PREFERRED EMBODIMENTS

Figure 1:
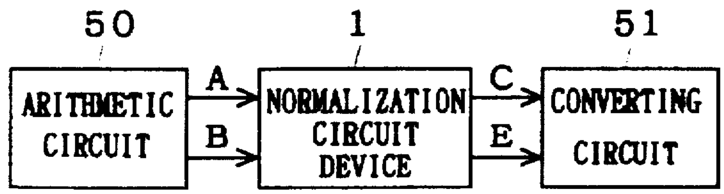
FIG. 1 is a block structure diagram of a floating point computation device.

FIG. 1 is a block diagram showing the schematic structure of a floating point computation device.

In the floating point computation, the output (binary value) of the computation result operated by an arithmetic circuit 50 of FIG. 1 is usually normalized so that the mantissa pan is in the range of 1≦mantissa part <2. (The form of 1.ΔΔΔΔ:Δ means 1 or 0.) When the exponent part is 0, however, the mantissa part is represented as a number smaller than 1 (the form of 0.ΔΔΔ) as an unnormalized number. These computations are based on the IEEE 754 standard, as is well known. Furthermore, when the mantissa part is 0, the exponent part is also made 0. (This is referred to as a "0 function".) The preferred embodiments described below relate to a normalization circuit device 1 (FIG. 1) performing such operations (the normalization computation, the unnormalization computation, the 0 function computation).

(First Preferred Embodiment)

Figure 2:
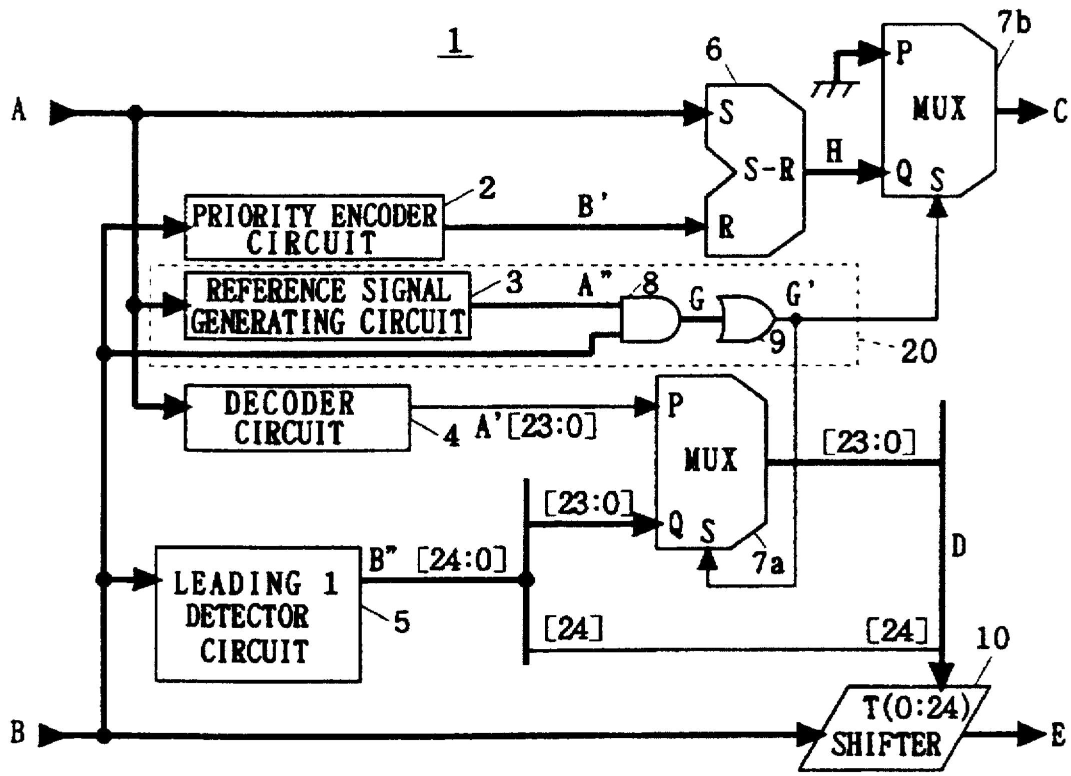
FIG. 2 is a circuit diagram of a preferred embodiment of the present invention.

An example of the normalization circuit device 1 in the floating point computation devcie is shown in FIG. 2. In FIG. 2, the reference characters denote parts as follows. That is to say, 2 denotes a priority encoder circuit, 3 denotes a reference signal generating circuit, 4 denotes a decoder circuit, 5 denotes a leading 1 detector circuit, 6 denotes a subtracter circuit, *7a*, *7b* denote multiplexer circuits, i.e., the MUX circuits, 8 denotes an AND gate circuit, 9 denotes an OR gate circuit, and 10 denotes a shifter circuit. The parts 3, 8, 9 form the "control signal generating portion 20", which is the core portion. As will be clear from the description made later, the control signal generating portion 20 receives the mantissa part input signal and the exponent part input signal to generate a first level control signal when a decimal number value given by the exponent part input signal is equal to or larger than the address number value of the leading 1 bit position of the mantissa part input signal, as a bit position where the bit state first attains 1 seen from the most significant bit and to generate a second level control signal when the decimal number value of the exponent part input signal is smaller than the address number value of the leading 1 bit position or when the mantissa part input signal provides a 0 value.

The output line of the most significant bit $B''_{24}$ of the output signal B" is the line 5A.

In FIG. 2, the character A denotes an exponent part input signal providing the input value of the exponent part, the character B denotes a mantissa part input signal providing the input value of the mantissa part and the character C denotes an exponent part output signal providing the output value of the exponent part, respectively. The character D denotes a shifter control signal providing a value representing the moved amount (shift amount) for normalizing the mantissa part input signal B. Furthermore, the character E denotes a mantissa part output signal providing the output value of the mantissa part. The signals A and B may also simply be referred to as input signals, and the signals C and E may also be simply referred to as output signals.

Next, functions of the respective parts of this circuit 1 will be described in the case where the exponent part (A, C) is 8 bits long, the mantissa part (B, E) is 24 bits long, and the moved amount (D) is 25 bits.

Figure 5:
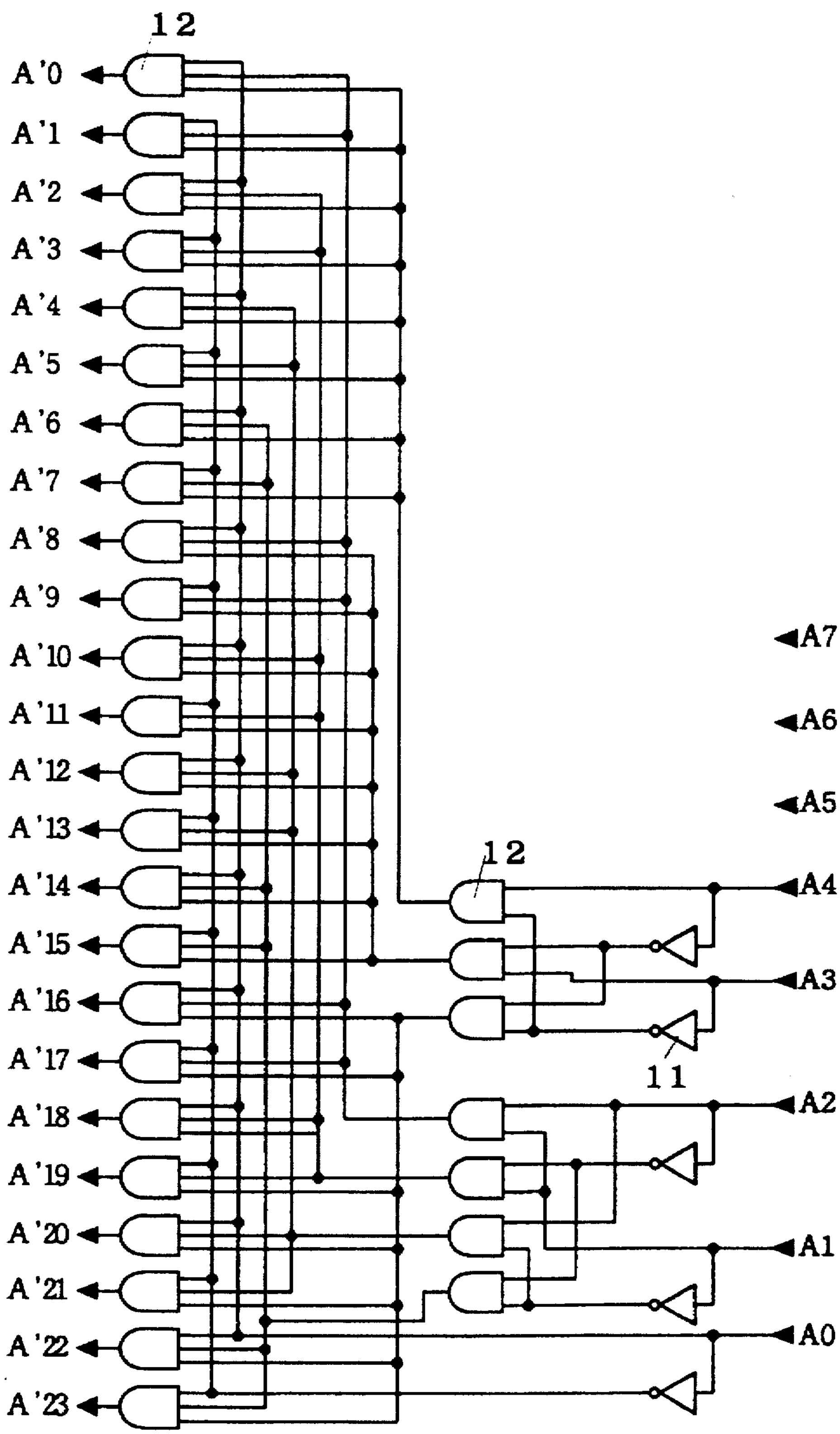
FIG. 5 is a circuit diagram of an example of the decoder circuit.
Figure 4:
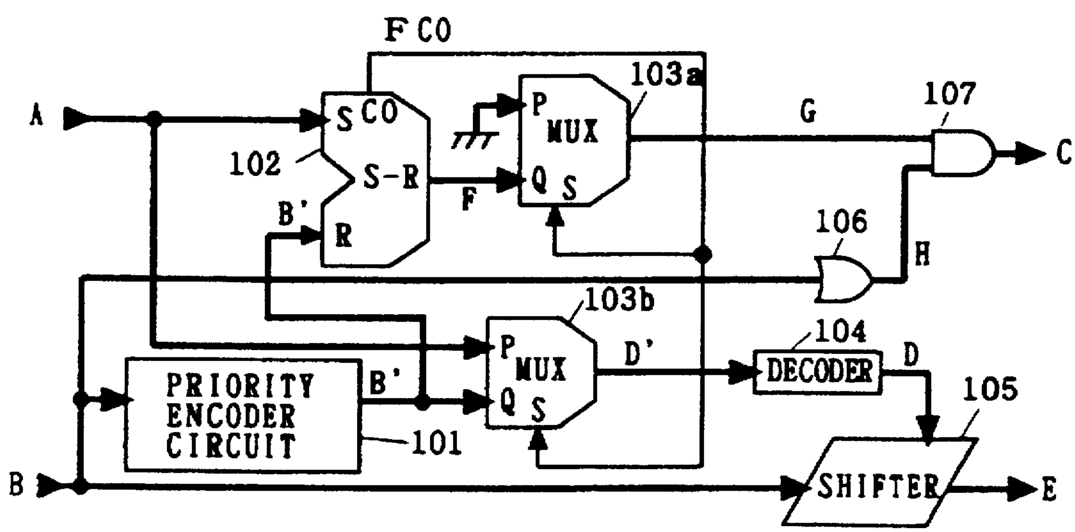
FIG. 4 is a diagram showing the truth table of the decoder circuit.
Figure 46:
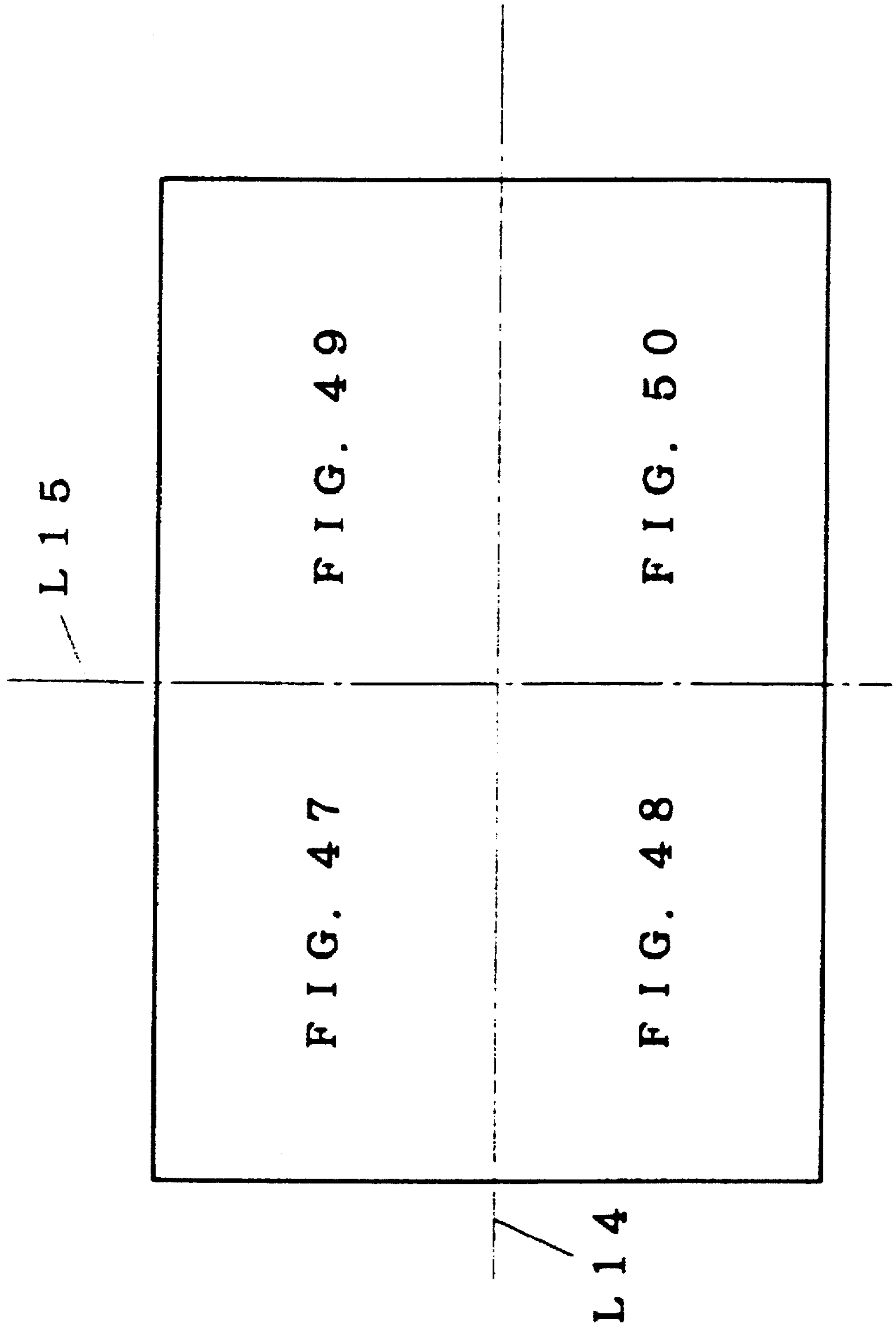
FIG. 46 is a diagram showing a truth table of the decoder circuit of FIG. 43.
Figure 51:
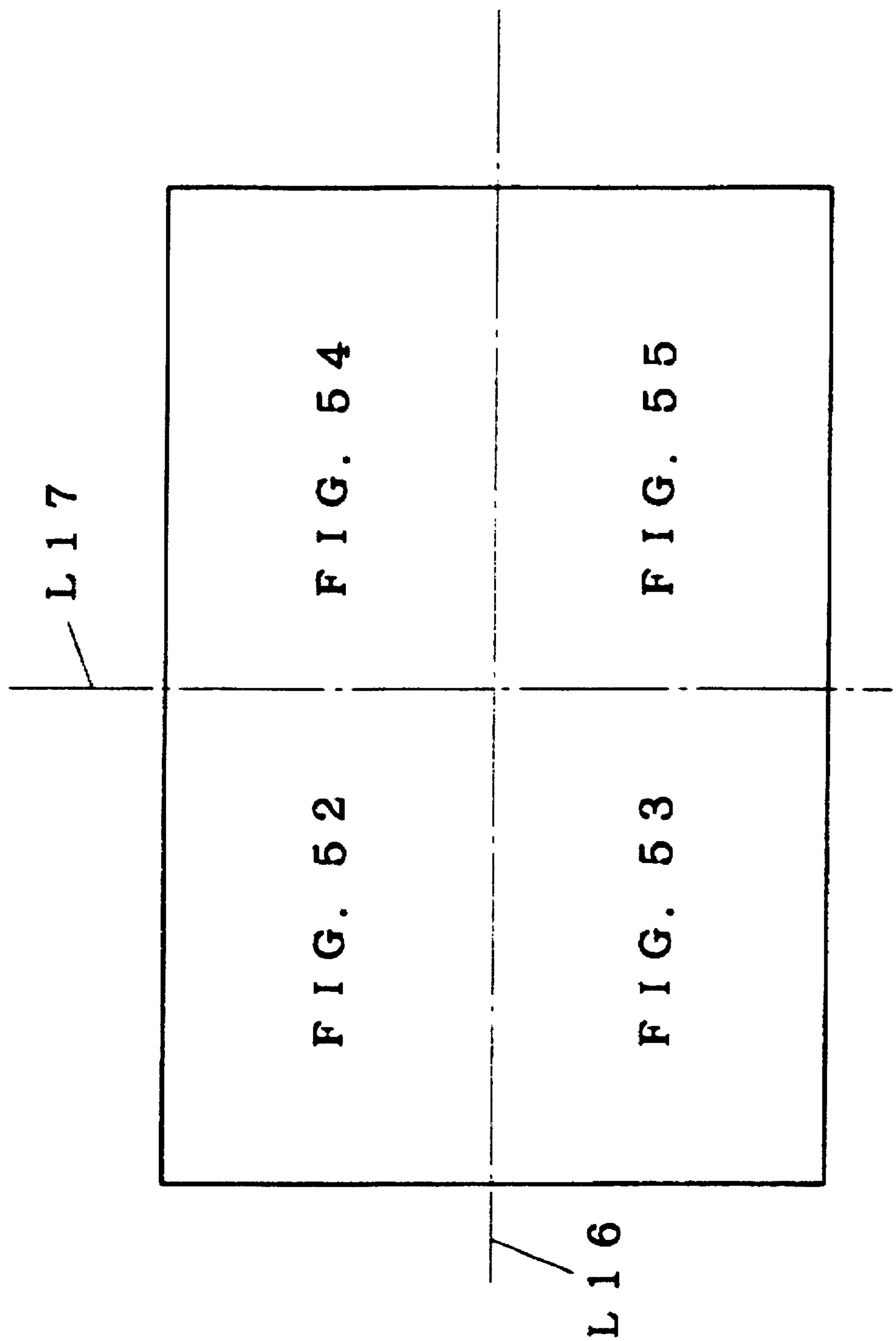
FIG. 51 is a diagram showing a truth table of the shifter circuit of FIG. 43.
Figure 53:
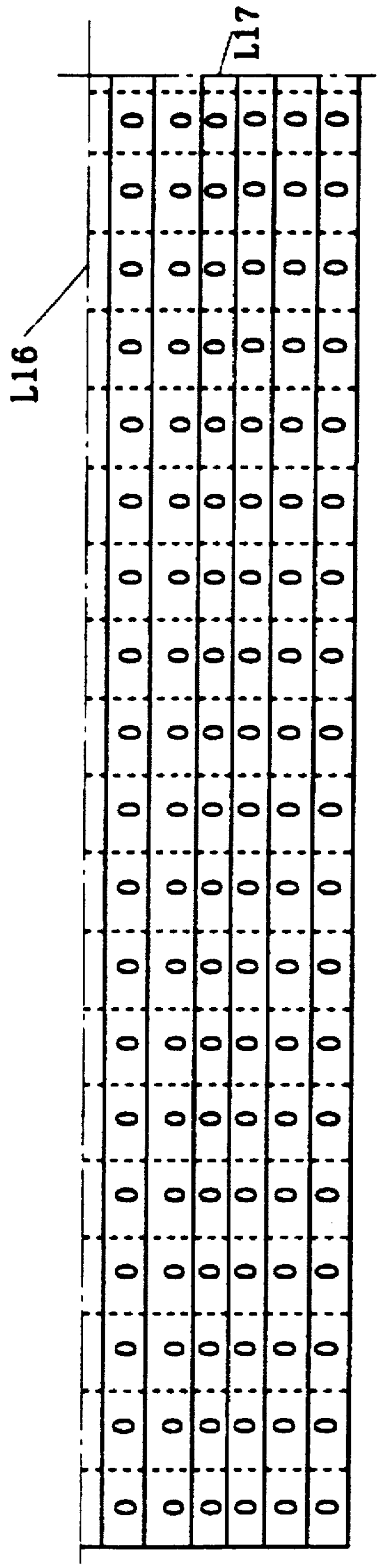
FIG. 53 is a diagram showing the truth table of the shifter circuit of FIG. 43.

The decoder circuit 4 is a circuit which decodes the input signal A represented as a binary value. Its truth table is shown in FIG. 3 and FIG. 4. An example of the specific structure of the decoder circuit 4 when the input is 8 bits long is shown in FIG. 5. In FIG. 5, the reference character 11 denotes an inverter (NOT gate circuit) and the reference character 12 denotes an AND gate circuit.

The leading 1 detector circuit 5 is a circuit which sequentially retrieves the bit states of the input signal B from the most significant bit to the least significant bit and renders "1" the bit state only of the bit position where "1" first exists and renders "0" all bit states of other bit positions. FIG. 6 to FIG. 8 show a truth table of the leading 1 detector circuit 5 when the input is 24 bits in length. An example of specific structure of the leading 1 detector circuit 5 when the input is 24 bits in length is shown in FIG. 9. In FIG. 9, the reference character 11 denotes an inverter (NOT gate circuit) and the reference character 12 denotes an AND gate circuit. As shown in the truth table of FIG. 6 to FIG. 8, when the input signal B is 0, the most significant bit $B''_{24}$ of the output signal B" is 1 and other bits $B''_{23}$ to $B''_0$ are all 0. This exceptional processing is made considering realization of the "0 function".

The priority encoder circuit 2 is a circuit which sequentially retrieves the bit states of the input signal B from the most significant bit $B_{23}$ to the least significant bit $B_0$ and represents in a binary number a number obtained by subtracting 1 from the address number value of the bit position of the leading "1" counted from the most significant bit $B_{23}$. That is to say, the bit width of the output signal B' in the case where the input signal B is n bits long is $\text{int}\{(\log_2(n-1))+1\}$ bits. Accordingly, when the input signal B to the priority encoder circuit 2 is of 24 bits, the bit width of the output signal B' is 5 bits. FIG. 10 and FIG. 11 show a truth table of the priority encoder circuit 2 in the case of the input of 24 bits. In the priority encoder circuit 2, when the value of the input signal B is all 0, the value of the output signal B' is set to 0. This exceptional processing has no special meaning. The circuit 2 corresponds to an encode portion for outputting a signal which binary—represents the address number value of the leading 1 bit position on the basis of the mantissa part input signal.

Figure 14:
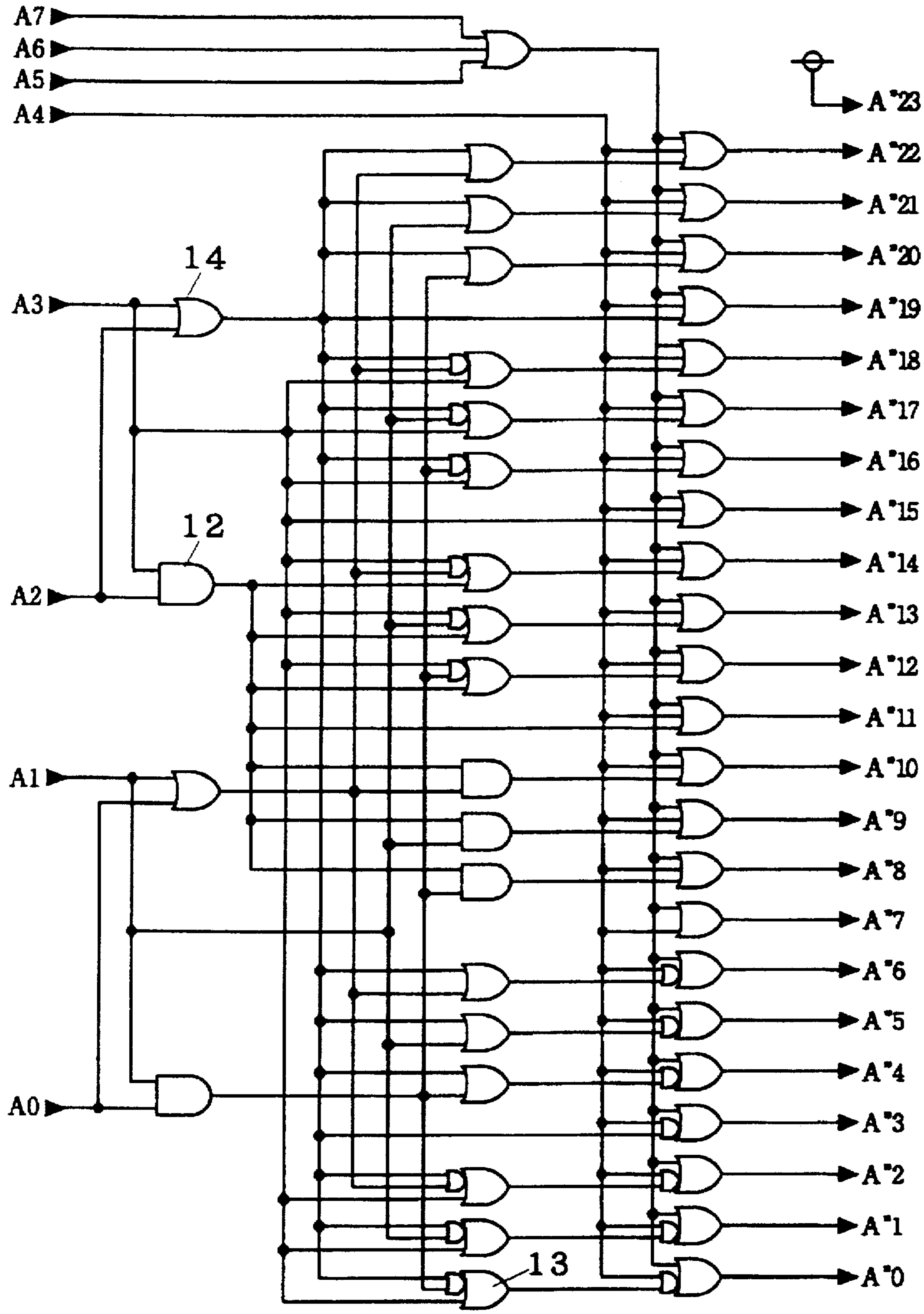
FIG. 14 is a circuit diagram of an example of the reference signal generating circuit.

The reference signal generating circuit 3 is a circuit which sets to "1" the bit states of bit positions of its output signal A" from the most significant bit position for the number of the value obtained by adding 1 to the decimal number value of the input signal A represented in a binary value. FIG. 12 and FIG. 13 show a truth table of the reference signal generating circuit 3. FIG. 14 shows an example of the specific structure of the reference signal generating circuit 3. In FIG. 14, the reference character 12 denotes an AND gate circuit, the reference character 13 denotes an AND-OR gate circuit and the reference character 14 denotes an OR gate circuit. In the reference signal generating circuit 3, when the input signal A has a value of 23 or above, the bit values of the output signal A" are all set to 1.

The AND gate circuit 8 applies AND operation to each bit of the signals A" and B to output the signal G. That is to say, $G_0=A''_0$ & $B_0, G_1=A''_1$ & $B_1$, . . . , $G_{22}=A''_{22}$ & $B_{22}$, $G_{23}=A''_{23}$ & $B_{23}$.

The OR gate circuit 9 performs OR operation of all the bits of the output signal G and outputs the output signal G'. That is to say, the relative expression holds as $G'=G_0$OR $G_1$OR $G_2$OR . . . OR $G_{22}$OR $G_{23}$.

The two gate circuits 8 and 9 form a logic operation portion which performs AND processing of the reference signal and the mantissa part input signal and further executes OR processing of the result of the AND processing, and outputs the result of the OR processing as a control signal.

The subtraction circuit 6 and the MUX circuit *7b* (corresponding to a selection portion) form an exponent part output signal determining portion which receives the exponent part input signal A, the output signal B' of the encode portion 22 and the control signal G' to output the subtraction result of the exponent part input signal A and the output signal B' of the encode portion 2 as the exponent part output signal C when the control signal G' is at the first level, and output a 0 value as the exponent part output signal C when the control signal G' is at the second level.

The subtraction circuit 6 receives the input signal A and the output signal B' respectively as the input signals S and R, performs substraction processing to the input signals S and R and outputs the substraction result as the output signal H from the output signal terminal (S–R).

The MUX circuit 7 (7a, 7b) is a circuit receiving the control signal G' as a control signal S to select the input signals P (ground in the circuit 7b) and Q (equal to the output signal H in the circuit 7b) according to the level of the control signal S. That is to say, when the control signal S is "0", the input signal P is selected as the output signal C and when the control signal S is "1", the input signal Q is selected as the output signal C. If one level value "1" of the control signal S or G' is called "a first level", then the other level value "0" is referred to as "a second level".

Figure 18:
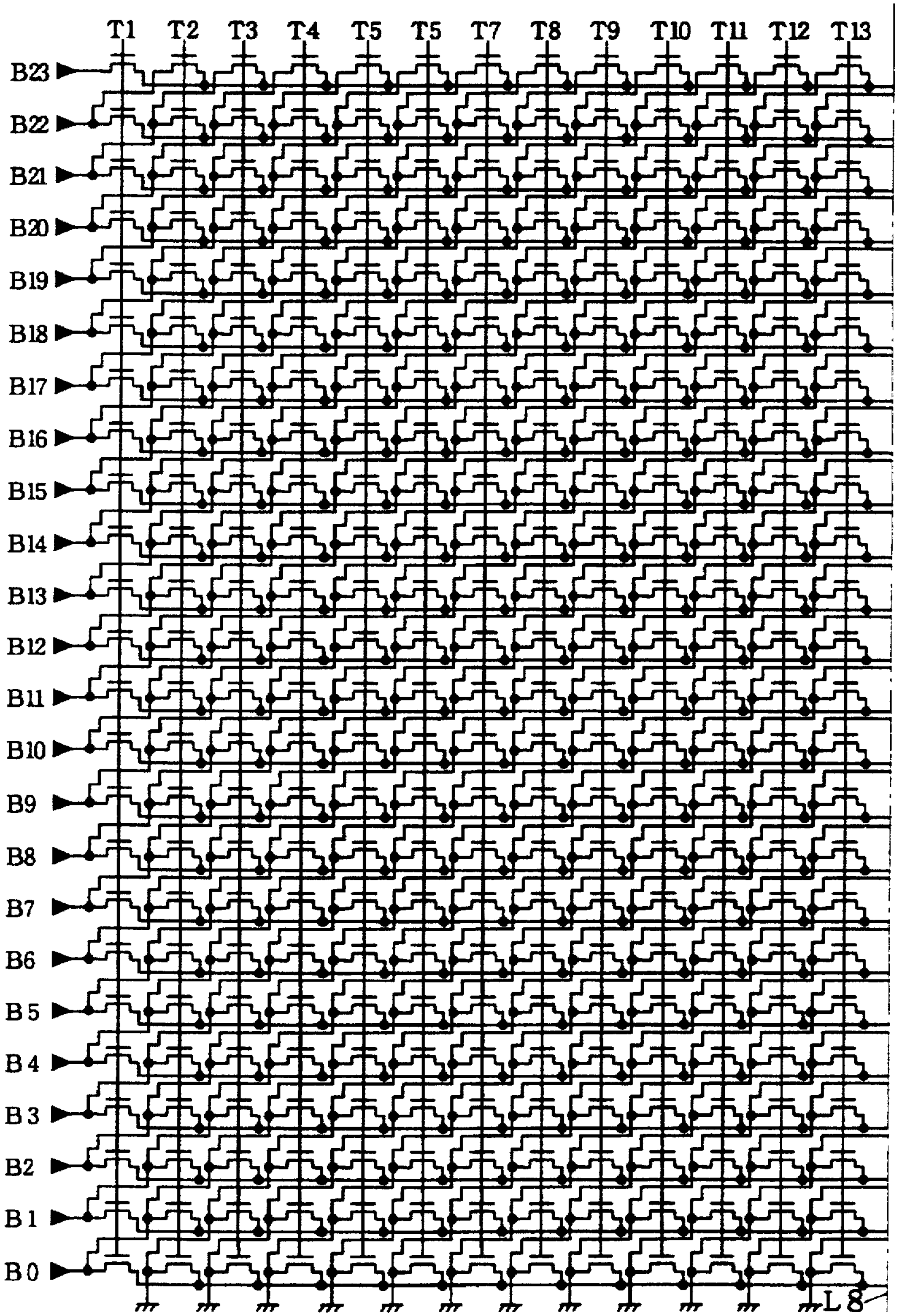
FIG. 18 is a circuit diagram of an example of the shifter circuit.
Figure 19:
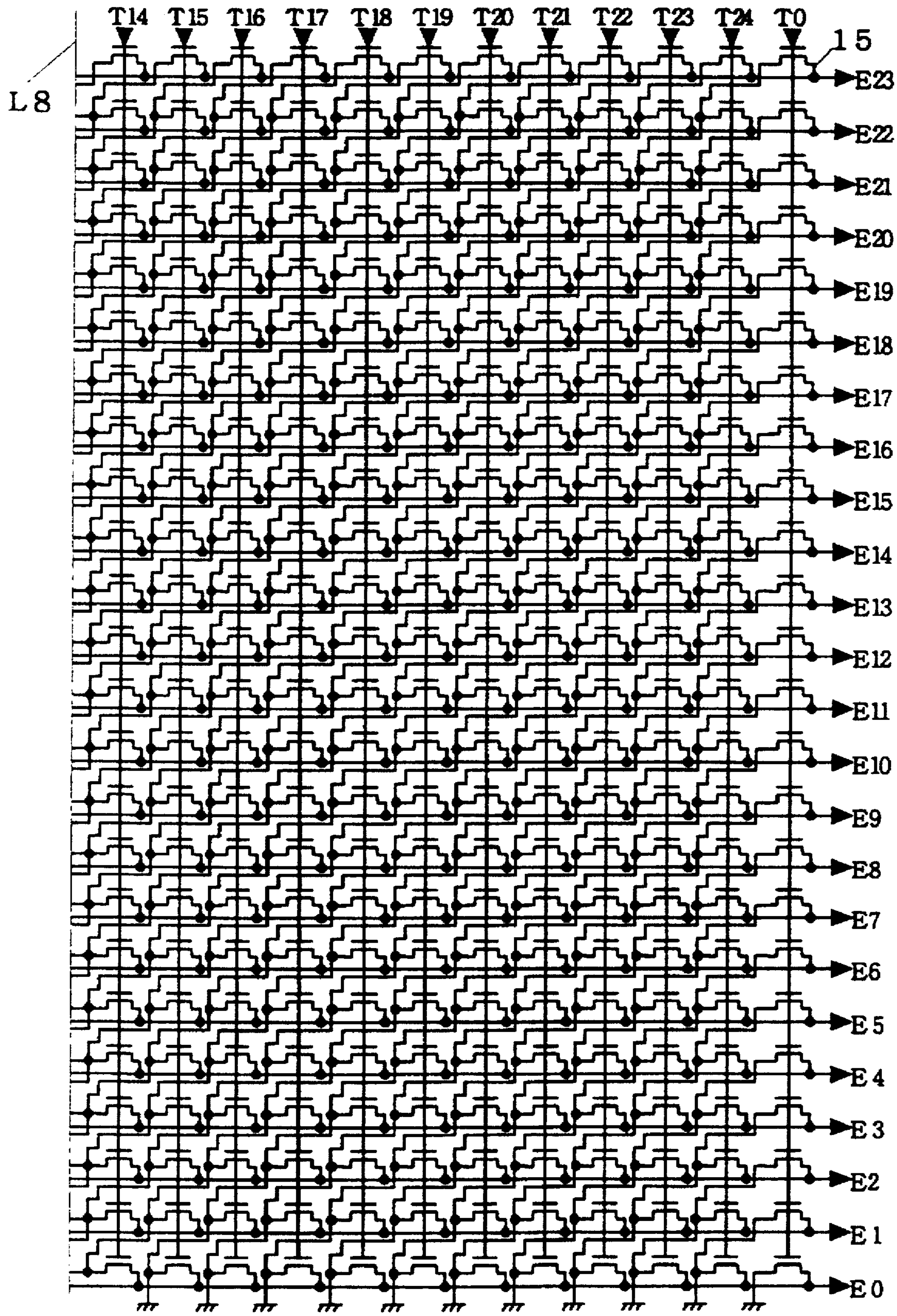
FIG. 19 is a circuit diagram of the example of the shifter circuit.

The shifter circuit 10 is a circuit which shifts the input signal B according to the value of the control signal D (T). FIG. 15 to FIG. 17 show its truth table in the case where the control signal D is of 25 bits. An example of the specific structure of the shifter circuit 10 is shown in FIG. 18 and FIG. 19. In FIG. 18 and FIG. 19, the reference character 15 denotes an N channel MOS type FET.

The circuit operation will be described next.

First, the circuit operation is considered in the case where the input signal A of the exponent part and the input signal B of the mantissa part are given as A=127, B=0000 0001 0001 0001 0001 0001, respectively.

(1) The value of the output signal A" of the reference signal generating circuit 3 is given as follows.

A"=1111 1111 1111 1111 1111 1111.

(2) The value of the output signal G of the AND gate circuit 8 is given as follows.

G=0000 0001 0001 0001 0001 0001.

(3) The value of the output signal of the OR gate circuit 9, or the control signal G' is found as follows.

G'=|G→1.

(4) The value of the output signal B' of the priority encoder circuit 2 is B'=7.

(5) The value of the output signal H of the subtracter circuit 6 is given as follows.

H=A–B'→127–7→120.

(6) The value of the output signal C of the MUX circuit 7b is given as follows.

C=G'?H:0→1?120:0→120.

(7) The value of the output signal A' of the decoder circuit 4 is given as follows.

A'=0000 0000 0000 0000 0000 0000.

(8) The value of the output signal B" of the leading 1 detector circuit 5 is expressed as follows.

B"=0 0000 0001 0000 0000 0000 0000.

(9) The value of the output signal D of the MUX circuit 7a is given as follows.

D=0 0000 0001 0000 0000 0000 0000.

(10) The value of the output signal E of the shifter circuit 10 is given as follows.

E=1000 1000 1000 1000 1000 0000.

As stated above, this normalization circuit 1 correctly carries out the normalization operation.

Next, the case where A=5, B=0000 0001 0001 0001 0001 0001 is considered.

(1) The value of the output signal A" of the reference signal generating circuit 3 is given as follows.

A"=1111 1100 0000 0000 0000 0000.

(2) The value of the output signal G of the AND gate circuit 8 is given as follows.

G=0000 0000 0000 0000 0000 0000.

(3) The value of the output signal G' of the OR gate circuit 9 is G'=|G→0.

(4) The value of the output signal B' of the priority encoder circuit 2 is found as B'=7.

(5) The value of the output signal H of the subtracter circuit 6 is given as follows.

H=A–B'→5–7→–2.

(6) The value of the output signal C of the MUX circuit 7b is expressed as follows.

C=G'?H:0→0?–2:0→0.

(7) The value of the output signal A' of the decoder circuit 4 is given as follows.

A'=0000 0100 0000 0000 0000 0000.

(8) The value of the output signal B" of the leading 1 detector circuit 5 is given as follows.

B"=0 0000 0001 0000 0000 0000 0000.

(9) The value of the output signal D of the MUX circuit 7a is given as follows.

D=0 0000 0100 0000 0000 0000 0000.

(10) The value of the output signal E of the shifter circuit 10 is given as follows.

E=0010 0010 0010 0010 0010 0000.

As stated above, this circuit 1 correctly executes the unnormalization operation.

Furthermore, it is considered in the case where A=7 and B=0000 0001 0001 0001 0001 0001.

(1) The value of the output signal A" of the reference signal generating circuit 3 is given as follows.

A"=1111 1111 0000 0000 0000 0000.

(2) The value of the output signal G of the AND gate circuit 8 is given as follows.

G=0000 0001 0000 0000 0000 0000.

(3) The value of the output signal G' of the OR gate circuit 9 is expressed as G'=|G→1.

(4) The value of the output signal B' of the priority encoder circuit 2 is given as B'=7.

(5) The value of the output signal H of the subtracter circuit 6 is expressed as follows.

H=A–B'→7–7→0.

(6) The value of the output signal C of the MUX circuit 7b is found as follows.

C=G'?H:0→1?0:0→0.

(7) The value of the output signal A' of the decoder circuit 4 is given as follows.

A'=0000 0001 0000 0000 0000 0000.

(8) The value of the output signal B" of the leading 1 detector circuit 5 is given as follows.

B"=0 0000 0001 0000 0000 0000 0000.

(9) The value of the output signal D of the MUX circuit 7a is given as follows.

D=0 0000 0001 0000 0000 0000 0000.

(10) The value of the output signal E of the shifter circuit 10 is given as follows.

E=1000 1000 1000 1000 1000 0000.

Furthermore, the case where A=127 and B=0000 0000 0000 0000 0000 0000 is considered.

(1) The value of the output signal A" of the reference signal generating circuit 3 is given as follows.

A"=1111 1111 1111 1111 1111 1111.

(2) The value of the output signal G of the AND gate circuit 8 is given as follows.

G=0000 0000 0000 0000 0000 0000.

(3) The value of the output signal G' of the OR gate circuit 9 is given as G'=|G→0.

(4) The value of the output signal B' of the priority encoder circuit 2 is B'=0.

(5) The value of the output signal H of the subtracter circuit 6 is found as follows.

H=A−B'→127−0→127.

(6) The value of the output signal C of the MUX circuit 7b is givne pressed as follows.

C=G'?H:0→0?127:0→0.

(7) The value of the output signal A' of the decoder circuit 4 is given as follows.

A'=0000 0000 0000 0000 0000 0000.

(8) The value of the output signal B" of the leading 1 detector circuit 5 is given as follows.

B"=1 0000 0000 0000 0000 0000 0000.

(9) The value of the output signal D of the MUX circuit 7a is given as follows.

D=1 0000 0000 0000 0000 0000 0000.

(10) The value of the output signal E of the shifter circuit 10 is given as follows.

E=0000 0000 0000 0000 0000 0000.

As described above, in this normalization circuit 1, providing in the processing path on the exponent part side the control signal generating portion 20 receiving the mantissa part and the exponent part as direct inputs for generating the control signal G' controlling the MUX circuits 7a and 7b respectively on the mantissa part side and the exponent part side enables high speed processing of (1) normalization operation processing, (2) unnormalization operation processing, (3) the "0 function" operation processing. Furthermore, it does not need such a special circuit 106 as shown in FIG. 43 to realize (3). This structure is based on the following point.

That is to say, usually, in the floating point computation device such as a floating point adder and a floating point multiplier, the time required for signal transmission to the normalization circuit is longer with the mantissa part input signal B than with the exponent part input signal A. This is due to the fact that the computation is more complex with the mantissa part generally having a larger bit width than the exponent part. Accordingly, when a normalization circuit is included, the most delayed path in the entire floating point computation device depends on the path from the input port of the mantissa part input signal B to the output port of the mantissa part output signal E in the normalization circuit. Thus, it is desired that less load is provided in the path on the mantissa part side in the normalization circuit.

Hence, this invention adopts such a structure as shown in FIG. 2. Thus, the most delayed path (critical path) is the path passing the input port of the mantissa part input signal B→the leading 1 detector circuit 5→the MUX circuit 7a→the shifter circuit 10→the output port of the mantissa part output signal E, which enables a high speed normalization circuit device. In this case, the operations by the reference signal generating circuit 3 and the decoder 4 will have finished before the mantissa part input signal B is inputted, and the output signals A" and A' will have already been generated. Accordingly, the AND, OR gate circuits 8 and 9 immediately generate the control signal G' in response to input of the input signal B.

(First Modified Example of the First Preferred Embodiment)

Figure 22:
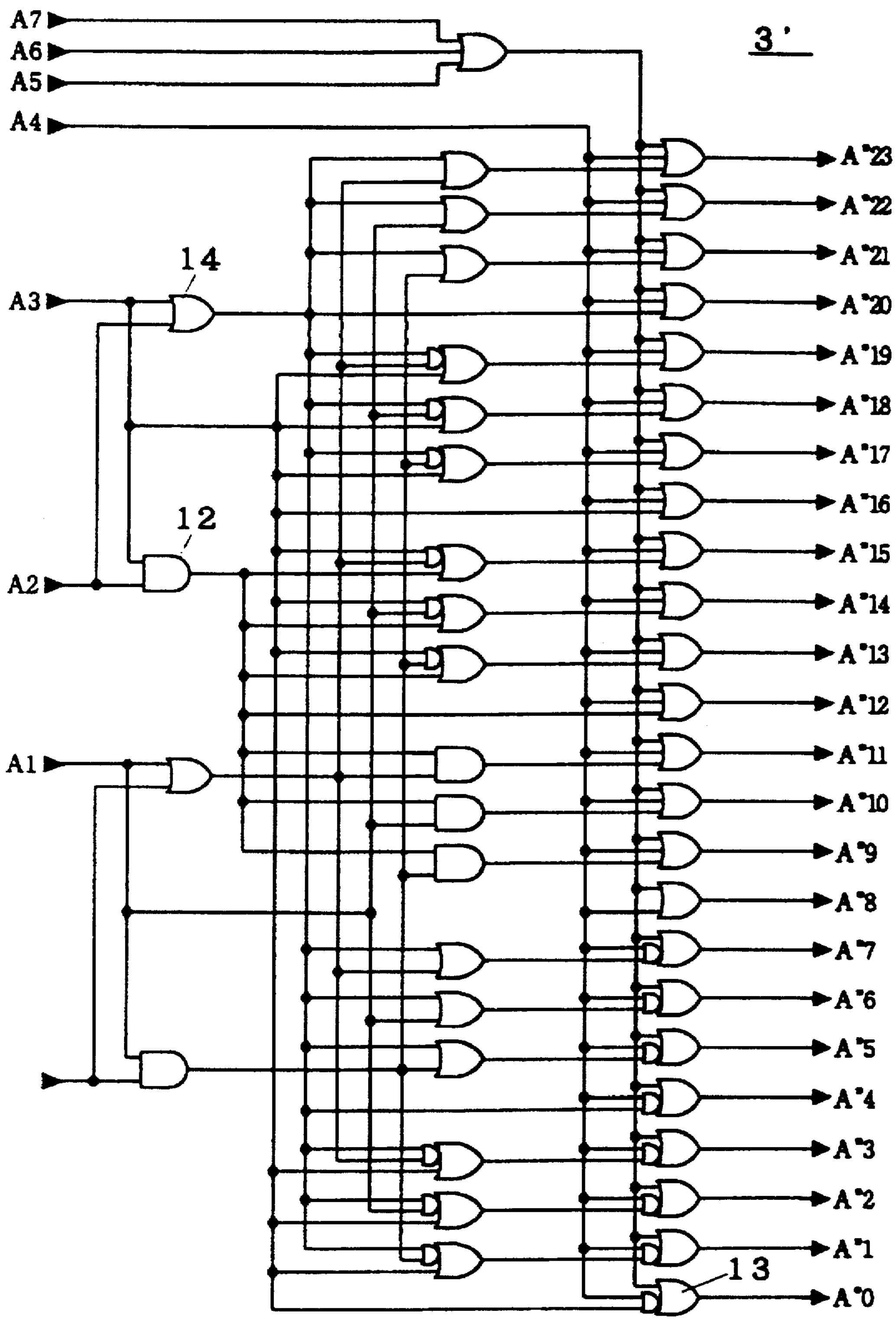
FIG. 22 is a circuit diagram of another example of the reference signal generating circuit.

In the circuit of FIG. 2, the reference signal generating circuit 3 may be replaced by a circuit which renders "1" all bit states of respective bit positions from the most significant bit of the output signal A" for a value of the decimal number of the input signal A represented in a binary value. This is due to the following fact. When A=B' in FIG. 2, i.e., when A'=B" $(_{23}-_{0})$, either of the input signals P and Q can be selected in the MUX circuit 7a. Furthermore, from A=B', the output signal H of the subtraction circuit 6 is H=A−B'=0, and the MUX circuit 7b can also select either of the input signals P and Q, so that the both MUX circuits select P in this modified example 1. FIG. 20 and FIG. 21 show a truth table of the reference signal generating circuit 3', replaced by such a function. FIG. 22 shows an example of the specific structure of the reference signal generating circuit 3'. In FIG. 22, the reference character 12 denotes an AND gate circuit, the reference character 13 denotes an AND-OR gate circuit and the reference character 14 denotes an OR circuit. In the reference signal generating circuit 3', when the value of the input signal A is 24 or larger, the value of the output signal A" is all 1.

The operation of the normalization circuit 1 will be described in the case where such a reference signal generating circuit 3' is used.

First, it is considered in the case where the input signal A of the exponent part=127 and the input signal B of the mantissa part=0000 0001 0001 0001 0001 0001.

(1) The value of the output signal A" of the reference signal generating circuit 3' is given as follows.

A"=1111 1111 1111 1111 1111 1111.

(2) The value of the output signal G of the AND gate circuit 8 is given as follows.

G=0000 0001 0001 0001 0001 0001.

(3) The value of the output signal G' of the OR gate circuit 9 is expressed as G'=|G→1.

(4) The value of the output signal B' of the priority encoder circuit 2 is given as B'=7.

(5) The value of the output signal H of the subtracter circuit 6 is given as follows.

H=A−B'→127−7→120.

(6) The value of the output signal C of the MUX circuit 7b is found as follows.

C=G'?H:0→1?120:0→120.

(7) The value of the output signal A' of the decoder circuit 4 is given as follows.

A'=0000 0000 0000 0000 0000 0000.

(8) The value of the output signal B" of the leading 1 detector circuit 5 is given as follows.

B"=0 0000 0001 0000 0000 0000 0000.

(9) The value of the output signal D of the MUX circuit 7a is given as follows.

D=0 0000 0001 0000 0000 0000 0000.

(10) The value of the output signal E of the shifter circuit 10 is given as follows.

E=1000 1000 1000 1000 1000 0000.

This way, the modified example 1 also correctly executes the normalization operation.

Next, the case where A=5, B=0000 0001 0001 0001 0001 0001 is considered.

(1) The value of the output signal A" of the reference signal generating circuit 3' is given as follows.

A"=1111 1000 0000 0000 0000 0000.

(2) The value of the output signal G of the AND gate circuit 8 is given as follows.

G=0000 0000 0000 0000 0000 0000.

(3) The value of the output signal G' of the OR gate circuit 9 is G'=|G→0.

(4) The value of the output signal B' of the priority encoder circuit 2 is given as B'=7.

(5) The value of the output signal H of the subtracter circuit 6 is found as follows.

H=A–B'→5–7→–2.

(6) The value of the output signal C of the MUX circuit *7b* is found as follows.

C=G'?H:0→0?–2:0→0.

(7) The value of the output signal A' of the decoder circuit 4 is given as follows.

A'=0000 0100 0000 0000 0000 0000.

(8) The value of the output signal B" of the leading 1 detector circuit 5 is given as follows.

B"=0 0000 0001 0000 0000 0000 0000.

(9) The value of the output signal D of the MUX circuit *7a* is given as follows.

D=0 0000 0100 0000 0000 0000 0000.

(10) The value of the output signal E of the shifter circuit 10 is given as follows.

E=0010 0010 0010 0010 0010 0000.

This way, the modified example 1 surely executes the unnormalization operation.

Next, the case where A=7, B=0000 0001 0001 0001 0001 0001 goes as follows.

(1) The value of the output signal A" of the reference signal generating circuit 3' is given as follows.

A"=1111 1110 0000 0000 0000 0000.

(2) The value of the output signal G of the AND gate circuit 8 is given as follows.

G=0000 0000 0000 0000 0000 0000.

(3) The value of the output signal G' of the OR gate circuit 9 is found as G'=|G→0.

(4) The value of the output signal B' of the priority encoder circuit 2 is B'=7.

(5) The value of the output signal H of the subtracter circuit 6 is found as follows.

H=A–B'→7–7→0.

(6) The value of the output signal C of the MUX circuit *7b* is found as follows.

C=G'?H:0→0?0:0→0.

(7) The value of the output signal A' of the decoder circuit 4 is given as follows.

A'=0000 0001 0000 0000 0000 0000.

(8) The value of the output signal B" of the leading 1 detector circuit 5 is given as follows.

B"=0 0000 0001 0000 0000 0000 0000.

(9) The value of the output signal D of the MUX circuit *7a* is given as follows.

D=0 0000 0001 0000 0000 0000 0000.

(10) The value of the output signal E of the shifter circuit 10 is given as follows.

E=1000 1000 1000 1000 1000 0000.

This way, the modified example 1 also correctly carries out the normalization operation.

Also, the case where A=127, B=0000 0000 0000 0000 0000 0000 will be considered.

(1) The value of the output signal A" of the reference signal generating circuit 3' is given as follows.

A"=1111 1111 1111 1111 1111 1111.

(2) The value of the output signal G of the AND gate circuit 8 is given as follows.

G=0000 0000 0000 0000 0000 0000.

(3) The value of the output signal G' of the OR gate circuit 9 is given as G'=|G→0.

(4) The value of the output signal B' of the priority encoder circuit 2 is given as B'=0.

(5) The value of the output signal H of the subtracter circuit 6 is expressed as follows.

H=A–B'→127–0→127.

(6) The value of the output signal C of the MUX circuit *7b* is expressed as follows.

C=G'?H:0→0?127:0→0.

(7) The value of the output signal A' of the decoder circuit 4 is given as follows.

A'=0000 0000 0000 0000 0000 0000.

(8) The value of the output signal B" of the leading 1 detector circuit 5 is given as follows.

B"=1 0000 0000 0000 0000 0000 0000.

(9) The value of the output signal D of the MUX circuit *7a* is given as follows.

D=1 0000 0000 0000 0000 0000 0000.

(10) The value of the output signal E of the shifter circuit 10 is given as follows.

E=0000 0000 0000 0000 0000 0000.

This way, the first modified example also realizes the "0 function".

The first modified example, which is substantially the same as the case of FIG. 2, has the same functions and effects as those of the normalization circuit of FIG. 2.

(Second Modified Example of the First Preferred Embodiment)

As shown in FIG. 23, the MUX circuit *7b* in the circuit of FIG. 2 may be replaced by an AND gate circuit 16. In this case, the output signal C of the exponent part becomes 0 when the control signal G' is 0. When the control signal G' is 1, the output signal C of the exponent part becomes equal to the output signal H of the subtracter circuit 6.

(Third Modified Example of the First Preferred Embodiment)

Furthermore, in the normalization circuit of FIG. 2, in addition to replacing the MUX circuit *7b* with the AND gate circuit 16 as shown in FIG. 23, the reference signal generating circuit 3 may be replaced by the reference signal generating circuit 3' shown in FIG. 22.

(Second Preferred Embodiment)

Another preferred embodiment of the normalization circuit device in the floating point computation device is shown in FIG. 24. The normalization circuit 1A is characterized in that the structure of the "exponent part output signal determining portion" including the subtracter circuit 6 and the MUX circuit *7b* in the normalization circuit 1 of FIG. 2 is modified.

In FIG. 24, the reference character 2 denotes a priority encoder circuit, 3 denotes a reference signal generating circuit, 4 denotes a decoder circuit, 5 denotes a leading 1 detector circuit, 6A denotes a subtracter circuit, *7a* and *7c* denote MUX circuits (selection portions), 8 denotes an AND gate circuit, 9 denotes an OR gate circuit and 10 denotes a shifter circuit. These parts except the MUX circuit *7c* and the subtracter circuit 6A are the same as the corresponding parts in FIG. 2.

In FIG. 24, the characters A–E show the same parts as those shown by the corresponding characters in FIG. 2.

The MUX circuit *7c* outputs the input signal Q (=B') when the control signal G' is 1 and outputs the input signal P (=A) when the control signal G' is 0.

Next, the circuit operation will be described with the exponent part (A, C) of 8 bits, the mantissa part (B, E) of 24 bits and the moved amount (D) of 25 bits.

First, it is assumed that the input signal A of the exponent part and the input signal B of the mantissa part are respectively A=127, B=0000 0001 0001 0001 0001 0001.

(1) The value of the output signal A" of the reference signal generating circuit 3 is given as follows.

A"=1111 1111 1111 1111 1111 1111.

(2) The value of the output signal G of the AND gate circuit 8 is given as follows.

G=0000 0001 0001 0001 0001 0001.

(3) The value of the output signal G' of the OR gate circuit 9 is given as G'=|G→1.

(4) The value of the output signal B' of the priority encoder circuit 2 is given as B'=7.

(5) The value of the output signal H of the MUX circuit 7*c* is found as follows.

H=G'?B':A→1 ?7:127→7.

(6) The value of the output signal C of the subtracter circuit 6A is given as follows.

C=A–H→127–7→120.

(7) The value of the output signal A' of the decoder circuit 4 is given as follows.

A'=0000 0000 0000 0000 0000 0000.

(8) The value of the output signal B" of the leading 1 detector circuit 5 is given as follows.

B"=0 0000 0001 0000 0000 0000 0000.

(9) The value of the output signal D of the MUX circuit 7*a* is given as follows.

D =0 0000 0001 0000 0000 0000 0000.

(10) The value of the output signal E of the shifter circuit 10 is given as follows.

E =1000 1000 1000 1000 1000 0000.

Next, it is assumed that A=5, B=0000 0001 0001 0001 0001 0001.

(1) The value of the output signal A" of the reference signal generating circuit 3 is given as follows.

A"=1111 1100 0000 0000 0000 0000.

(2) The value of the output signal G of the AND gate circuit 8 is given as follows.

G=0000 0000 0000 0000 0000 0000.

(3) The value of the output signal G' of the OR gate circuit 9 is given as G'=|G→0.

(4) The value of the output signal B' of the priority encoder circuit 2 is found as B'=7.

(5) The value of the output signal H of the MUX circuit 7*c* is given as follows.

H=G'?B':A→0?7:5→5.

(6) The value of the output signal C of the subtracter circuit 6A is expressed as follows.

C=A–H→5–5→0.

(7) The value of the output signal A' of the decoder circuit 4 is given as follows.

A'=0000 0100 0000 0000 0000 0000.

(8) The value of the output signal B" of the leading 1 detector circuit 5 is given as follows.

B"=0 0000 0001 0000 0000 0000 0000.

(9) The value of the output signal D of the MUX circuit 7*a* is given as follows.

D=0 0000 0100 0000 0000 0000 0000.

(10) The value of the output signal E of the shifter circuit 10 is given as follows.

E=0010 0010 0010 0010 0010 0000.

Furthermore, it is assumed that A=7 and B=0000 0001 0001 0001 0001 0001.

(1) The value of the output signal A" of the reference signal generating circuit 3 is given as follows.

A"=1111 1111 0000 0000 0000 0000.

(2) The value of the output signal G of the AND gate circuit 8 is given as follows.

G=0000 0001 0000 0000 0000 0000.

(3) The value of the output signal G' of the OR gate circuit 9 is expressed as G'=|G→1.

(4) The value of the output signal B' of the priority encoder circuit 2 is given as B'=7.

(5) The value of the output signal H of the MUX circuit 7*c* is found as follows.

H=G'?B':A→1?7:7→7.

(6) The value of the output signal C of the subtracter circuit 6A is found as follows.

C=A–H→7–7→0.

(7) The value of the output signal A' of the decoder circuit 4 is given as follows.

A'=0000 0001 0000 0000 0000 0000.

(8) The value of the output signal B" of the leading 1 detector circuit 5 is given as follows.

B"=0 0000 0001 0000 0000 0000 0000.

(9) The value of the output signal D of the MUX circuit 7*a* is given as follows.

D=0 0000 0001 0000 0000 0000 0000.

(10) The value of the output signal E of the shifter circuit 10 is given as follows.

E=1000 1000 1000 1000 1000 0000.

Furthermore, it is assumed that A=127 and B=0000 0000 0000 0000 0000 0000.

(1) The value of the output signal A" of the reference signal generating circuit 3 is given as follows.

A"=1111 1111 1111 1111 1111 1111.

(2) The value of the output signal G of the AND gate circuit 8 is given as follows.

G=0000 0000 0000 0000 0000 0000.

(3) The value of the output signal G' of the OR gate circuit 9 is expressed as G'=|G→0.

(4) The value of the output signal B' of the priority encoder circuit 2 is B'=0.

(5) The value of the output signal H of the MUX circuit 7*c* is found as follows.

H=G'?B':A→1 ?0:127→127.

(6) The value of the output signal C of the subtracter circuit 6A is given as follows.

C=A–H→127–127→0.

(7) The value of the output signal A' of the decoder circuit 4 is given as follows.

A'=0000 0000 0000 0000 0000 0000.

(8) The value of the output signal B" of the leading 1 detector circuit 5 is given as follows.

B"=1 0000 0000 0000 0000 0000 0000.

(9) The value of the output signal D of the MUX circuit 7*a* is given as follows.

D=1 0000 0000 0000 0000 0000 0000.

(10) The value of the output signal E of the shifter circuit 10 is given as follows.

E=0000 0000 0000 0000 0000 0000.

This way, the same effects as those of the first preferred embodiment are also produced in the second preferred embodiment.

In the circuit of FIG. 24, the reference signal generating circuit 3 may be replaced by the reference signal generating circuit 3' shown in FIG. 22.

(Third Preferred Embodiment)

Another preferred embodiment of a normalization circuit device in the floating point computation device is shown in FIG. 25. The normalization circuit 1B of FIG. 25 relates to an improvement of the encode portion of the normalization circuit 1 of FIG. 2, which is characterized in that it has an encoder 17 for encoding the output of the leading 1 detector circuit 5 in place of the priority encoder 2. Accordingly, here, the two circuits 5 and 17 form the encode portion. This is for the purpose of solving the problem that directly encoding the input signal B as shown in FIG. 2 complicates the logic circuit structure of the priority encoder circuit 2 to increase its area in the normalization circuit 1 thus to increase the circuit scale.

Hence, in FIG. 25, other components except the encoder circuit 17 are the same as the corresponding parts in FIG. 2. In FIG. 25, the characters A–E are also the same as those in FIG. 2.

Next, a description will be made on the case wherein the exponent part (A, C) is 8 bits long, the mantissa part (B, E) is 24 bits long, and the moved amount (D) is 25 bits.

Figure 28:
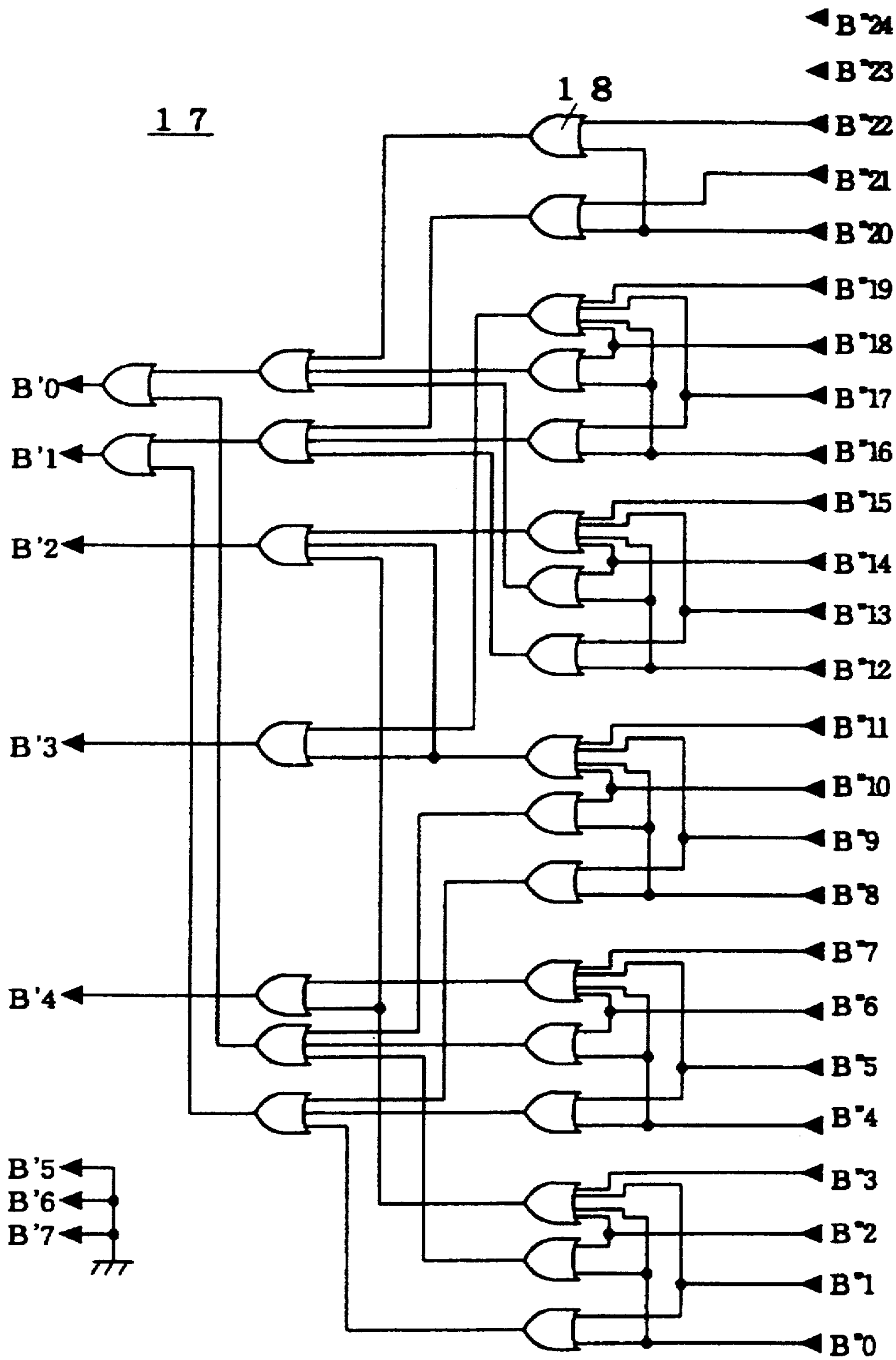
FIG. 28 is a circuit diagram of an example of the encoder circuit.

The encoder circuit 17 is a circuit which receives the output signal B" of the leading 1 detector 5 as its input and retrieves the respective bit states of the input signal B" from the most significant bit to represent in a binary value a number obtained by subtracting 1 from the address number value of the bit position of "1". That is to say, if the input signal B" is n bits long, the bit width of the output signal B' is $\{\mathrm{int}(\log_2(n-1))+1\}$ bits long. Accordingly, when the input signal B" to the encoder circuit 17 is 25 bits long, the bit width of the output signal B' is 5 bits. FIG. 26 and FIG. 27 show a truth table of the encoder circuit 17 when the input is 25 bits in length. FIG. 28 shows an example of the specific structure of the encoder circuit 17. As is clear from the circuit structure of FIG. 28, the structure of the logic circuit is made easier and the occupied area of the encoder circuit 17 in the normalization circuit can be small-scaled.

(First Modified Example of the Third Preferred Embodiment)

In the normalization circuit 1B of FIG. 25, the reference signal generating circuit 3 may be replaced by the reference signal generating circuit 3' shown in FIG. 22. Note, however, that in the reference signal generating circuit 3' when the value of the input signal A is 24 or larger, the value of the output signal A" is all 1.

(Second Modified Example of the Third Preferred Embodiment)

In the normalization circuit 1B of FIG. 25, the MUX circuit **7*b* can be replaced by the AND gate circuit 16. FIG. 29** shows the structure of the normalization circuit in this case.

(Third Modified Example of the Third Preferred Embodiment)

Furthermore, with the MUX circuit **7*b* replaced by the AND gate circuit 16 as shown in FIG. 29, the reference signal generating circuit 3 may be replaced by the reference signal generating circuit 3' shown in FIG. 22**.

(Fourth Preferred Embodiment)

Another preferred embodiment of the normalization circuit device in the floating point computation device is shown in FIG. 30. This normalization circuit 1C shows an application of the characteristic point of the normalization circuit 1A of FIG. 24 to the normalization circuit 1B of FIG. 25. That is to say, the "exponent part output signal determining portion" formed of the combination of the circuits 6 and **7*b* of FIG. 25 is replaced by the combination of the circuits 7*c* and 6A of FIG. 30**.

In the circuit of FIG. 30, the reference signal generating circuit 3 may be replaced by the reference signal generating circuit 3' shown in FIG. 22.

(Fifth Preferred Embodiment)

Figure 31:
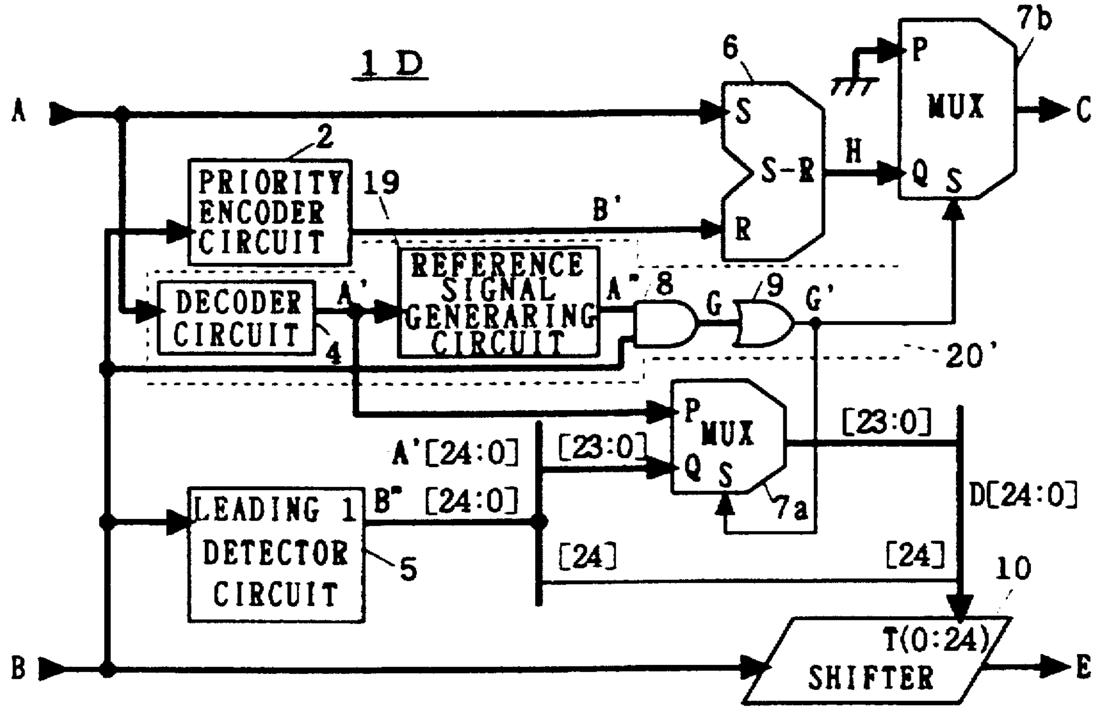
FIG. 31 is a circuit diagram of another preferred embodiment of the present invention.

Another preferred embodiment of a normalization circuit device in the floating point computation device is shown in FIG. 31. This normalization circuit 1D is characterized in that it includes a reference signal generating circuit 19 (also referred to as a main reference signal generating circuit) receiving as input the output signal A' of the decoder circuit 4, instead of directly receiving the input signal A like the reference signal generating circuit 3 of FIG. 2, and it has the same structure as that of the normalization circuit 1 of FIG. 2 in other respects. This is due to the fact that it is more advantageous in the respect of circuit structure to generate the reference signal A" from the output of the decoder circuit 4, as will be shown later.

As stated above, the two circuits 4 and 19 form the "reference signal generating portion", which forms the "control signal generating portion 20'" corresponding to the control signal generating portion 20 described above together with the "logic operation portion" including the gate circuits 8 and 9.

Next, the circuit parts will be described with the exponent part (A, C) of 8 bits, the mantissa part (B, E) of 24 bits, and the moved amount (D) of 25 bits.

The decoder circuit 4, the leading 1 detector circuit 5, the priority encoder circuit 2, the subtracter circuit 6, the MUX circuits **7*a* and 7*b* and the shifter circuit 10** function in the same way as those shown in the first preferred embodiment, respectively.

Figure 34:
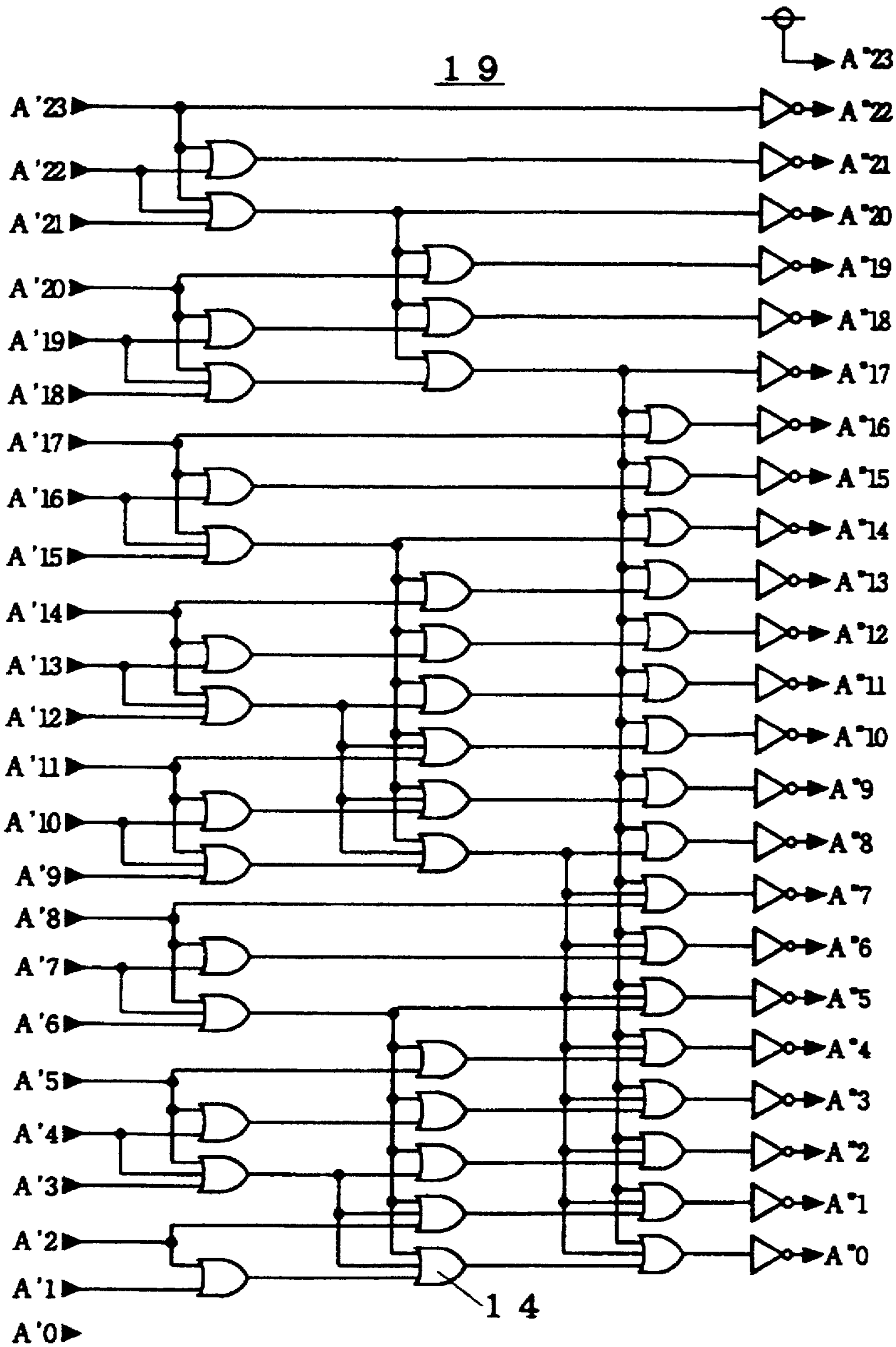
FIG. 34 is a circuit diagram of an example of the reference signal generating circuit.

The reference signal generating circuit 19 for generating the reference signal A" from the decoder output is a circuit which generates the reference signal A" on the basis of the signal A' which is obtained by decoding the input signal A represented in a binary value in the decoder circuit 4. The reference signal A" is a signal in which all bits from its most significant bit to the bit where the signal A' attains "1" are set to 1 and other bits are all set to 0. FIG. 32 and FIG. 33 show a truth table of the reference signal generating circuit 19. This truth table substantially corresponds to the truth table shown in FIG. 12 and FIG. 13. FIG. 34 shows an example of the specific structure of the reference signal generating circuit 19. In FIG. 34, the reference character 14 denotes an OR gate circuit. In the reference signal generating circuit 19, when the input A' is all 0, the value of its output signal A" is set to all 1.

As is clear from comparison of the circuit structure of FIG. 34 with that of FIG. 14, it is possible to design the reference signal generating circuit 19 of FIG. 34 mainly using the OR gate circuits 14, thus providing reduction in scale of this circuit 19.

(First Modified Example of the Fifth Preferred Embodiment)

Figure 37:
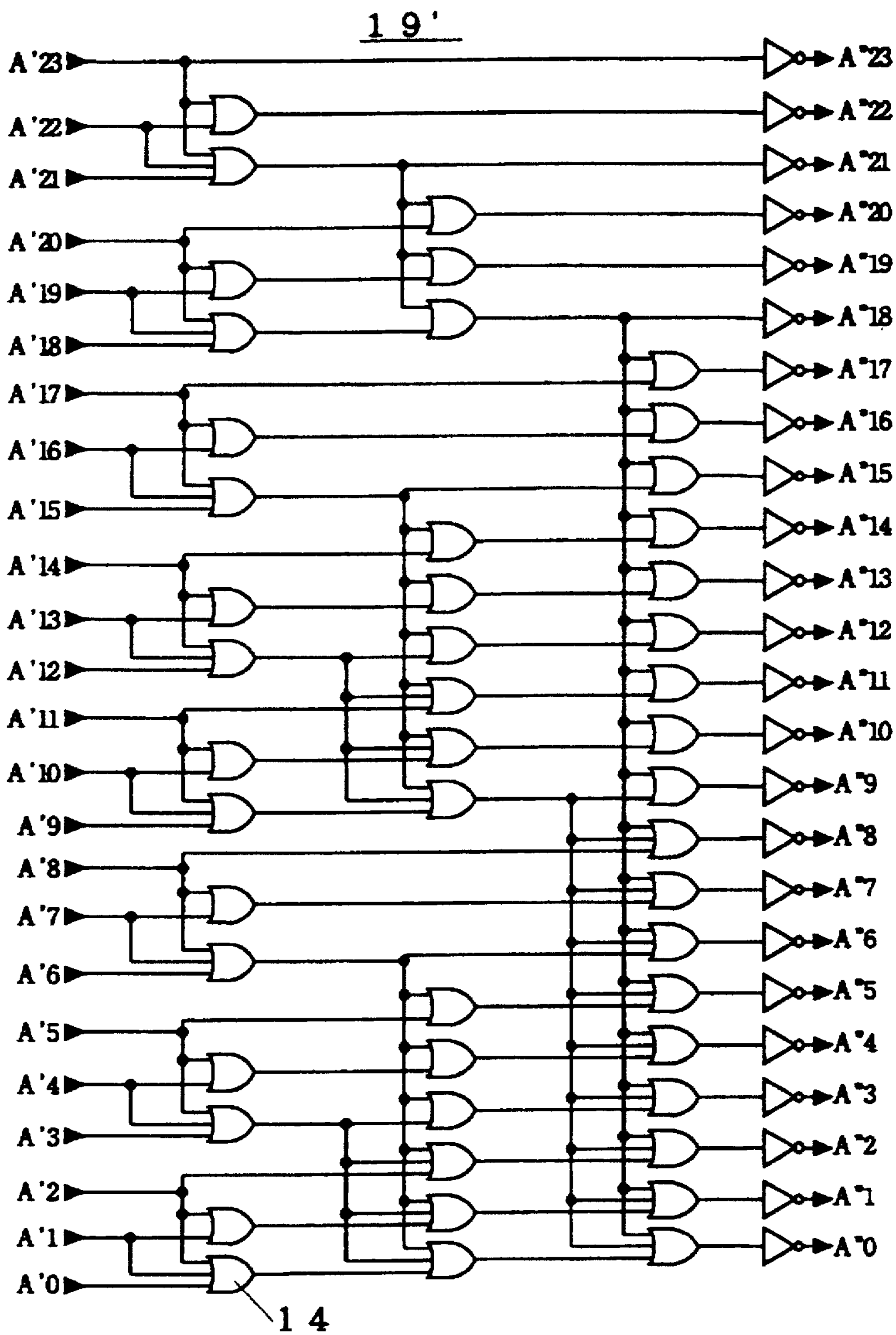
FIG. 37 is a circuit diagram of another example of the reference signal generating circuit.

In the circuit of FIG. 31, the reference signal generating circuit 19 can be replaced by a reference signal generating circuit 19' which outputs the reference signal A" in which bits of the signal A' decoded by the decoder circuit 2 from the most significant bit to the bit a bit higher than the bit of the first "1" are all set to 1. FIG. 35, FIG. 36 and FIG. 37 respectively show a truth table of such a reference signal generating circuit 19' and an example of its specific structure. The truth table substantially corresponds to the truth table shown in FIG. 20 and FIG. 21. However, in the reference signal generating circuit 19', the value of the output A" is all 1 when the value of the input signal A is 24 or above.

(Second Modified Example of the Fifth Preferred Embodiment)

Furthermore, in the circuit of FIG. 31, as shown in FIG. 38, the MUX circuit **7*b* may be replaced by the AND gate circuit 16**. In this case, when the control signal G' is 0, the output signal C of the exponent part becomes 0 and when the control signal G' is 1, the output signal C of the exponent part becomes equal to the output signal H.

(Third Modified Example of the Fifth Preferred Embodiment)

Furthermore, with the MUX circuit 7b replaced by the AND gate circuit 16 as shown in FIG. 38, the reference signal generating circuit 19 of FIG. 31 may be replaced by the reference signal generating circuit 19' shown in FIG. 37.

(Sixth Preferred Embodiment)

Another preferred embodiment of the normalization circuit device in the floating point computation device is shown in FIG. 39. This normalization circuit 1E implements the combination of the circuit components 6 and 7b in the normalization circuit 1D of FIG. 31 with the combination of the MUX circuit 7c and the subtraction circuit 6A, which is the same as the normalization circuit 1D in other respects.

In the circuit of FIG. 39, the reference signal generating circuit 19 can be replaced by the reference signal generating circuit 19' shown in FIG. 37.

(Seventh Preferred Embodiment)

Figure 40:
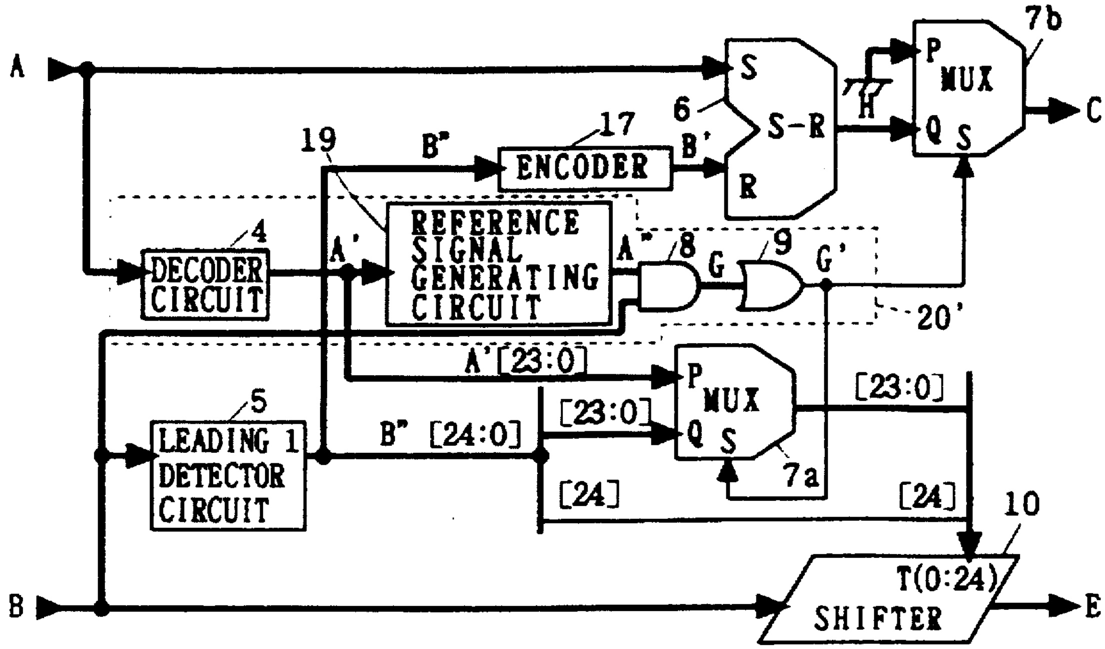
FIG. 40 is a circuit diagram of another preferred embodiment of the present invention.

Another preferred embodiment of the normalization circuit devcie in the floating point computation device is shown in FIG. 40. This normalization circuit 1F has the characteristics both of the third and fifth preferred embodiments, which has the encoder 17 and the reference signal generating circuit 19 described above. The circuit 1F is the same as that described in the first preferred embodiment in other respects.

Thus, in addition to the effects of the first preferred embodiment, it also produces the effect of the third and fifth preferred embodiments of simplifying the circuit structure, resulting in further reduction of the circuit scale.

(First Modified Example of the Seventh Preferred Embodiment)

In the circuit of FIG. 40, the reference signal generating circuit 19 may be replaced by the reference signal generating circuit 19' shown in FIG. 37.

(Second Modified Example of the Seventh Preferred Embodiment)

Figure 41:
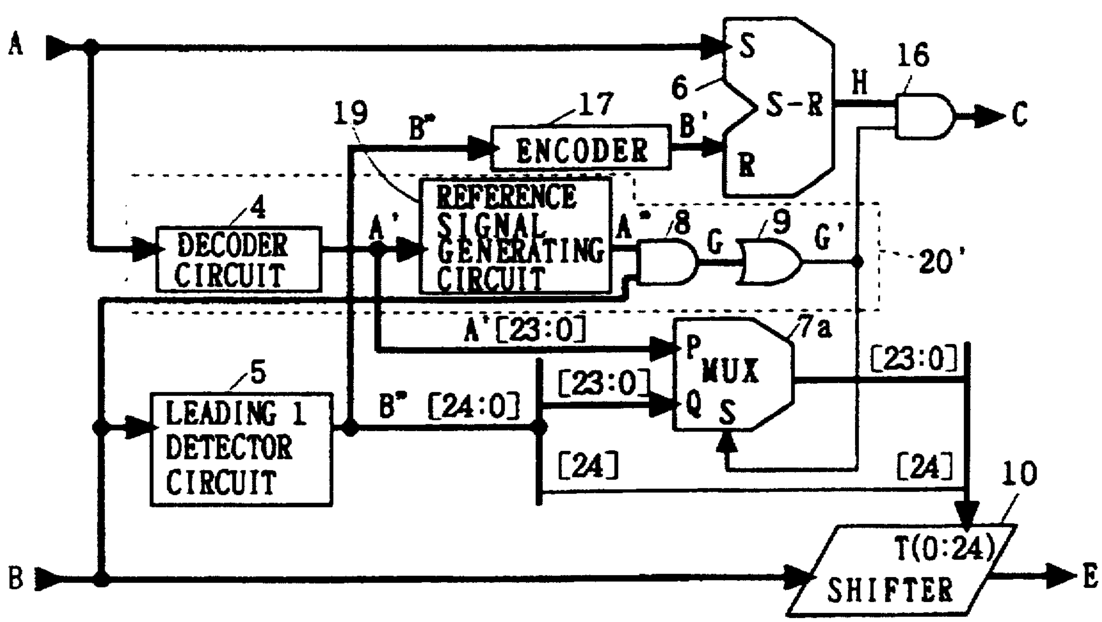
FIG. 41 is a circuit diagram of another preferred embodiment of the present invention.

In the circuit of FIG. 40, as shown in FIG. 41, the MUX circuit 7b can be replaced by the AND gate circuit 16.

(Third Modified Example of the Seventh Preferred Embodiment)

Furthermore, the MUX circuit 7b may be replaced by the AND gate circuit as shown in FIG. 40 and the reference signal generating circuit 19 may be replaced by the reference signal generating circuit 19' shown in FIG. 37.

(Eighth Preferred Embodiment)

Another preferred embodiment of the normalization circuit device in the floating point computation device is shown in FIG. 42. In the normalization circuit 1G, the parts 6 and 7b of FIG. 40 are replaced by the MUX circuit 7c and the subtracter circuit 6A, which is the same as the normalization circuit 1F of FIG. 40 in other respects.

In the circuit of FIG. 42, the reference signal generating circuit 19 can be replaced by the reference signal generating circuit 19' shown in FIG. 37.

(Ninth Preferred Embodiment)

As has been stated before, The IEEE 754 standard provides the normalization number and the unnormalization number as the representation method of the floating point. For example, in the representation of the 32-bit single precision in the IEEE 754 standard, numbers with the value of the exponent part larger than 0 and smaller than 255 correspond to the normalization number, in which case 1≦the mantissa part <2 and so the bit state of the most significant bit MSB of the mantissa part is always 1, so that the MSB is omitted and the mantissa part is represented only with the lower-order bits than the MSB. Accordingly, the normalization number is represented as $(-1)^s \times (1+F \times 2^{-23}) \times 2^{(E-127)}$. On the other hand, the unnormalization number in which the exponent part is 0 is represented as $(-1)^s \times (F \times 2^{-23}) \times 2^{(-126)}$.

This way, according to the 32-bit single precision representation in the IEEE 754 standard, the floating point is represented in 32 bits, and which is formed of a 1-bit symbol bit S, a 8-bit exponent part E and a 23-bit mantissa part F.

Hence, in the floating point computation devcie based on the IEEE 754 standard, even if those described in the first through eighth preferred embodiments are used as the structure of the normalization circuit device, the output result of the normalization circuit device (in FIG., 1, C and E) must be further converted finally into a number of the representation form defined by the IEEE 754 standard. Such a converting circuit corresponds to the conversion circuit 51 shown in FIG. 1.

Structure examples of the conversion circuit having the above-described function include that disclosed in U.S. Pat. No. 5,187,678, for example, and FIG. 56 shows a block circuit diagram of a floating point computation devcie in which a conversion circuit 51 having the circuit structure equivalent to that disclosed therein is added to the normalization circuit device 1 described in the first preferred embodiment.

In the figure, the OR gate circuit 108 is a circuit for detecting that all bit states of the exponent part output signal C are given as 0 value, which outputs a control signal at the level "0" when the all 0 value is detected.

Figure 57A:
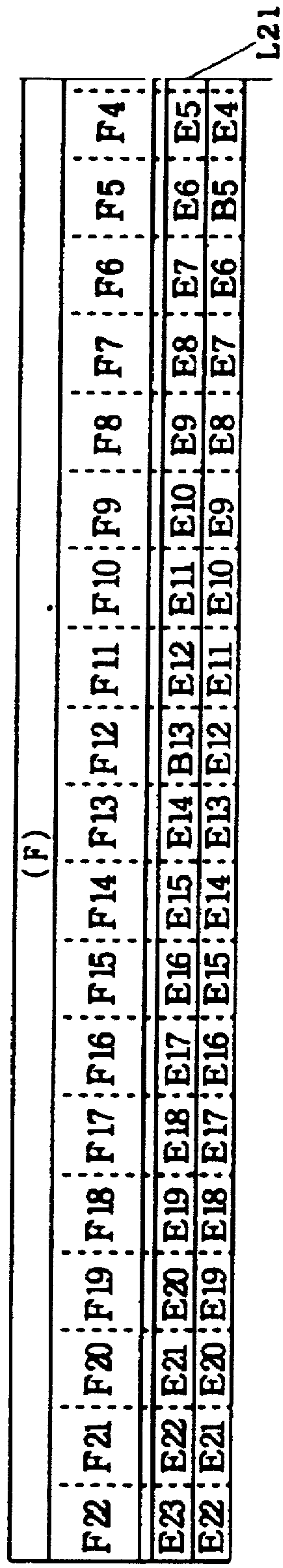
FIG. 57(*a*) and FIG. 57(*b*) are diagrams showing a truth table of the shifter circuit of the conversion circuit of FIG. 56.
Figure 57B:
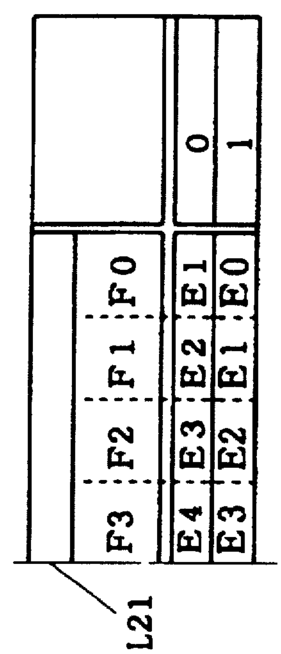

The 1-bit shifter circuit 109 shifts the input mantissa part output signal E (24-bit signal) (referred to as an input signal) by 1 bit according to the control signal J to output the mantissa part output signal F of a bit width of 23 bits. That is to say, as shown in FIG. 57 which is a truth table of the circuit 109, when the control signal J is a "0" value, the circuit 109 shifts all bits of the input signal E by 1 bit to the right, i.e., toward the least significant bit $E_0$. As a result, the least significant bit $E_0$ is eliminated and then the mantissa part output signal F ($F_{22}$–$F_0$) is given by bits $E_{23}$–$E_l$. On the other hand, when the control signal J is not a "0" value (in the case of normalization), the circuit 109 intactly outputs all the bits of the input signal E without shifting. Accordingly, the mantissa part output signal F ($F_{22}$–$F_0$) is given by the bits $E_{22}$–$E_0$.

With the structure shown in FIG. 56, the output signal having the representation form corresponding to the IEEE 754 standard can be outputted finally. However, adopting the structure of FIG. 56 enlarges the critical path as the 1-bit shifter 109 is provided, which causes the problem that the effect of the high speed operation can not be sufficiently utilized because of the existence of the 1-bit shifter 109 even if the structures of the normalization circuit devices of the first through eighth preferred embodiments are adopted to attain higher speed computation. Furthermore, in the normalization circuit devices of the first through eighth preferred embodiments which include a shifter (e.g., the shifter 10 of FIG. 2) on the output stage of the mantissa part output signal, adopting the structure of FIG. 56 results in two shifters arranged in series, which causes the problem of increasing the circuit scale in combination with the necessity of also providing the OR circuit 108 for 0 value detection, also in which respect adopting the conversion circuit 51 of FIG. 56

Accordingly, in this ninth preferred embodiment, the shifter circuit itself in the normalization circuit device also realizing the above converting function removes the need of providing the conversion circuit on the output external side of the normalization circuit device, thereby to reduce the circuit scale of the floating point computation devcie and to attain still higher computation speed.

Now, under the above-described technical idea, the specific structure of a normalization circuit device 1M (refer to FIG. 58) obtained by improving the normalization circuit device 1 of the first preferred embodiment will be described.

Figure 59:
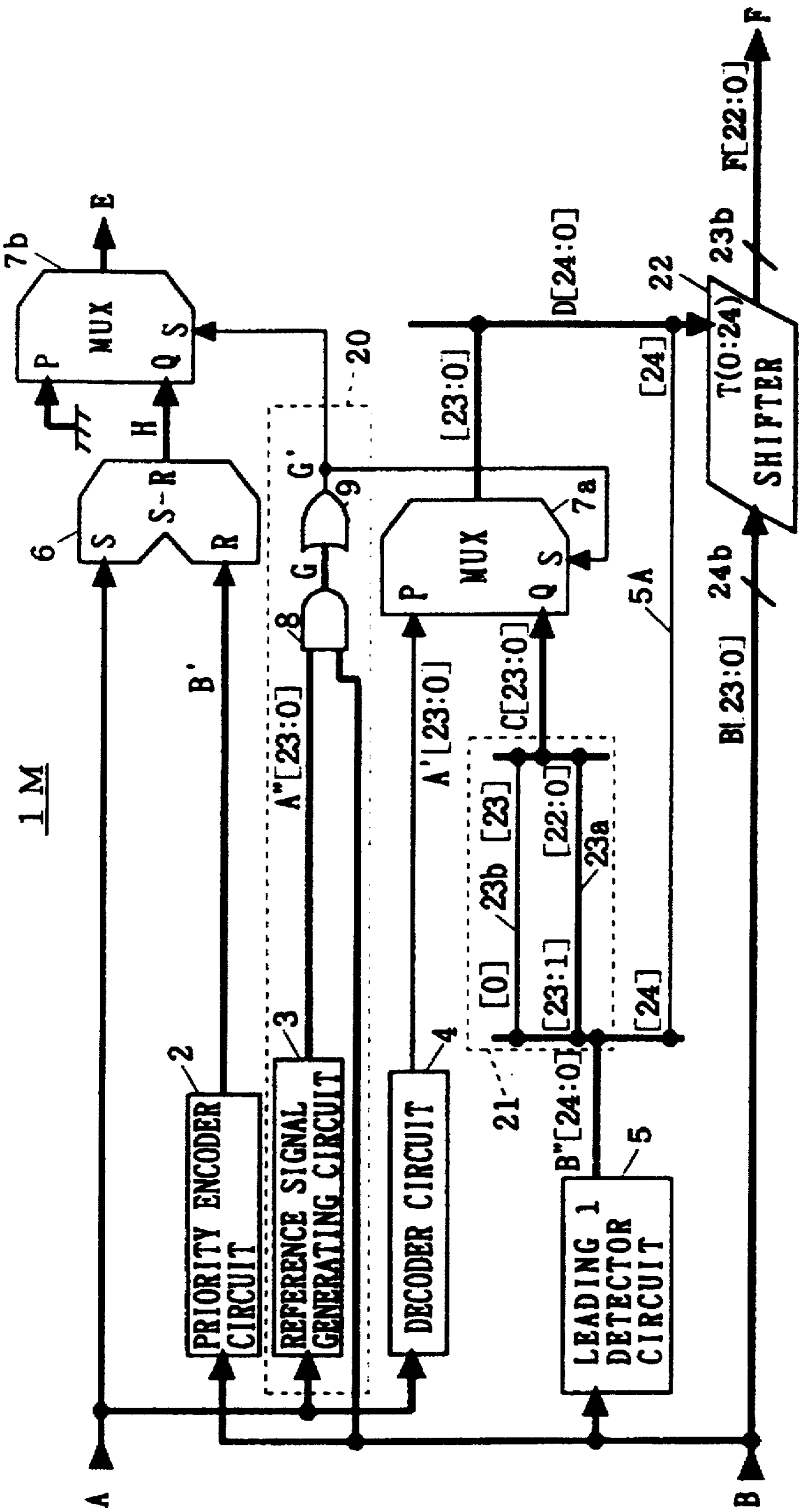
FIG. 59 is a circuit block diagram of the normalization circuit device in the ninth preferred embodiment.

FIG. 59 is a block diagram showing a structure example of the normalization circuit device 1M in the floating point computation device of the ninth preferred embodiment. In the figure, the shift function portion 21 surrounded by the broken line and the shifter circuit 22 functionally differ from the parts of FIG. 2. Other portions have the same functions as those of the parts designated by the same reference characters in FIG. 2. The output signal E shows an exponent part output signal and the output signal F shows a mantissa part output signal having the bit width of the bits determined by the 32-bit single precision representation in the IEEE 754 standard, i.e., of 23 bits.

The shift function portion 21 receives the output signal $B"_{23}$–$B"_0$ of the bit width of 24 bits, i.e., the output signal B" (25 bits) of the leading 1 detector circuit 5 except its most significant bit $B"_{24}$ and shifts the bit states of the output signal $B"_{23}$–$B"_0$ by one bit toward its least significant bit $B"_0$. As to the least significant bit $B"_0$, however, the portion 21 shifts it into the position of the most significant bit $B"_{23}$ of the inputted output signal $B"_{23}$–$B"_0$ as its bit state. The shift function portion 21 is also referred to as a first shift portion for discrimination from the shifter circuit 22, and then the shifter circuit 22 is referred to as a second shift portion.

Here, the shift function portion 21 is realized only with the interconnection layers 23a and 23b connecting the output port of the output signal $B"_{23}$–$B"_0$ of the leading 1 detector circuit 5 except the most significant bit $B"_{24}$ and the Q input port (also referred to as one input port) of the MUX circuit 7a as a selector function portion, without using any transistors. That is to say, the portion 21 is formed by connecting each output port or each output line of the leading 1 detector circuit 5 outputting each bit from the first bit $B"_1$ to the twenty-third bit $B"_{23}$, counted from the least significant bit, respectively to each input line or each input port providing each bit from the least significant bit $C_0$ to the twenty-third bit $C_{22}$, counted from the least significant bit $C_0$ including the least significant bit $C_0$ in the one input port Q of the MUX circuit 7a using the interconnection layer 23a, and connecting the output port or the output line of the leading 1 detector circuit 5 outputting the least significant bit $B"_0$ of the output signal B" to the input port or the input line inputting the most significant bit $C_{23}$ in the one input port Q using the interconnection layer 23b. Here, the signal C is one input signal of bit width of 24 bits.

Since the portion 21 is formed only by re-connecting the interconnections, a 1-bit shift function can be realized without causing a delay time. That is to say, the portion 21 is not a factor in formation of the critical path.

The MUX circuit 7a receives the input signal C at its one input port Q and receives the output signal A' from the decoder circuit 4 at its other input port P, and receives the control signal G' at its control port S.

Figure 63:
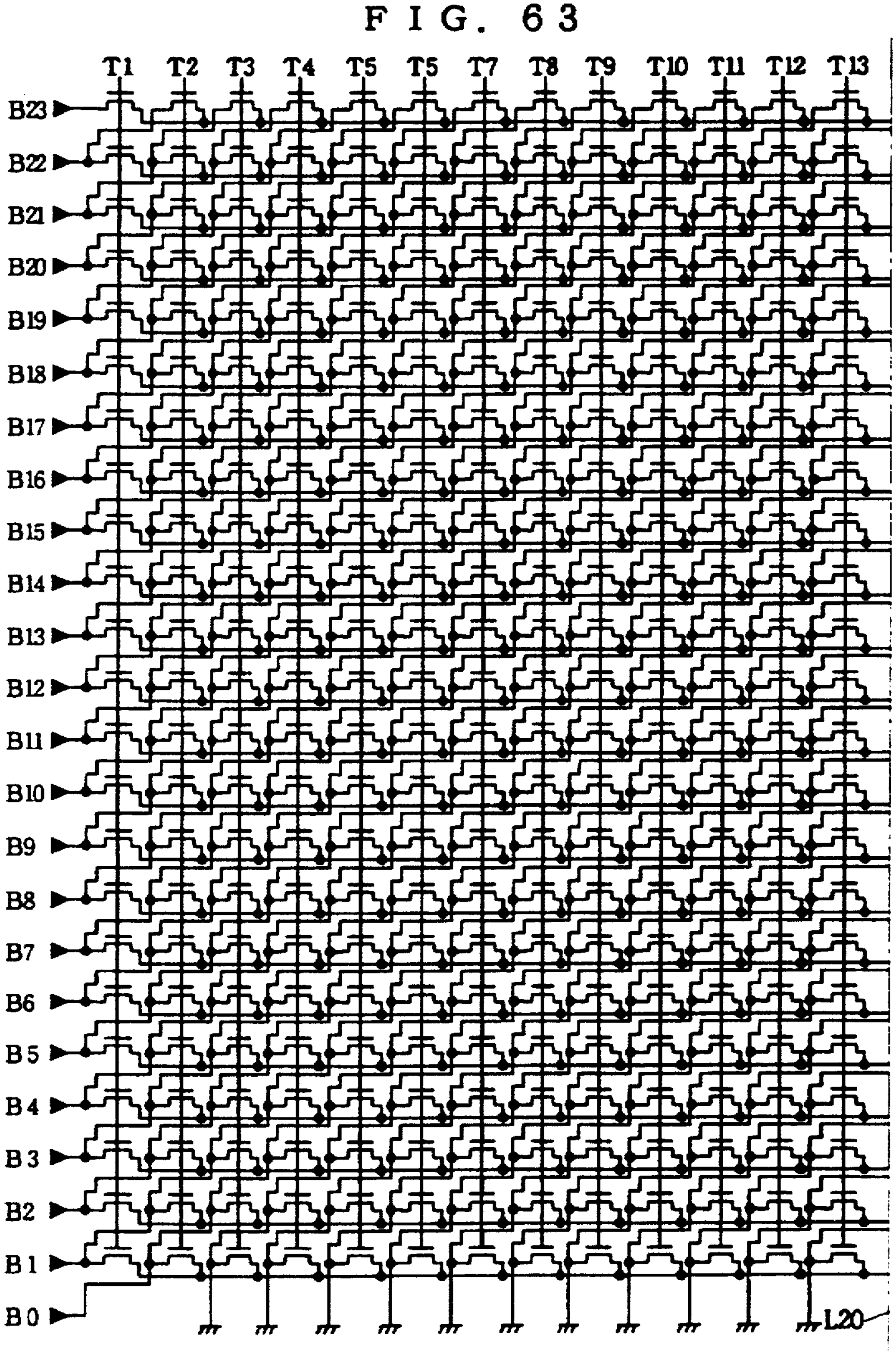
FIG. 63 is a circuit diagram of the shifter circuit shown in FIG. 59.
Figure 64:
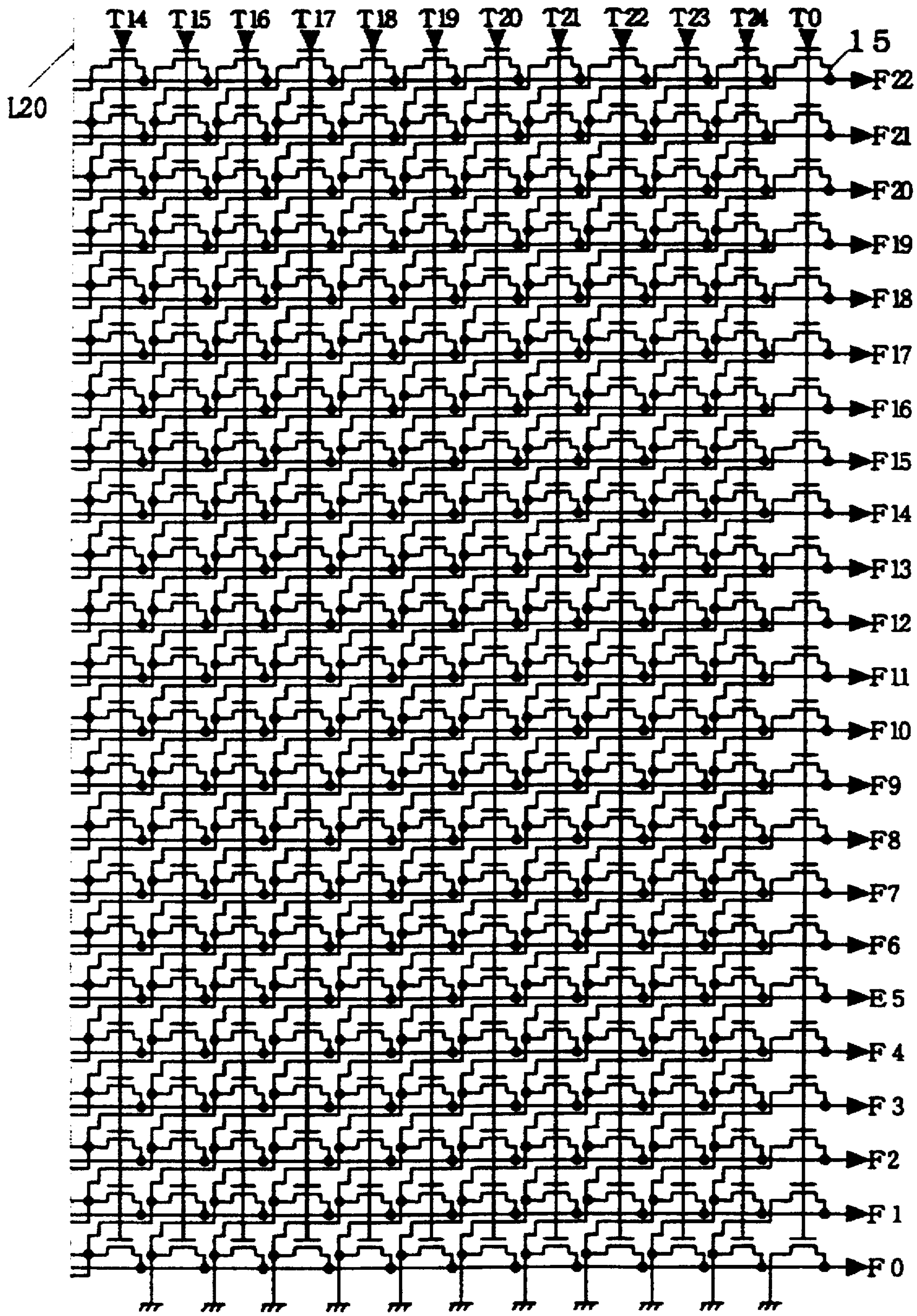
FIG. 64 is a circuit diagram of the shifter circuit shown in FIG. 59.

A truth table of the shifter circuit 22 is shown in FIG. 60 to FIG. 62. A specific structure example of the circuit 22 is shown in FIG. 63 and FIG. 64.

By the way, although the bit width of the mantissa part input signal B is 24 bits in this example, it is usually set to about 27 bits. In this case, the shifter circuit 22 shifts the mantissa part input signal B to eliminate the most significant bit of the signal B and three bits on the least significant side including its least significant bit in the normalization processing (G'=1), and it shifts the mantissa part input signal B to eliminate four bits on the least significant bit side including the least significant bit of the signal B in the unnormalization processing or in the 0 function (G'=0).

The function of the shifter circuit 22 can be described more generally as follows. That is to say, if the bit width determined by the IEEE standard is y, then the circuit 22, in the normalization processing, shifts the mantissa part input signal of the bit width x (x is an integer satisfying $x \geqq y$) so that its most significant bit and lower-order bits as many as a number given by $\{(x-y)-1\}$ including its least significant bit are eliminated or neglected. (However, the least significant bit is not neglected when x=y or when x=y+1.) In processing other than the normalization processing, it shifts the inputted mantissa part input signal so that bits on the least significant side as many as the number given by (x−y) including its least significant bit are eliminated or neglected. (However, the least significant bit is not neglected when x=y.)

The control signal generating portion 20 and the decoder circuit 4 can be regarded as forming a control signal generating portion as a higher level concept which receives the mantissa part input signal and the exponent part input signal, decodes the exponent part input signal, determines on the basis of the mantissa part input signal and the exponent part input signal whether the output result of the normalization circuit device becomes a normalization number, or an unnormalization number, or a 0 function state in which the mantissa part input signal provides a 0 value, and generates a control signal at a first level when it is a normalization number and generates a control signal at a second level when it is an unnormalization number or the 0 function state.

Next, a specific example of the circuit operation of FIG. 59 will be described. Now, it is assumed that the exponent part input signal A and the mantissa part input signal B are given as A=127, B=0000 0001 0001 0001 0001 0001, respectively.

(1) The output signal A" of the reference signal generating circuit 3 is given as follows.

A"=1111 1111 1111 1111 1111 1111.

(2) The output signal G of the AND gate circuit 8 is given as follows.

G=0000 0001 0001 0001 0001 0001.

(3) The output signal G' of the OR gate circuit 9 is found as G'=|G→1.

(4) The value of the output signal B' of the priority encoder circuit 2 is 7.

(5) The output signal H of the subtracter circuit 6 is H=A−B'→127−7→120.

(6) The output signal E of the MUX circuit 7b is expressed as E=G'?H:0→1?120:0→120.

(7) The output signal A' of the decoder circuit 4 is given as follows.

A'=0000 0000 0000 0000 0000 0000.

(8) The output signal B" of the leading 1 detector circuit 5 is given as follows.

B"=0 0000 0001 0000 0000 0000 0000.

(9) The input signal C is given as follows.

C=0000 0000 1000 0000 0000 0000.

(10) The output signal D of the MUX circuit 7*a* is given as follows.

D=0 0000 0000 1000 0000 0000 0000.

(11) The value of the output signal F of the shifter circuit 10 is given as follows.

F=000 1000 1000 1000 1000 0000.

Next, the case of A=5 and B=0000 0001 0001 0001 0001 0001 is considered.

(1) The output signal A" of the reference signal generating circuit 3 is given as follows.

A"=1111 1000 0000 0000 0000 0000.

(2) The output signal G of the AND gate circuit 8 is given as follows.

G=0000 0000 0000 0000 0000 0000.

(3) The output signal G' of the OR gate circuit 9 is found as G'=G'=|G→0.

(4) The output signal B' of the priority encoder circuit 2 is 7.

(5) The output signal H of the subtracter circuit 6 is given as H=A–B'→5–7→–2.

(6) The output signal E of the MUX circuit 7*b* is found as E=G'?H:0→0 ?–2:0→0.

(7) The output signal A' of the decoder circuit 4 is given as follows.

A'=0000 0100 0000 0000 0000 0000.

(8) The output signal B" of the leading 1 detector circuit 5 is given as follows.

B"=0 0000 0001 0000 0000 0000 0000.

(9) The input signal C is given as follows.

C=0000 0000 1000 0000 0000 0000.

(10) The output signal D of the MUX circuit 7*a* is given as follows.

D=0 0000 0100 0000 0000 0000 0000.

(11) The output signal F of the shifter circuit 10 is given as follows.

F=001 0001 0001 0001 0001 0000.

Next, the case of A=127 and B=0000 0000 0000 0000 0000 0000 is considered.

(1) The output signal A" of the reference signal generating circuit 3 is given as follows.

A"=1111 1111 1111 1111 1111 1111.

(2) The output signal G of the AND gate circuit 8 is given as follows.

G=0000 0000 0000 0000 0000 0000.

(3) The output value G' of the OR gate circuit 9 is G'=|G→b 0.

(4) The output value B' of the priority encoder circuit 2 is 0.

(5) The output signal H of the subtracter circuit 6 is found as H=A–B'→127–0→127.

(6) The output signal E of the MUX circuit 7*b* is expressed as E=G'?H:0 →0?127:0→0.

(7) The output signal A' of the decoder circuit 4 is given as follows.

A'=0000 0000 0000 0000 0000 0000.

(8) The output signal B" of the leading 1 detector circuit 5 is given as follows.

B"=1 0000 0000 0000 0000 0000 0000.

(9) The input signal C is given as follows.

C=0000 0000 0000 0000 0000 0000.

(10) The output signal D of the MUX circuit 7*a* is given as follows.

D=1 0000 0000 0000 0000 0000 0000.

(11) The value of the output signal F of the shifter circuit 10 is given as follows.

F=000 0000 0000 0000 0000 0000.

In this ninth preferred embodiment, as shown in FIG. 59, the most delayed path (critical path) is the path from the input port of the mantissa part input signal B to the leading 1 detector circuit 5→the MUX circuit 7*a*→the shifter circuit 22→the output port of the mantissa part output signal F, which can implement a normalization circuit device with a higher speed as compared with the case of FIG. 56.

As described above, this ninth preferred embodiment applies modification to the normalization circuit device 1 in the first preferred embodiment so that the interconnection portion of the output port of the leading 1 detector circuit 5 and the one input port Q of the MUX circuit 7*a* is replaced by the shift function portion 21 (23*a*, 23*b*) which is also formed only of an interconnection layer, and further the shifter circuit 10 is replaced by the shifter circuit 22. Thus, the ninth preferred embodiment can realize inside the normalization circuit device 1M the function of the external conversion circuit 51 necessary in the first preferred embodiment without causing a delay of computation in the shift function portion 21 (23*a*, 23*b*), which results in further improvement of the high speed performance of the computation speed by further reducing the critical path and reduction of the circuit scale.

While configuring the shift function portion 21 (23*a*, 23*b*) as in this preferred embodiment can obtain the substantial effect of preventing the shift function portion from being a factor in the formation of the new critical path, the shift function portion may be implemented with a so-called shifter circuit composed of transistors. This can not obtain the advantage of further speeding up the operation speed, but it still has the merit of reducing the circuit scale as it does not require the OR circuit 108 for 0 value detection required in the conversion circuit 51 of FIG. 56.

Now, applications of the above-described structure of using the shift function portion 21 (23*a*, 23*b*) and the shifter circuit 22 to the modified examples of the first preferred embodiment, the second through eighth preferred embodiments and the modified examples thereof will be briefly described as modified examples of the ninth preferred embodiment. It is a matter of course that the functions and effects the same as those of the ninth preferred embodiment are obtained in the modified examples.

(First Modified Example of the Ninth Preferred Embodiment)

Figure 65:
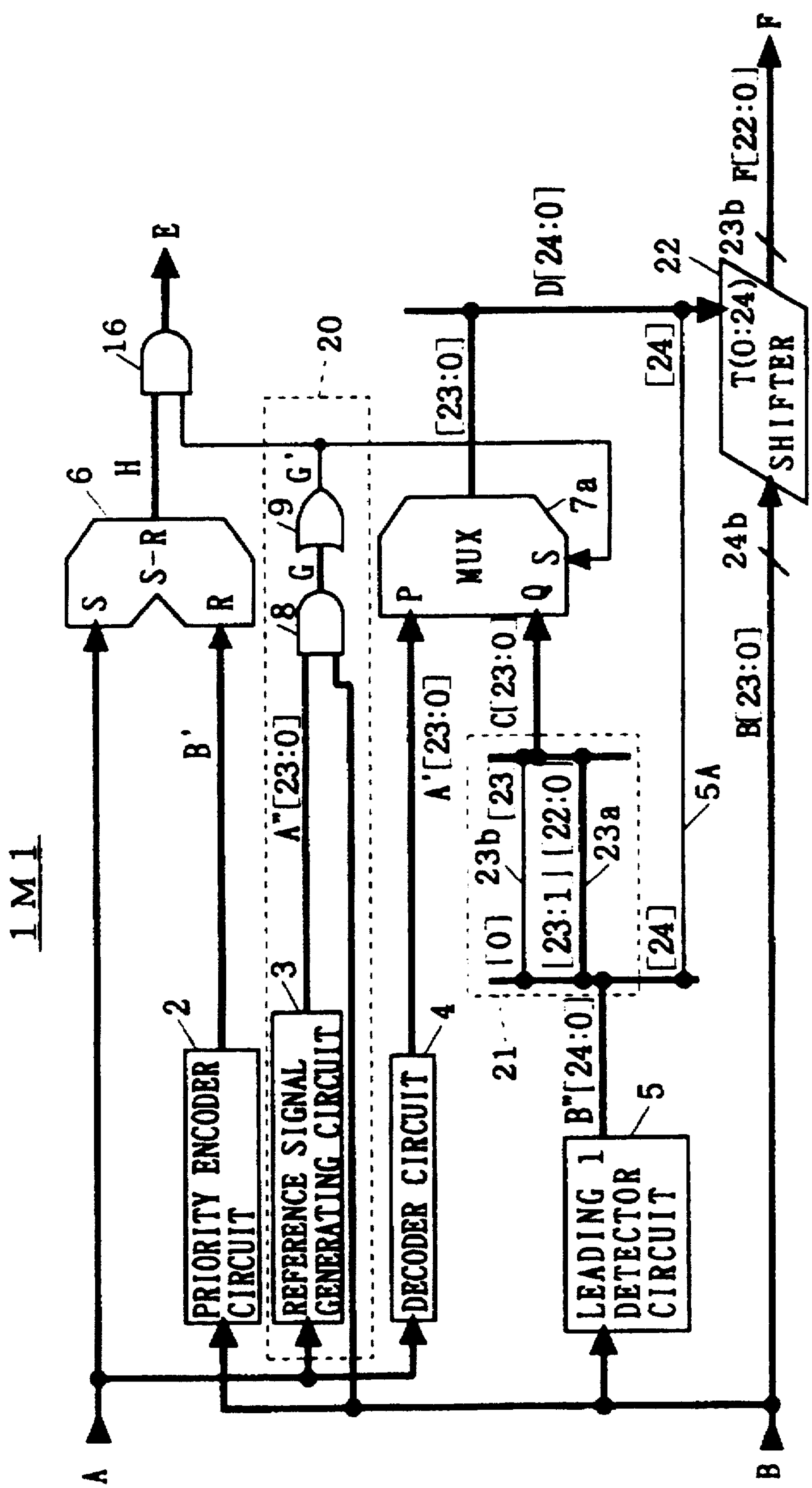
FIG. 65 is a circuit diagram showing a modified example of the ninth preferred embodiment of the present invention.

In the normalization circuit device of FIG. 59, as shown in FIG. 65, the MUX circuit 7*b* can be replaced by the AND gate circuit 16. This corresponds to an application of the shift function portion 21 and the shifter circuit 22 of the ninth preferred embodiment to the second modified example of the first preferred embodiment.

(Second Modified Example of the Ninth Preferred Embodiment)

Figure 66:
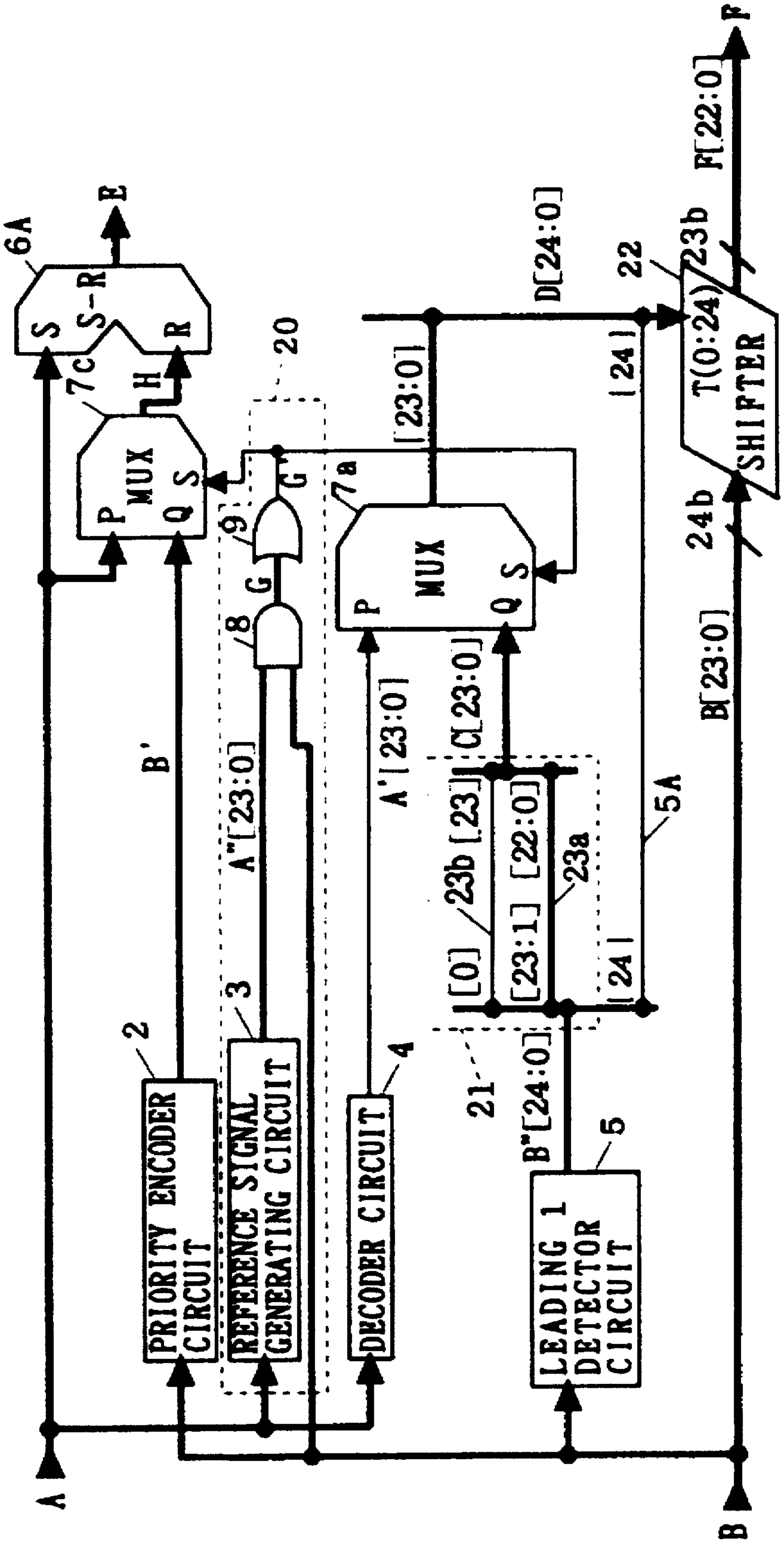
FIG. 66 is a circuit diagram showing a modified example of the ninth preferred embodiment of the present invention.

FIG. 66 shows an application of the shift function portion 21 and the shifter circuit 22 to the second preferred embodiment (FIG. 24).

(Third Modified Example of the Ninth Preferred Embodiment)

Figure 67:
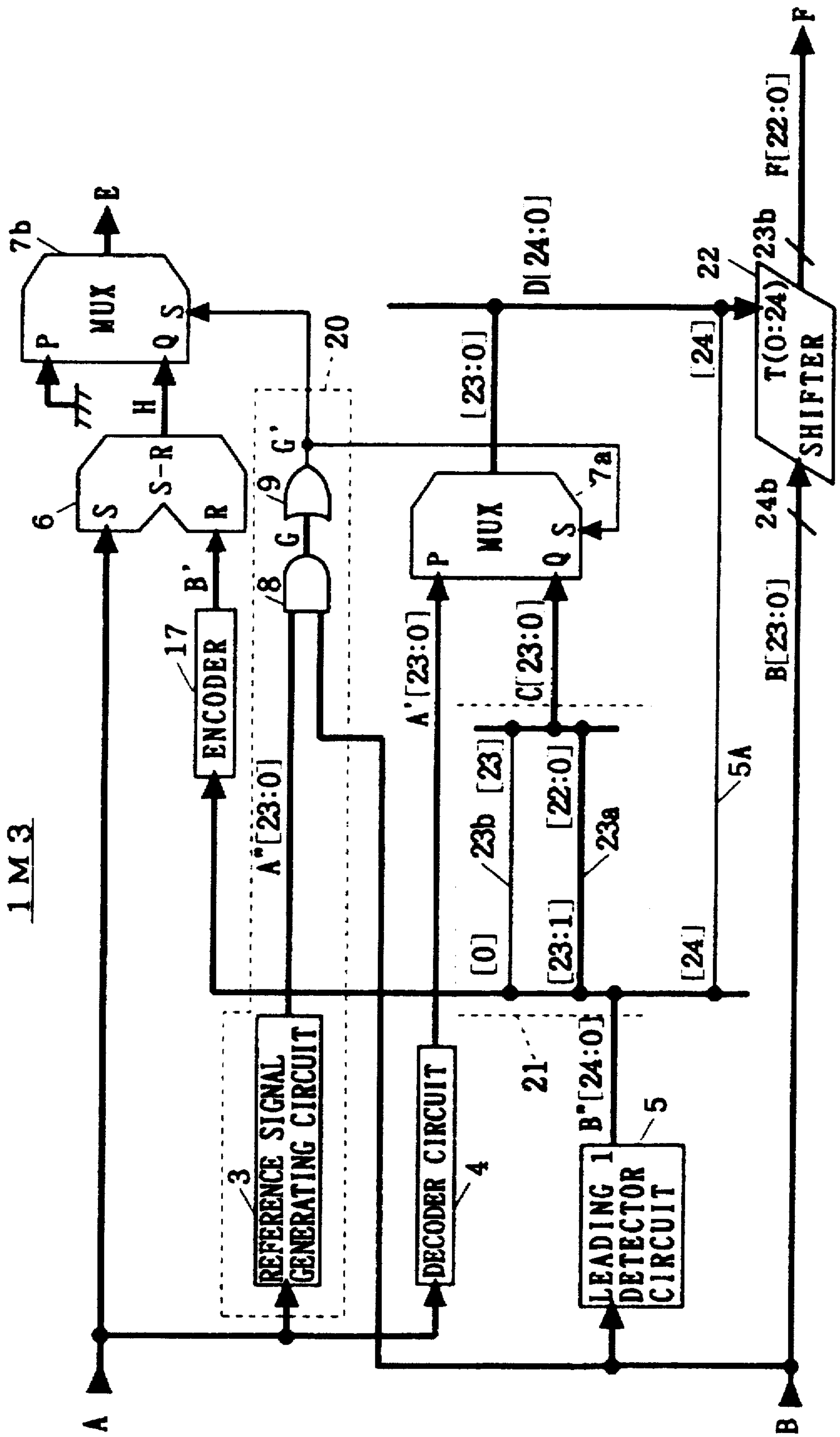
FIG. 67 is a circuit diagram showing a modified example of the ninth preferred embodiment of the present invention.

FIG. 67 shows an application of the shift function portion 21 and the shifter circuit 22 to the third preferred embodiment shown in FIG. 25.

(Fourth Modified Example of the Ninth Preferred Embodiment)

FIG. 68 shows an application of the shift function portion 21 and the shifter circuit 22 to the second modified example of the third preferred embodiment of FIG. 29.

(Fifth Modified Example of the Ninth Preferred Embodiment)

Figure 69:
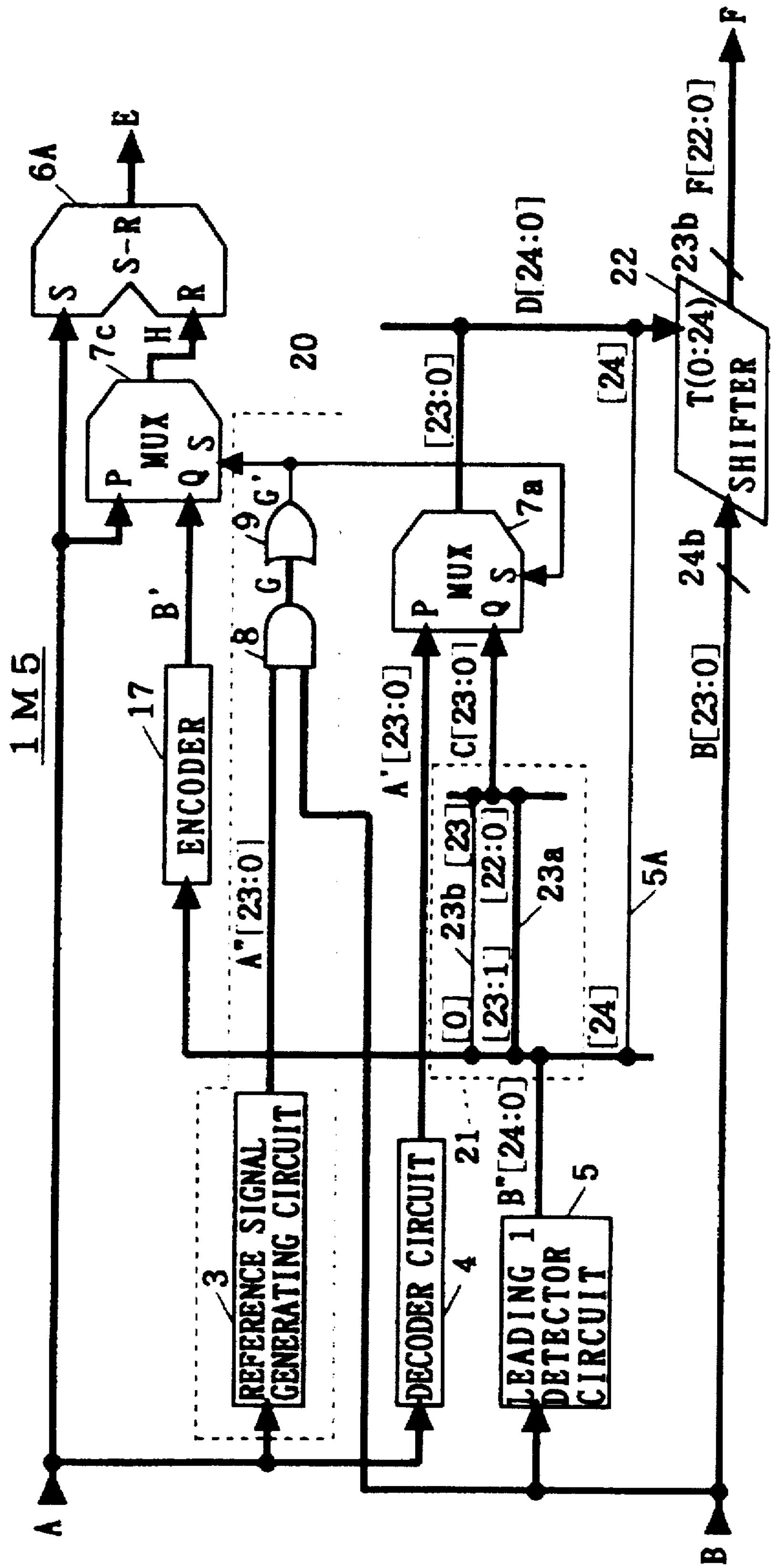
FIG. 69 is a circuit diagram showing a modified example of the ninth preferred embodiment of the present invention.

FIG. 69 shows an application of the shift function portion 21 and the shifter circuit 22 to the fourth preferred embodiment shown in FIG. 30.

(Sixth Modified Example of the Ninth Preferred Embodiment)

Figure 70:
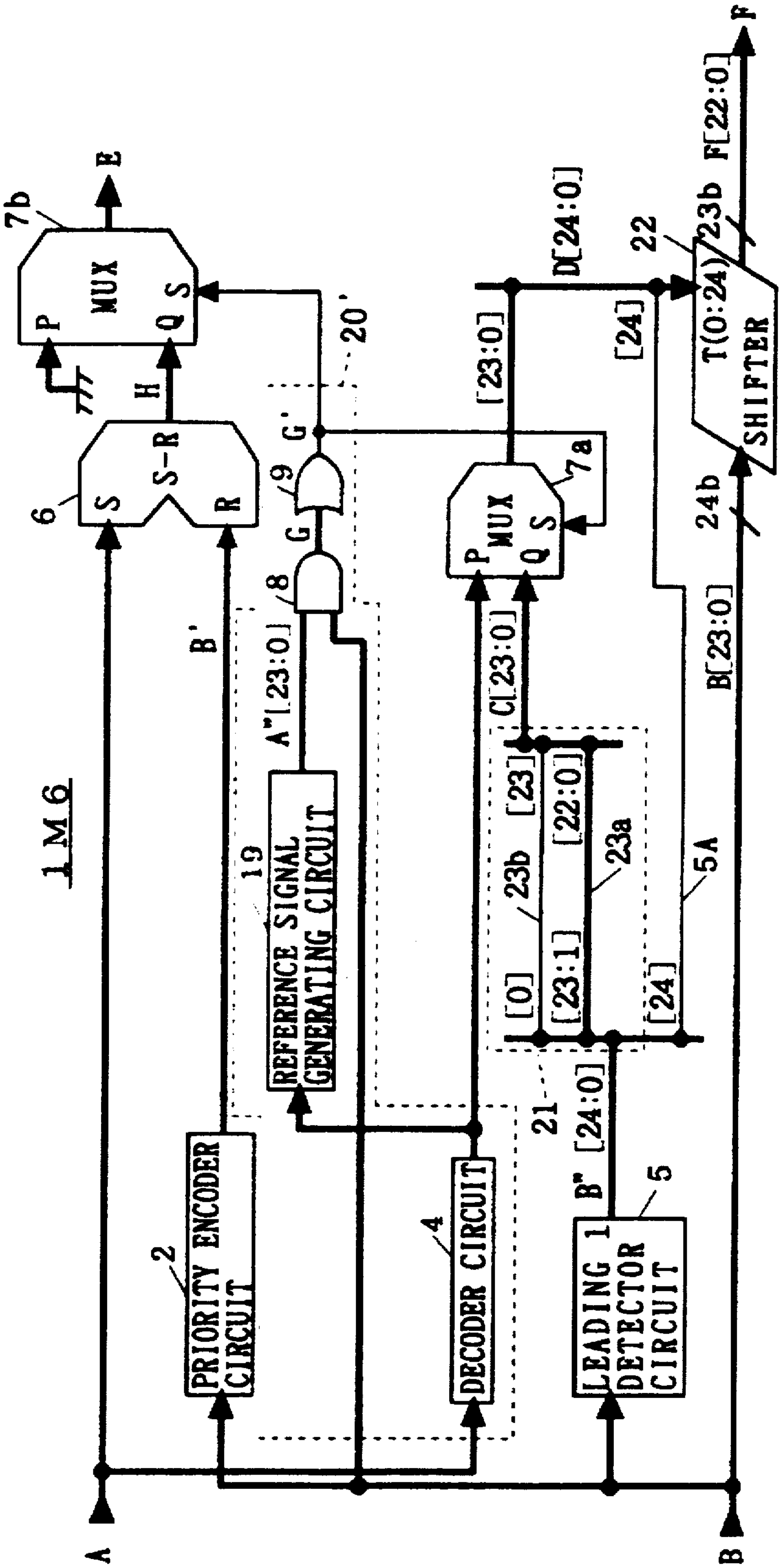
FIG. 70 is a circuit diagram showing a modified example of the ninth preferred embodiment of the present invention.

FIG. 70 shows an application of the shift function portion 21 and the shifter circuit 22 to the fifth preferred embodiment shown in FIG. 31.

(Seventh Modified Example of the Ninth Preferred Embodiment)

Figure 71:
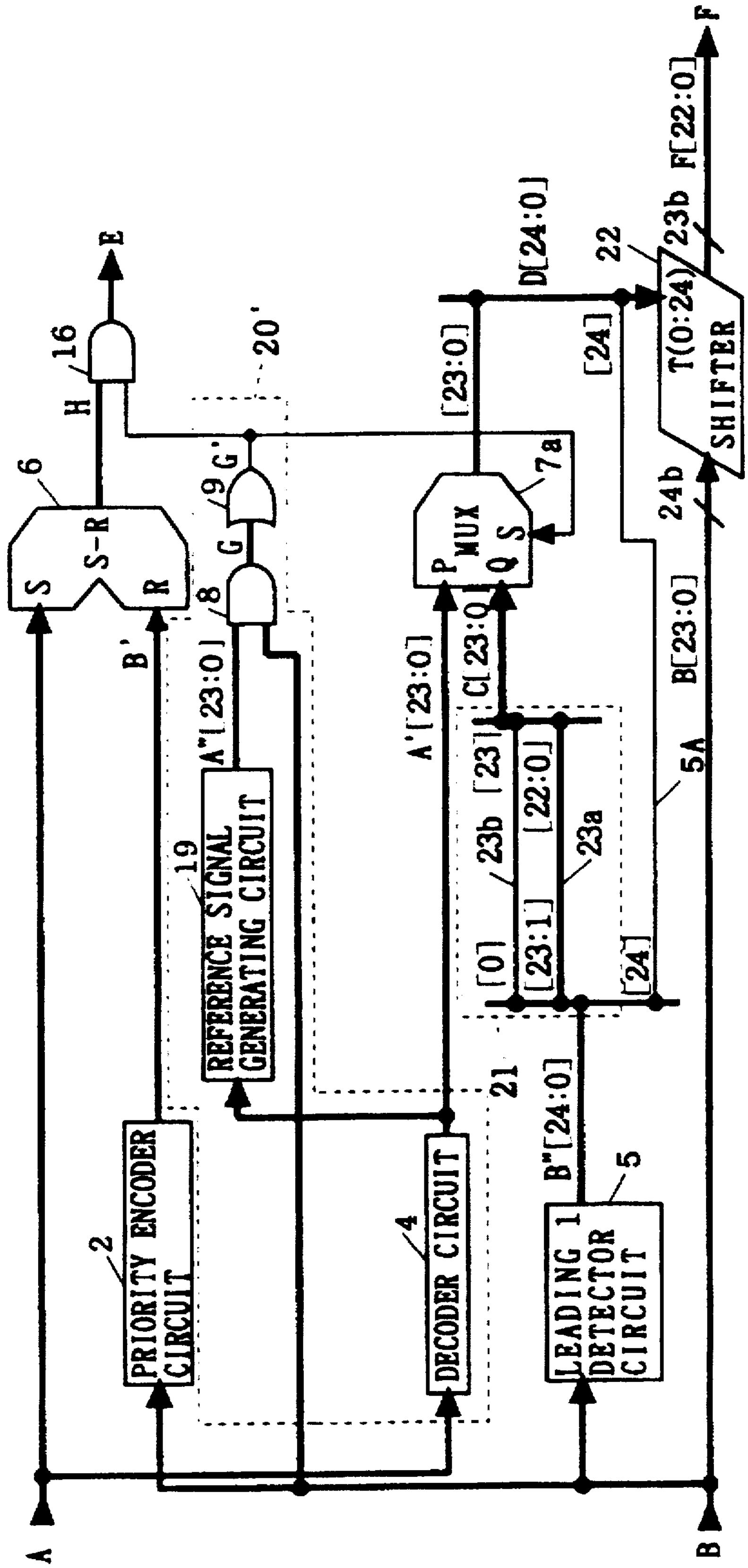
FIG. 71 is a circuit diagram showing a modified example of the ninth preferred embodiment of the present invention.

FIG. 71 shows an application of the shift function portion 21 and the shifter circuit 22 to the second modified example of the fifth preferred embodiment shown in FIG. 38.

(Eighth Modified Example of the Ninth Preferred Embodiment)

Figure 72:
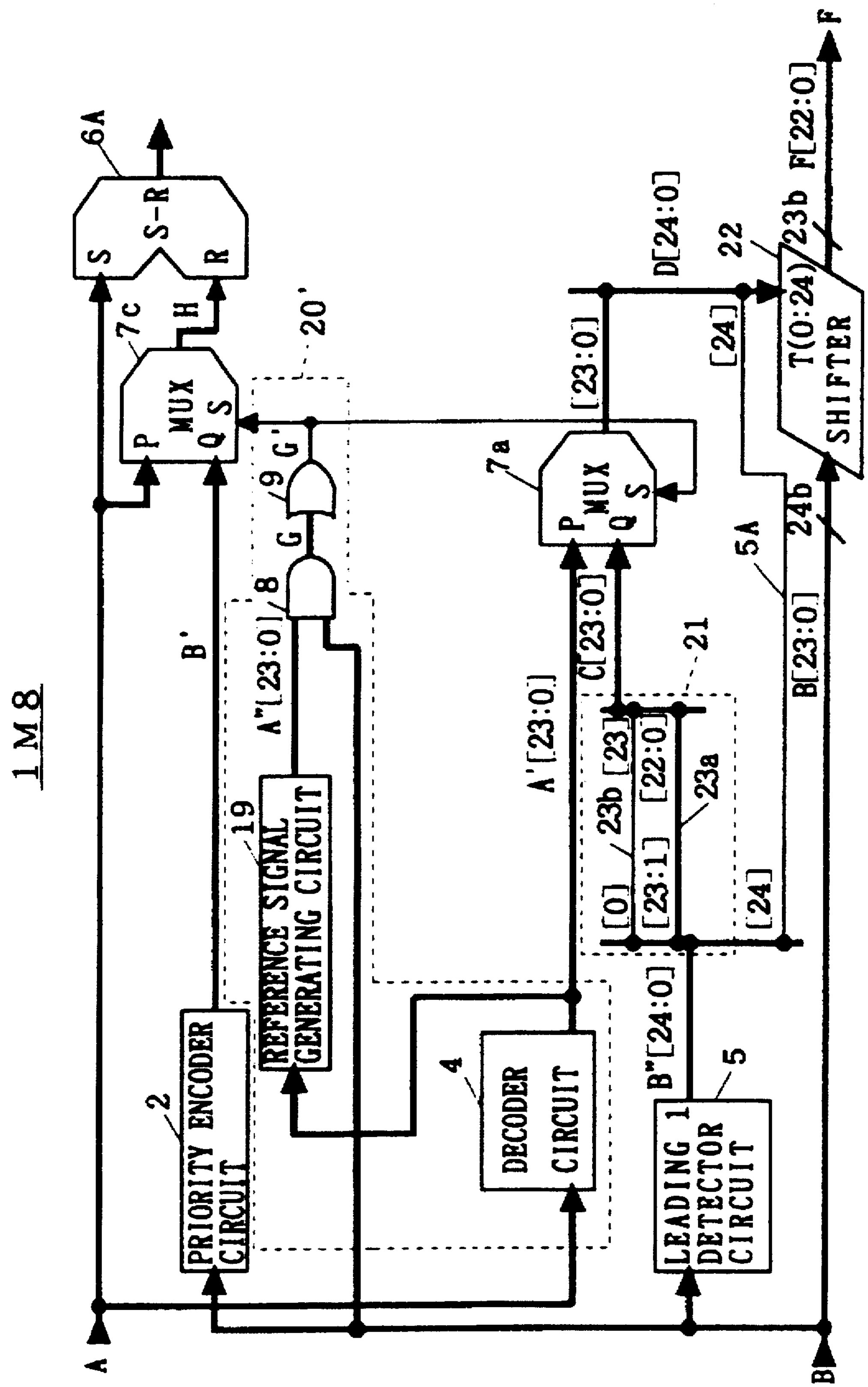
FIG. 72 is a circuit diagram showing a modified example of the ninth preferred embodiment of the present invention.

FIG. 72 shows an application of the shift function portion 21 and the shifter circuit 22 to the sixth preferred embodiment shown in FIG. 39.

(Ninth Modified Example of the Ninth Preferred Embodiment)

FIG. 73 shows an application of the shift function portion 21 and the shifter circuit 22 to the seventh preferred embodiment shown in FIG. 40.

(Tenth Modified Example of the Ninth Preferred Embodiment)

Figure 74:
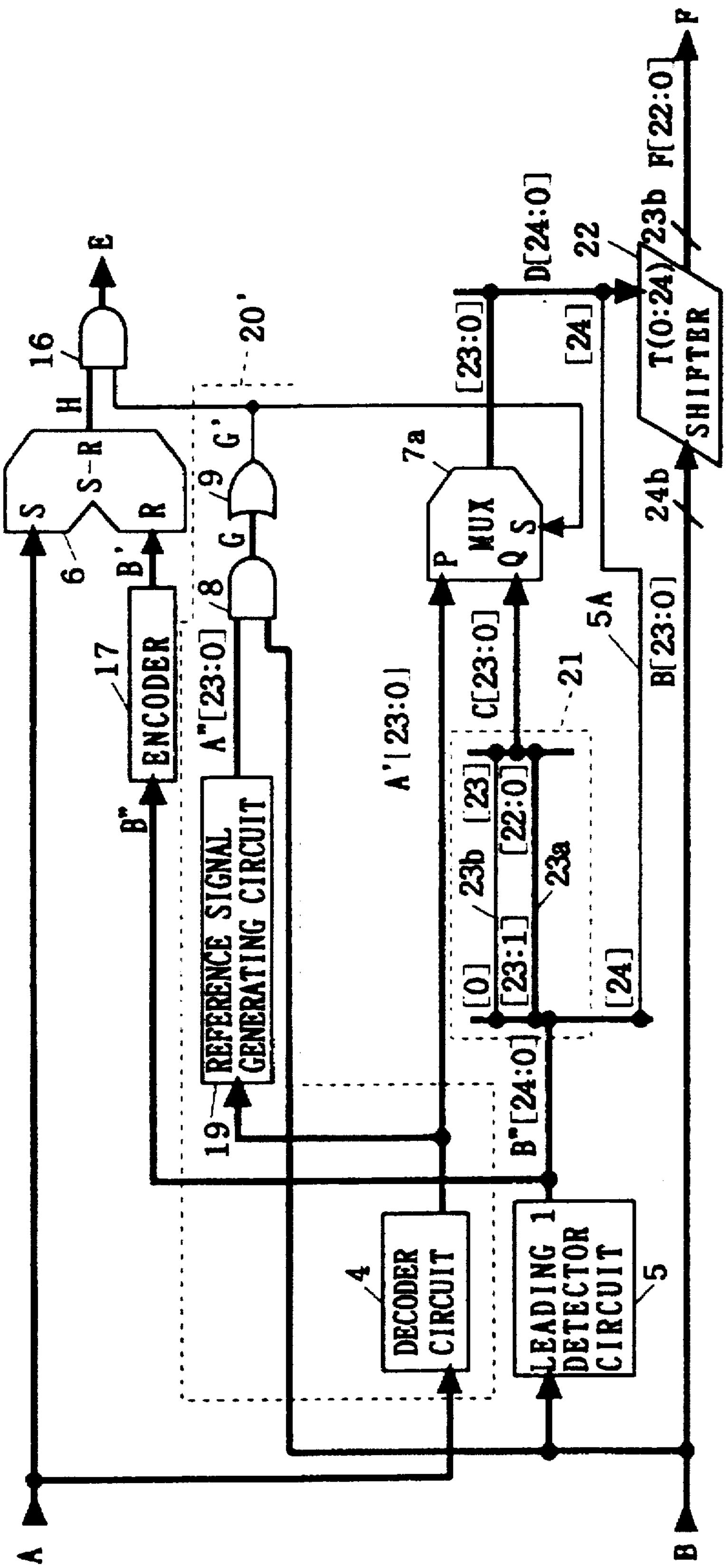
FIG. 74 is a circuit diagram showing a modified example of the ninth preferred embodiment of the present invention.

FIG. 74 shows an application of the shift function portion 21 and the shifter circuit 22 to the second modified example of the seventh preferred embodiment shown in FIG. 41.

(Eleventh Modified Example of the Ninth Preferred Embodiment)

Figure 75:
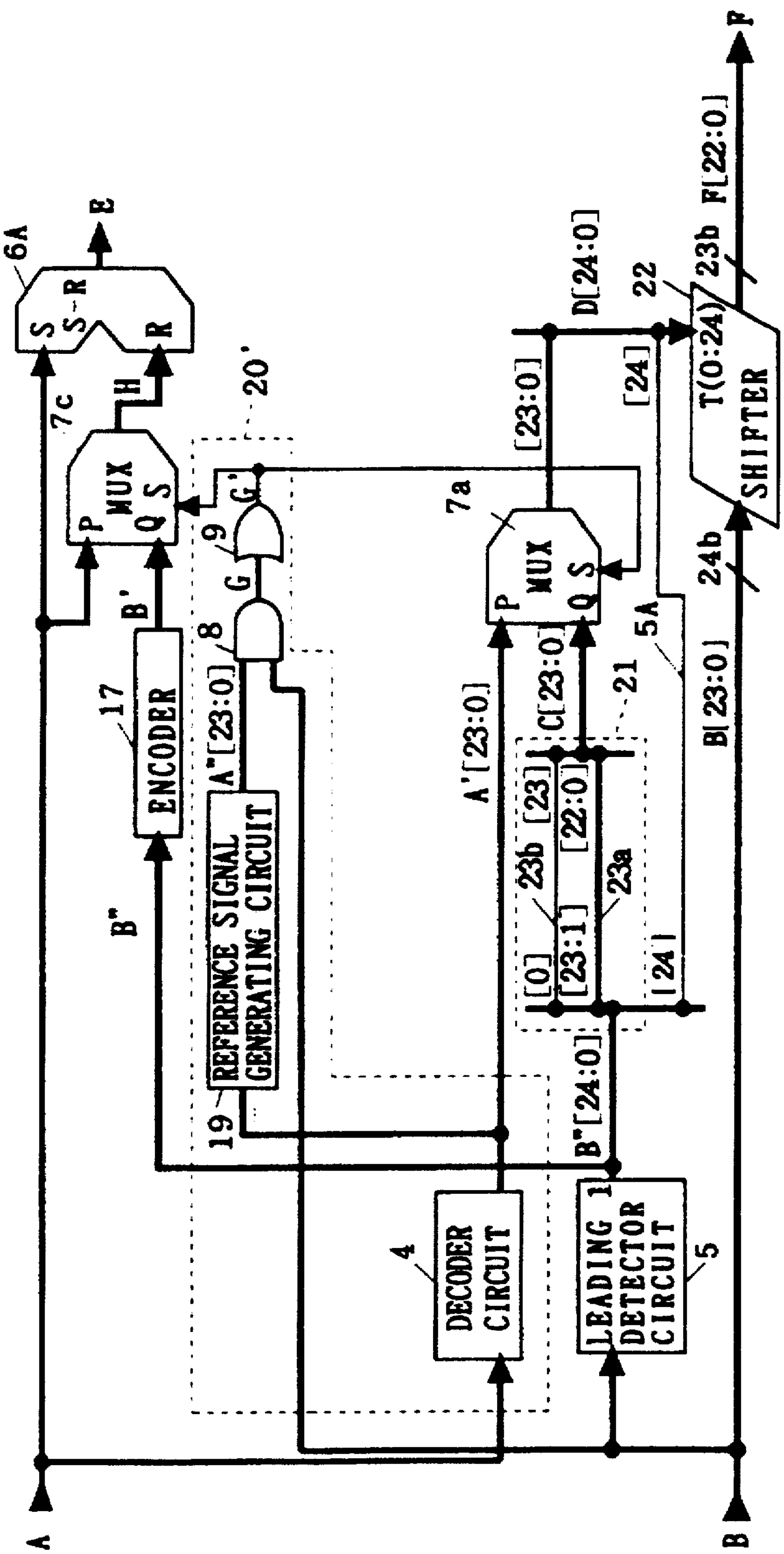
FIG. 75 is a circuit diagram showing a modified example of the ninth preferred embodiment of the present invention.

FIG. 75 shows an application of the shift function portion 21 and the shifter circuit 22 to the eighth preferred embodiment shown in FIG. 42.

(Additional Description)

While the first through ninth preferred embodiments described above relate to the single precision of the IEEE 754 standard, the double precision of the IEEE 754 standard represents the floating point in 64 bits, which is formed of a symbol bit S (1 bit), an exponent part E (11 bits) and a mantissa part F (52 bits).

The double precision of the IEEE 754 standard also provides the normalization number and the unnormalization number, where the case where the value of the exponent part is larger than 0 and smaller than 2048 is called a normalization number, and in the normalization number, 1≦mantissa part<2, and the MSB (the Most Significant Bit) of the mantissa part is always 1, so that the MSB is omitted and the bits lower-order than the MSB represent the mantissa part. Accordingly, the normalization number is represented as $(-1)^s\times(1+F\times2^{-52})\times2^{(E-1023)}$. The case where the exponent part is 0 is called an unnormalization number, where the unnormalization number$=(-1)^S\times(F\times2^{-52})\times2^{(-1022)}$.

Hence, the technical idea of the first through ninth preferred embodiments described on the single precision of the IEEE 754 standard can intactly be applied also to the floating point computation device based on the double precision of the IEEE 754 standard. In this case, a number based on the double precision of the IEEE 754 standard is used as an input and the output result is converted into a number based on the double precision of the IEEE 754 standard.

(Summary)

As has been described above, the normalization circuit device of the floating point computation device receives a mantissa part input signal and an exponent part input signal subjected to certain floating point computation processing, and determines on the basis of the mantissa part input signal and the exponent part input signal whether the output result of the normalization circuit device is a normalization number, or an unnormalization number, or it is the 0 function state where the mantissa part input signal provides a 0 value, according to which determination result it performs normalization processing (generically meaning the normalization, the unnormalization, and the 0 function processing) to the mantissa part input signal and the exponent part input signal.

That is to say, (1) it performs AND operation of the input signal B of the mantissa part and the signal A" generated by the reference signal generating circuit which outputs as 1 the bit states of respective bit positions from the most significant bit position for a number obtained by adding 1 to the decimal number value of the input signal A of the exponent part and provides the result G' resulted from OR operation of all the bits of its value G as a control signal controlling respective selecting portions, and (2) it operates the mantissa part input signal A in the priority encoder circuit which retrieves the input signal B from the most significant bit position and represents as a binary value B' a number obtained by subtracting 1 from the address number value of the bit position of the leading 1, subtracts the result B' from the input signal A, and selects the result H and a 0 value in respose to the control signal G' to obtain the output signal C of the exponent part after normalization. This provides a normalization circuit device which eliminates the need of providing a circuit for detecting that the mantissa part is 0.

Furthermore, the structure selects with the control signal G' the value B" obtained in a leading 1 detector circuit which retrieves the input signal B from the most significant bit position and renders 1 only the bit position of the leading 1 and the signal A' obtained by decoding the input signal A of the exponent part into the bit width the same as the input signal B to obtain the moved amount (shift amount) D for normalizing the input signal B of the mantissa part, with which signal D it shifts the input signal B of the mantissa part to obtain the output signal E of the mantissa part after normalization. Thus, when the input signal B of the mantissa part arrives at the normalization circuit device later than the input signal A of the exponent part, a high speed normalization circuit device can be implemented, which particularly provides the advantage that a high speed floating point computation device can be implemented using integrated circuits formed of MOS FETs.

Furthermore, according to the ninth preferred embodiment of the present invention, when the control signal G' is 1, as the output result of the normalization circuit device is a normalization number, it shifts by 1 bit to the most significant bit side by re-connecting the interconnection layers the output value B" obtained in the leading 1 detector circuit which retrieves the mantissa part input signal B from its most significant bit and renders 1 only the bit state of the bit position of which the bit state is the first 1 (i.e. the leading 1) to obtain the value C and sets the value C as the moved amount (shift amount) D for normalizing the mantissa part input signal B, and when the control signal G' is 0, as the output result is an unnormalization number, it sets the output signal A' obtained by decoding the exponent part input signal A into the bit width the same as that of the mantissa part input signal B as the moved amount (shift amount) D for normalizing the mantissa part input signal B, and shifts the mantissa part input signal B according to this moved amount D to obtain the mantissa part output signal F having the bit width smaller by 1 bit than the mantissa part input signal B. This removes the need of further providing a 1-bit shifter circuit in addition to the shift circuit on the output stage of the normalization circuit device, which provides a normalization circuit device with smaller circuit scale. Especially, when the mantissa part input signal B arrives at the input port of the normalization circuit device later than the exponent part input signal A, a still higher speed normalization circuit device can be implemented, in which respect the technic described in the ninth preferred embodiment is advantageous when realizing a high speed floating point computation device using integrated circuits formed of MOS FETs.

While the invention has been described in detail, the foregoing description is in all aspects illustrative and not restrictive. It is understood that numerous other modifications and variations can be devised without departing from the scope of the invention.

We claim:

1. A normalization circuit device of a floating point computation device which applies normalization to a mantissa part input signal and an exponent part input signal represented as binary numbers subjected to certain floating point computation processing and transmitted, comprising:

control signal generating means receiving said mantissa part input signal and said exponent part input signal, for generating a control signal at a first level when a decimal number value provided by said exponent part input signal is equal to or above an address number value of a leading 1 bit position as a bit position where a bit state first attains 1 seen from a most significant bit of said mantissa part input signal and for generating said control signal at a second level when said decimal number value of said exponent part input signal is below said address number value of said leading 1 bit position or when said mantissa part input signal provides a 0 value;

encode means for outputting a signal representing said address number value of said leading 1 bit position in a binary number on the basis of said mantissa part input signal; and exponent part output signal determining means receiving said exponent part input signal, the output signal of said encode means and said control signal, for outputting a result of subtraction of said exponent part input signal and said output signal of said encode means as an exponent part output signal when said control signal is at said first level, and for outputting a 0 value as said exponent part output signal when said control signal is at said second level;

said address number value of said leading 1 bit position corresponding to a value obtained by counting each bit position from said most significant bit position excluding said most significant bit itself.

2. The normalization circuit device of the floating point computation device according to claim 1, wherein said control signal generating means comprises, reference signal generating means receiving said exponent part input signal for outputting a reference signal, and logic operation means for performing AND processing of said reference signal and said mantissa part input signal, and for further carrying out OR processing of the result of said AND processing to output the result of said OR processing as said control signal, in said reference signal, each bit state from its most significant bit position to a certain bit position determined on the basis of said exponent part input signal being all set to 1 and bit states of other bit position being all set to 0.

3. The normalization circuit device of the floating point computation device according to claim 2, wherein, in said reference signal, bit states of respective bit positions from its most significant bit position are all set to 1 for the number of positions corresponding to a value obtained by adding 1 to said decimal number value of said exponent part input signal and bit states of other bit positions are all set to 0.

4. The normalization circuit device of the floating point computation device according to claim 2, wherein in said reference signal bit states of respective bit positions from its most significant bit position are all set to 1 for the number of positions corresponding to said decimal number value of said exponent part input signal and bit states of other bit positions are all set to 0.

5. The normalization circuit device of the floating point computation device according to claim 2, wherein said reference signal generating means comprises, decoder means for decoding said exponent part input signal, and main reference signal generating means receiving an output signal of said decoder means for generating said reference signal.

6. The normalization circuit device of the floating point computation device according to claim 5, further comprising, leading 1 detecting means receiving said mantissa part input signal for detecting said leading 1 bit position of said mantissa part input signal, selecting means receiving an output signal of said leading 1 detecting means except its most significant bit, said output signal of said decoder means and said control signal, for selecting the output signal of said leading 1 detecting means when said control signal is at said first level and for selecting said output signal of said decoder means when said control signal is at said second level, and shifter means for shifting said mantissa part input signal on the basis of an output signal of said selecting means and a part providing said most significant bit in said output signal of said leading 1 detecting means to generate a mantissa part output signal.

7. The normalization circuit device of the floating point computation device according to claim 2, with a bit width of actually inputted said mantissa part input signal and a bit width of a mantissa part output signal predetermined by standard being x bits and y bits, respectively, said normalization circuit device further comprising;

decoder means for decoding said exponent part input signal;

leading 1 detecting means receiving said mantissa part input signal for detecting said leading 1 bit position of said mantissa part input signal;

first shift means receiving an output signal of said leading 1 detecting means except its most significant bit, for shifting each bit state of said output signal one bit toward its least significant bit and for setting a bit state of said least significant bit to a bit state of a most significant bit of inputted said output signal;

selecting means receiving an output signal of said first shift means, said output signal of said decoder means and said control signal, for selecting said output signal of said shift means when said control signal is at said first level, and for selecting said output signal of said decoder means when said control signal is at said second level; and second shift means for shifting said mantissa part input signal of said x bits into a signal of said y bits according to said output signal of said selecting means and a part of said output signal of said leading 1 detecting means providing said most significant bit to output said y-bit signal after shifted as said mantissa part output signal;

wherein said second shift means shifts said mantissa part input signal when said selecting means outputs said output signal of said first shift means so as to eliminate the most significant bit of said mantissa part input signal and eliminate each bit on its least significant bit side for a number given by (x−y−1) including said least significant bit, and when said selecting means outputs said output signal of said decoder means said second shift means shifts said mantissa part input signal so as to eliminate each bit on said least significant bit side for a number given by (x−y) including said least significant bit of said mantissa part input signal.

8. The normalization circuit device of the floating point computation device according to claim 7, wherein said first shift means is realized only with interconnection layers connecting an output port of said output signal of said leading 1 detecting means except said most significant bit and one input port of said selecting means, and the other input port of said selecting means is supplied with said output signal of said decoder means.

9. The normalization circuit device of the floating point computation device according to claim 2, with a bit width of actually inputted said mantissa part input signal and a bit width of a mantissa part output signal predetermined by standard being x bits and y bits, respectively, said encode means comprising;

leading 1 detecting means receiving said mantissa part input signal for detecting said leading 1 bit position of said mantissa part input signal, and an encoder circuit for encoding a detection result of said leading 1 detecting means to output said signal representing said address number value of said leading 1 bit position in a binary number;

said normalization circuit device further comprising;

decoder means for decoding said exponent part input signal;

first shift means receiving the output signal of said leading 1 detecting means except its most significant bit, for shifting each bit state of said output signal one bit toward its least significant bit and for setting a bit state of said least significant bit to a bit state of a most significant bit of inputted said output signal;

selecting means receiving an output signal of said first shift means, said output signal of said decoder means and said control signal, for selecting said output signal of said shift means when said control signal is at said first level, and for selecting said output signal of said decoder means when said control signal is at said second level; and second shift means for shifting said mantissa part input signal of said x bits into a signal of said y bits according to said output signal of said selecting means and a part providing said most significant bit in said output signal of said leading 1 detecting means to output said y-bit signal after shifted as said mantissa part output signal;

wherein said second shift means shifts said mantissa part input signal when said selecting means outputs said output signal of said first shift means so as to eliminate the most significant bit of said mantissa part input signal and eliminate each bit on its least significant bit side for a number given by (x−y−1) including said least significant bit, and when said selecting means outputs said output signal of said decoder means said second shift means shifts said mantissa part input signal so as to eliminate each bit on said least significant bit side for a number given by (x−y) including said least significant bit of said mantissa part input signal.

10. The normalization circuit device of the floating point computation device according to claim 9, wherein said first shift means is realized only with interconnection layers connecting an output port of said output signal of said leading 1 detecting means except said most significant bit and one input port of said selecting means, and the other input port of said selecting means is supplied with said output signal of said decoder means.

11. The normalization circuit device of the floating point computation device according to claim 5, with a bit width of actually inputted said mantissa part input signal and a bit width of a mantissa part output signal predetermined by standard being x bits and y bits, respectively, said normalization circuit device further comprising;

leading 1 detecting means receiving said mantissa part input signal for detecting said leading 1 bit position of said mantissa part input signal;

first shift means receiving an output signal of said leading 1 detecting means except its most significant bit, for shifting each bit state of said output signal one bit toward its least significant bit and for setting a bit state of said least significant bit to a bit state of a most significant bit of inputted said output signal;

selecting means receiving an output signal of said first shift means, said output signal of said decoder means and said control signal, for selecting said output signal of said shift means when said control signal is at said first level, and for selecting said output signal of said decoder means when said control signal is at said second level; and second shift means for shifting said mantissa part input signal of said x bits into a signal of said y bits according to said output signal of said selecting means and a part providing said most significant bit in said output signal of said leading 1 detecting means to output said y-bit signal after shifted as said mantissa part output signal;

wherein said second shift means shifts said mantissa part input signal when said selecting means outputs said output signal of said first shift means so as to eliminate the most significant bit of said mantissa part input signal and eliminate each bit on its least significant bit side for a number given by (x−y−1) including said least significant bit, and when said selecting means outputs said output signal of said decoder means said second shift means shifts said mantissa part input signal so as to eliminate each bit on said least significant bit side for a number given by (x−y) including said least significant bit of said mantissa part input signal.

12. The normalization circuit device of the floating point computation device according to claim 11, wherein said first shift means is realized only with interconnection layers connecting an output port of said output signal of said leading 1 detecting means except said most significant bit and one input port of said selecting means, and the other input port of said selecting means is supplied with said output signal of said decoder means.

13. The normalization circuit device of the floating point computation device according to claim 5, with a bit width of actually inputted said mantissa part input signal and a bit width of a mantissa part output signal predetermined by standard being x bits and y bits, respectively, said encode means comprising;

leading 1 detecting means receiving said mantissa part input signal for detecting said leading 1 bit position of said mantissa part input signal, and an encoder circuit for encoding a detection result of said leading 1 detecting means to output said signal representing said address number value of said leading 1 bit position in a binary number;

said normalization circuit device further comprising;

first shift means receiving the output signal of said leading 1 detecting means except its most significant bit, for shifting each bit state of said output signal one bit toward its least significant bit and for setting a bit state of said least significant bit to a bit state of a most significant bit of inputted said output signal;

selecting means receiving an output signal of said first shift means, said output signal of said decoder means and said control signal, for selecting said output signal of said shift means when said control signal is at said first level, and for selecting said output signal of said decoder means when said control signal is at said second level; and second shift means for shifting said mantissa part input signal of said x bits into a signal of said y bits according to said output signal of said selecting means and a part providing said most significant bit in said output signal of said leading 1 detecting means to output said y-bit signal after shifted as said mantissa part output signal;

wherein said second shift means shifts said mantissa part input signal when said selecting means outputs said output signal of said first shift means so as to eliminate the most significant bit of said mantissa part input signal and eliminate each bit on its least significant bit side for a number given by (x−y−1) including said least significant bit, and when said selecting means outputs said output signal of said decoder means said second shift means shifts said mantissa part input signal so as to eliminate each bit on said least significant bit side for a number given by (x−y) including said least significant bit of said mantissa part input signal.

14. The normalization circuit device of the floating point computation device according to claim 13, wherein said first shift means is realized only with interconnection layers connecting an output port of said output signal of said leading 1 detecting means except said most significant bit and one input port of said selecting means, and the other input port of said selecting means is supplied with said output signal of said decoder means.

15. A normalization circuit device of a floating point computation device which applies normalization to a mantissa part input signal and an exponent part input signal represented as binary numbers subjected to certain floating point computation processing and transmitted, comprising:

control signal generating means receiving said mantissa part input signal and said exponent part input signal, for decoding said exponent part input signal and determining on the basis of said mantissa part input signal and said exponent part input signal whether an output result of said normalization circuit devcie is a normalization number or an unnormalization number, or it is a 0 function state where said mantissa part input signal provides a 0 value to generate a control signal at a first level in the case of said normalization number and generate said control signal at a second level in the case of said unnormalization number and in the case of said 0 function state;

leading 1 detecting means receiving said mantissa part input signal for detecting a leading 1 bit position of said mantissa part input signal;

first shift means receiving an output signal of said leading 1 detecting means except its most significant bit, for shifting each bit state of said output signal one bit toward its least significant bit and for setting a bit state of said least significant bit to a bit state of a most significant bit of inputted said output signal;

selecting means receiving an output signal of said first shift means, said output signal of said decoder means and said control signal, for selecting said output signal of said first shift means when said control signal is at said first level, and for selecting said output signal of said decoder means when said control signal is at said second level; and second shift means for shifting said mantissa part input signal of x bits into a signal of y bits according to said output signal of said selecting means and a part providing said most significant bit in said output signal of said leading 1 detecting means to output said y-bit signal after shifted as said mantissa part output signal;

said x bits and said y bits being a bit width of actually inputted said mantissa part input signal and a bit width of a mantissa part output signal predetermined by standard, respectively;

wherein said second shift means shifts said mantissa part input signal when said selecting means outputs said output signal of said first shift means so as to eliminate the most significant bit of said mantissa part input signal and eliminate each bit on its least significant bit side for a number given by (x−y−1) including said least significant bit, and when said selecting means outputs said output signal of said decoder means said second shift mean so as to eliminate each art input signal so as to eliminate each bit on said least significant bit side for a number given by (x−y) including said least significant bit of said mantissa part input signal.

16. The normalization circuit device of the floating point computation device according to claim 15, wherein said first shift means is realized only with interconnection layers connecting an output port of said output signal of said leading 1 detecting means except said most significant bit and one input port of said selecting means, and the other input port of said selecting means is supplied with said output signal of said decoder means.

17. The normalization circuit device of the floating point computation device according to claim 16, wherein said control signal generating means first decodes inputted said exponent part input signal and then makes said determination on the basis of decoded said exponent part input signal and said mantissa part input signal.

* * * * *